INVENTORS
WILBUR B. ENGLAND
JOHN J. PERO III
GASPARO P. SICILIANO
VICTOR T. TAKATA

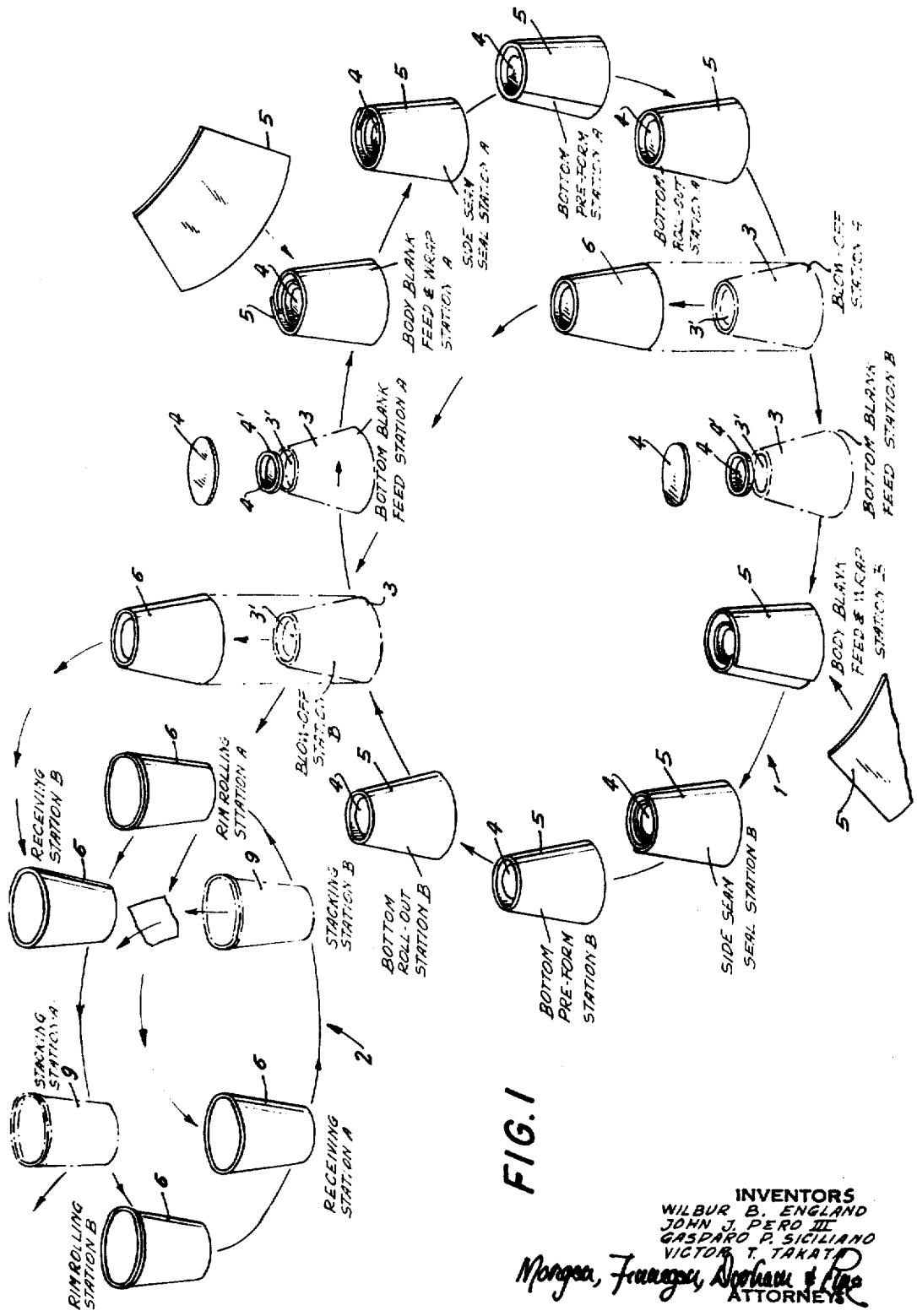

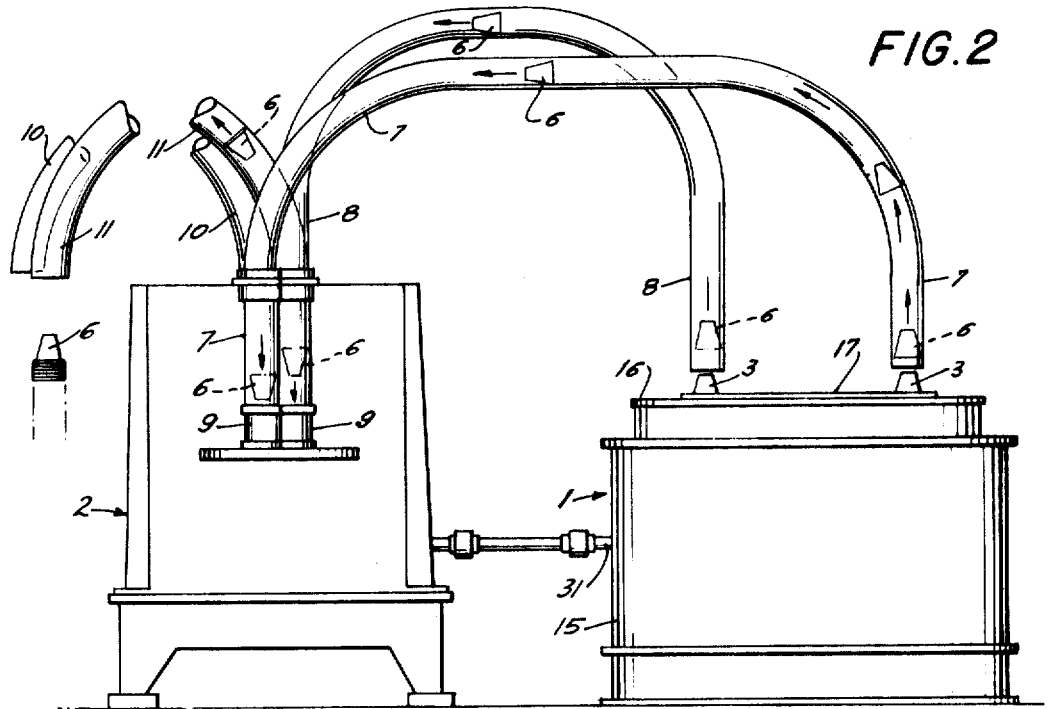
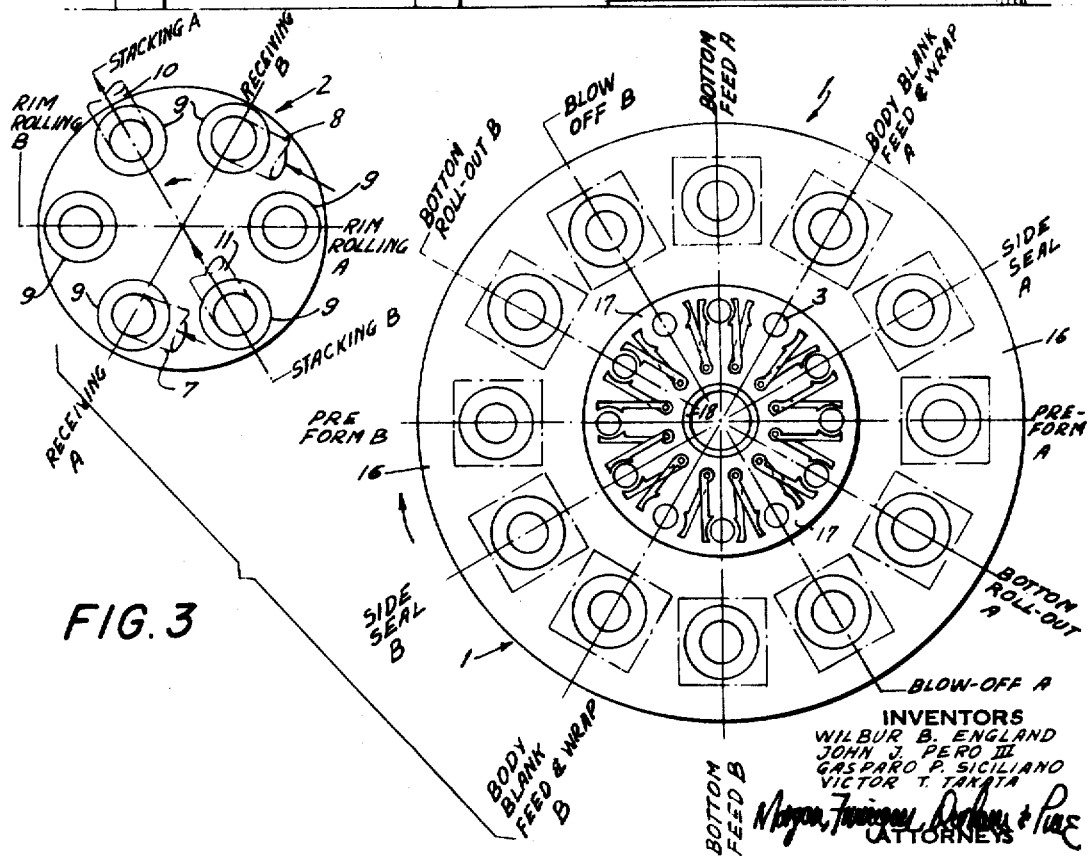

ATTORNEYS

INVENTORS
WILBUR B. ENGLAND
JOHN J. PERO III
GASPARO P. SICILIANO
VICTOR T. TAKATA

Morgan, Finnegan, Durham & Pine
ATTORNEYS

INVENTORS
WILBUR B. ENGLAND
JOHN J. PERO II
GASPARO P. SICILIANO
VICTOR T. TAKATA
ATTORNEYS

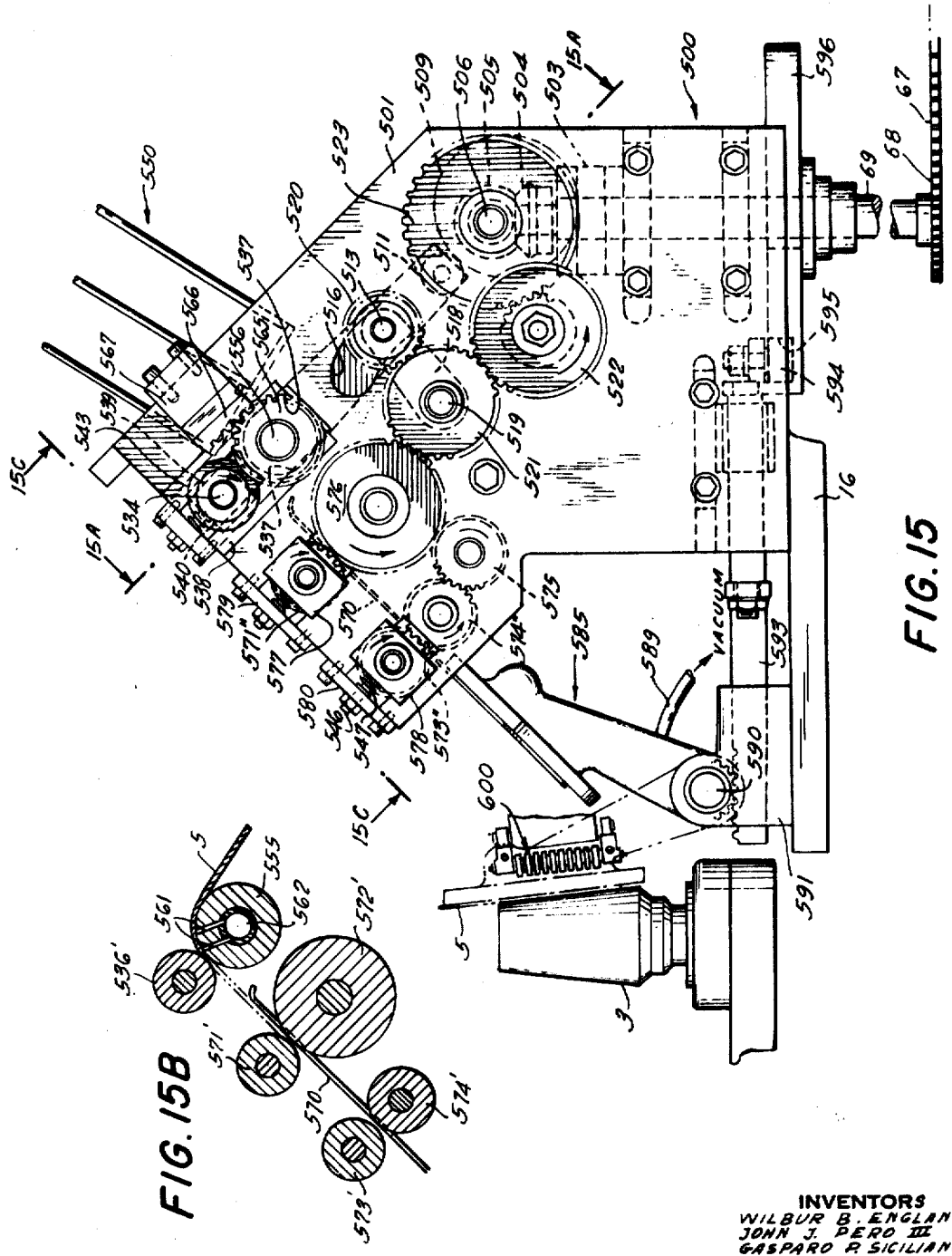

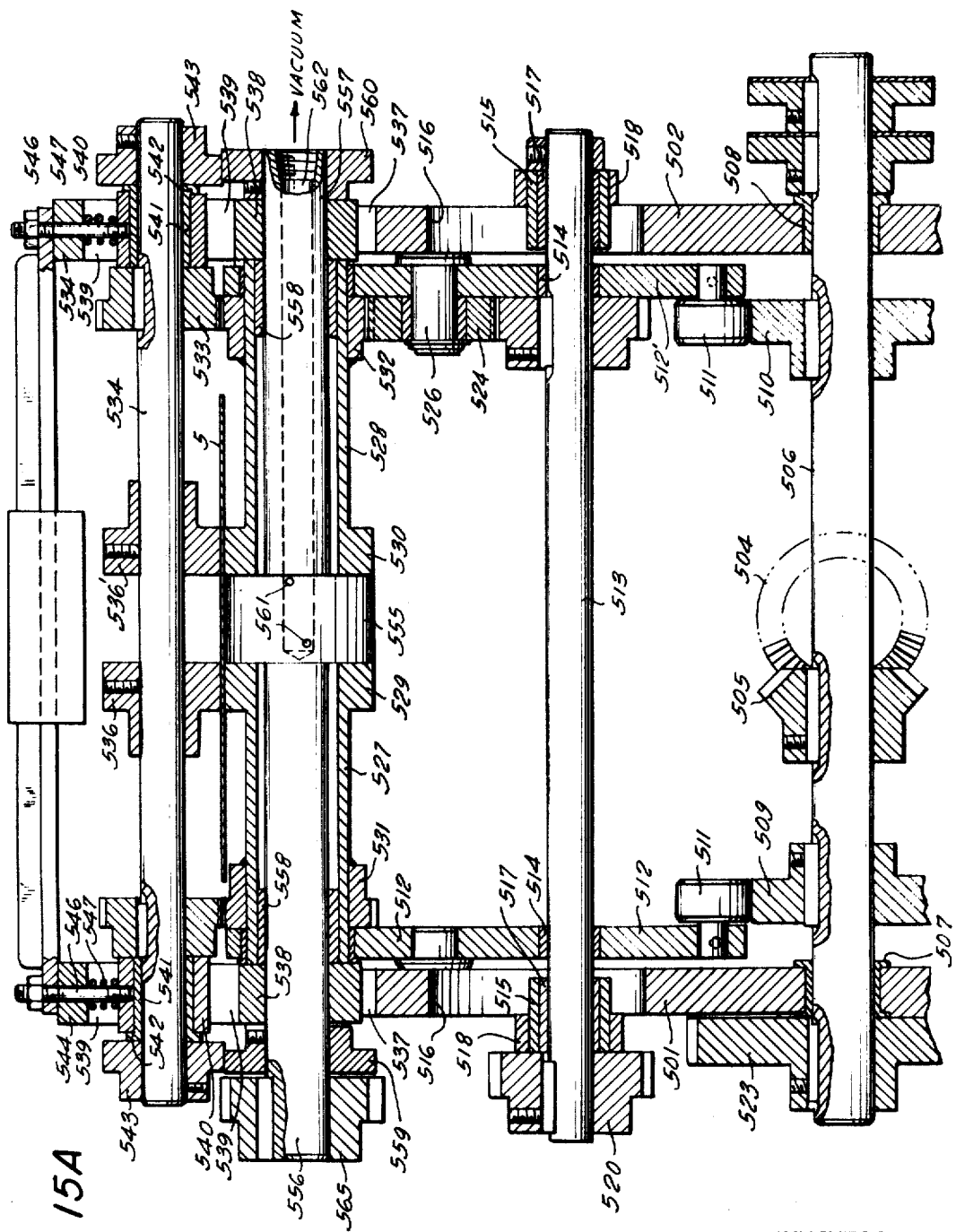

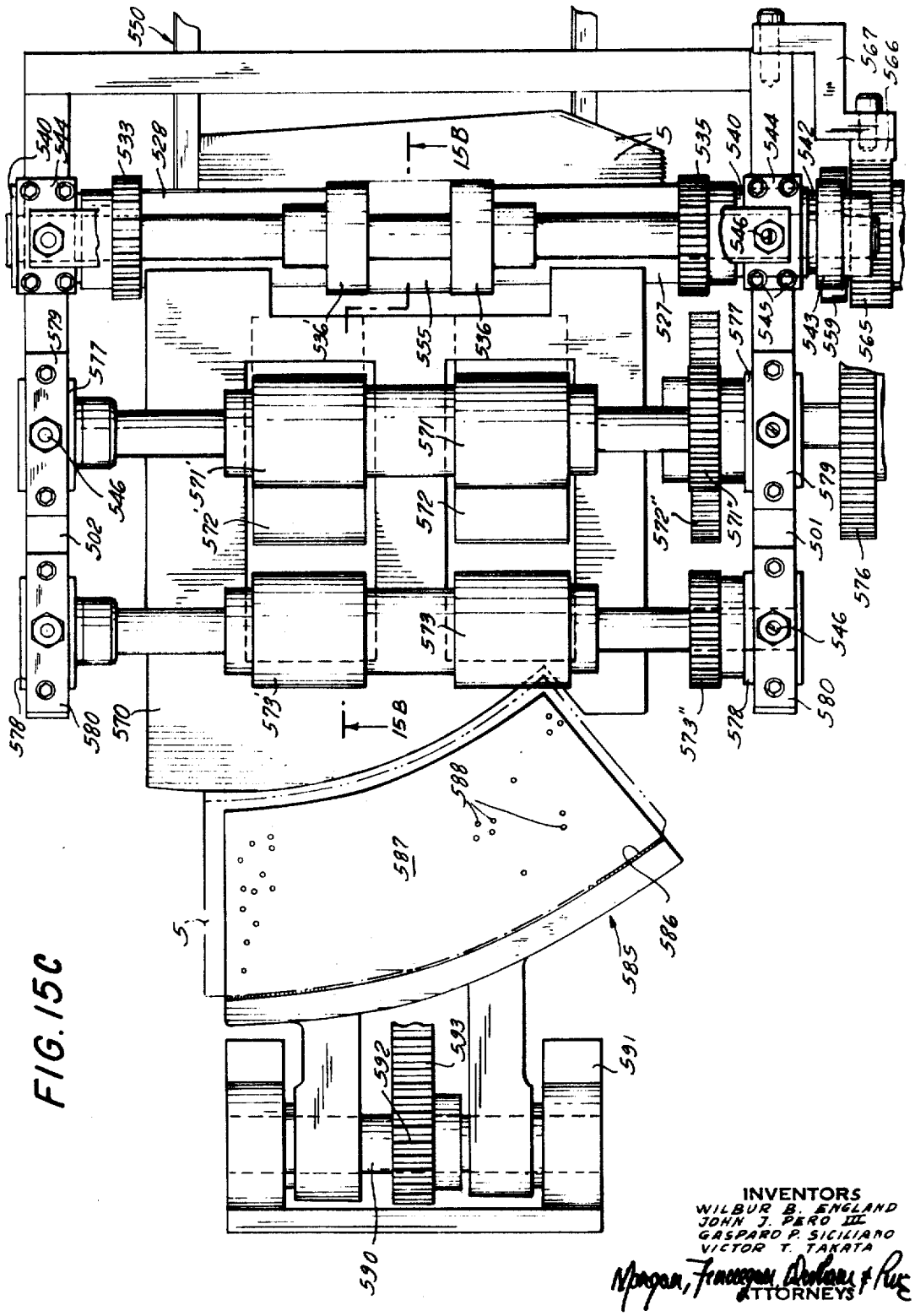

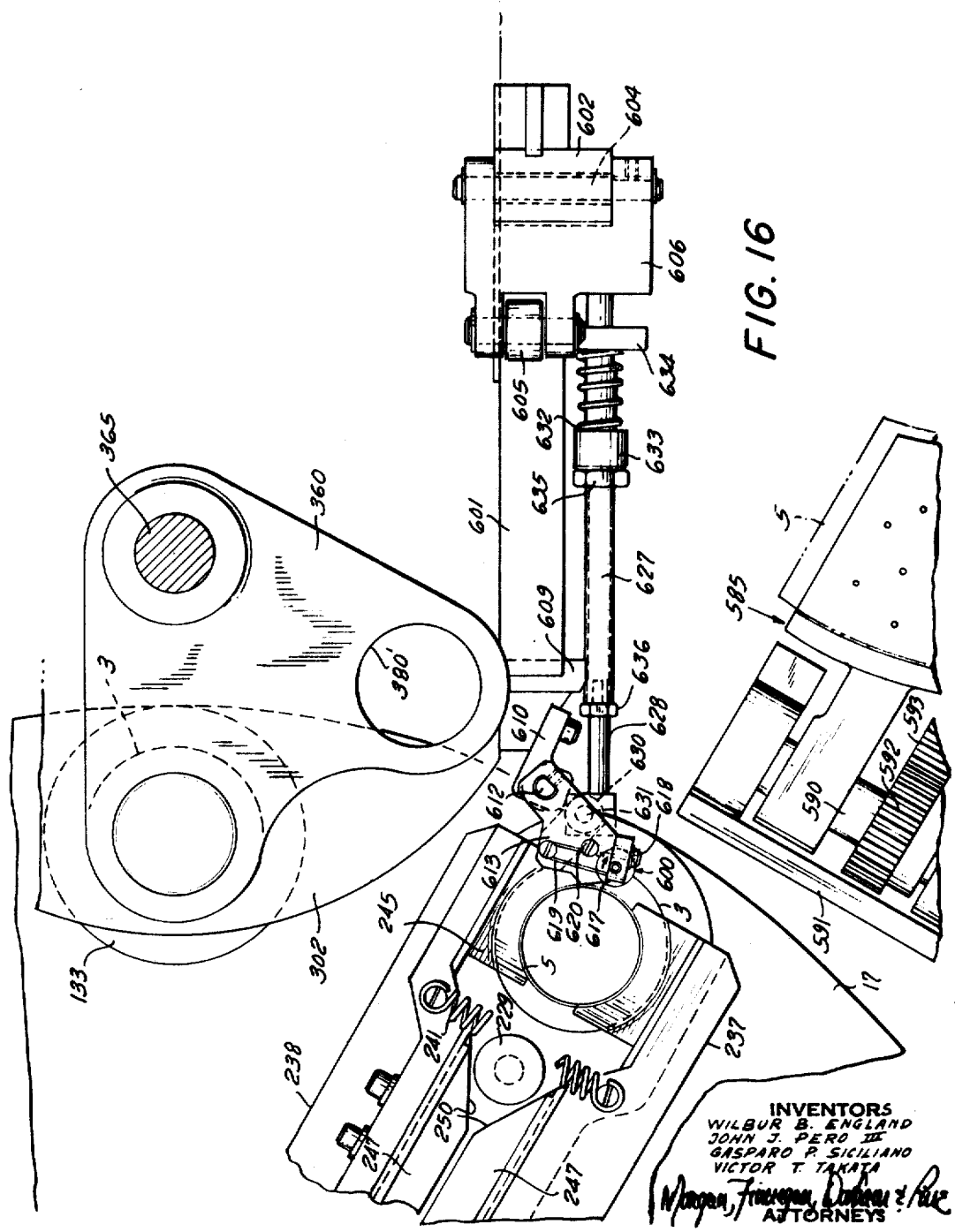

INVENTORS
WILBUR B. ENGLAND
JOHN J. PERO III
GASPARO P. SICILIANO
VICTOR T. TAKATA

Morgan, Finnegan, Durham & Pine
ATTORNEYS

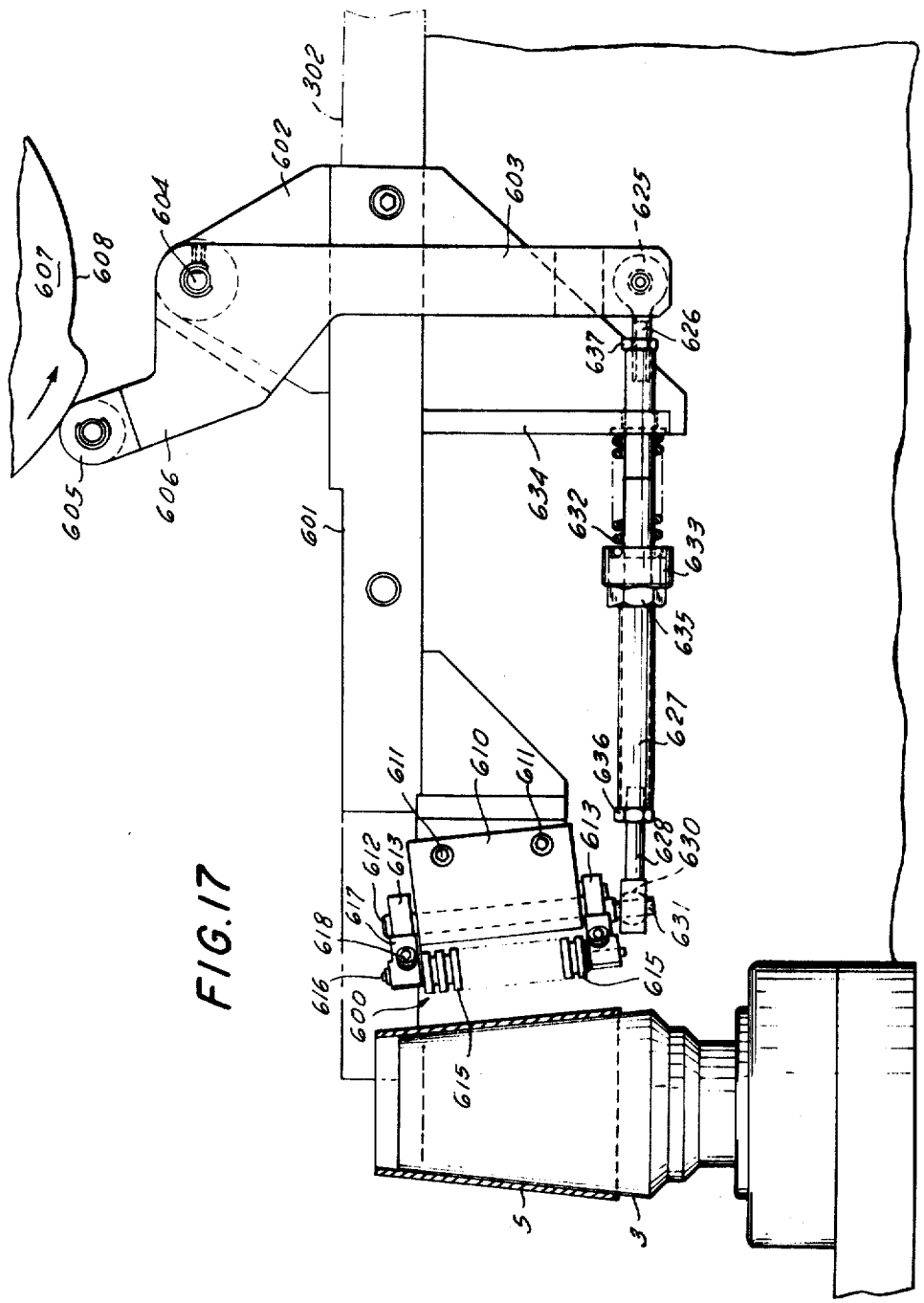

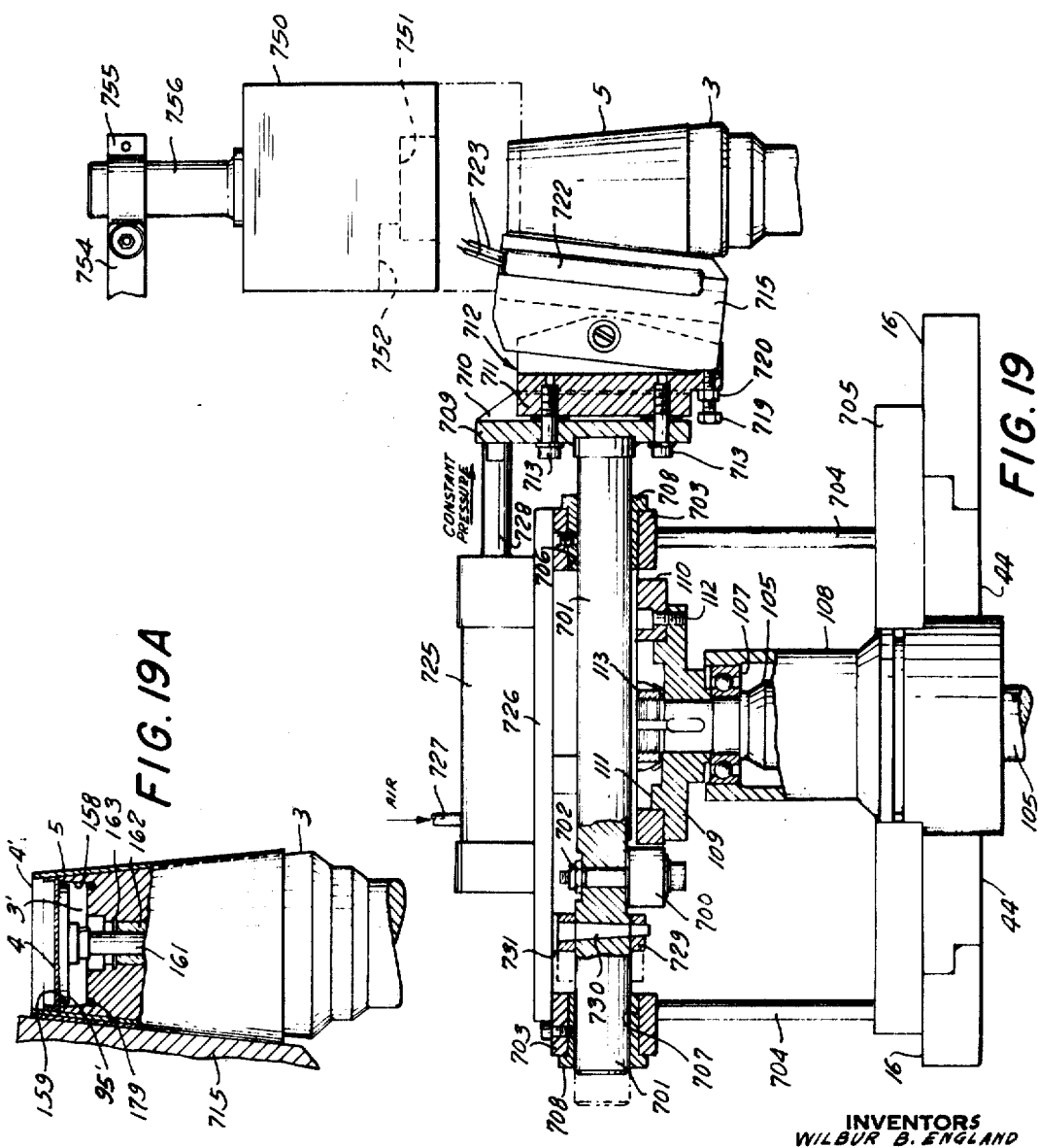

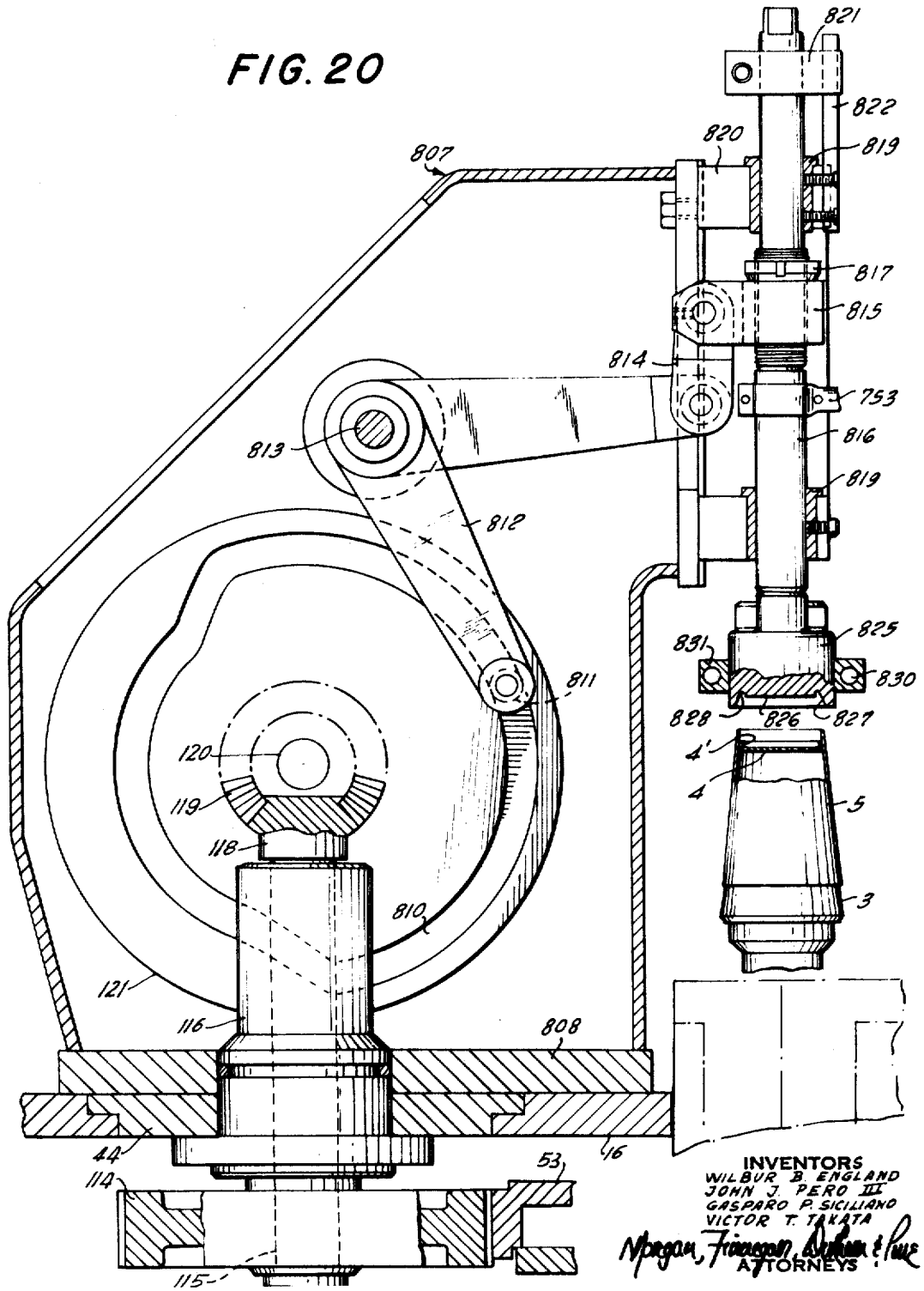

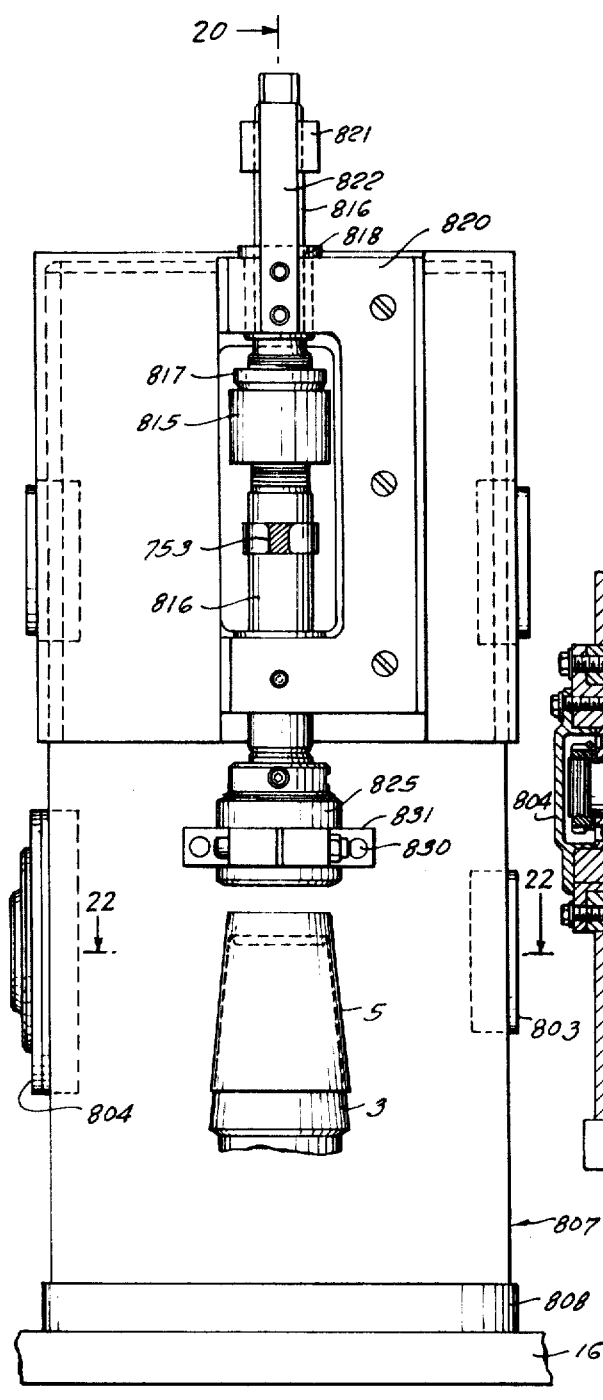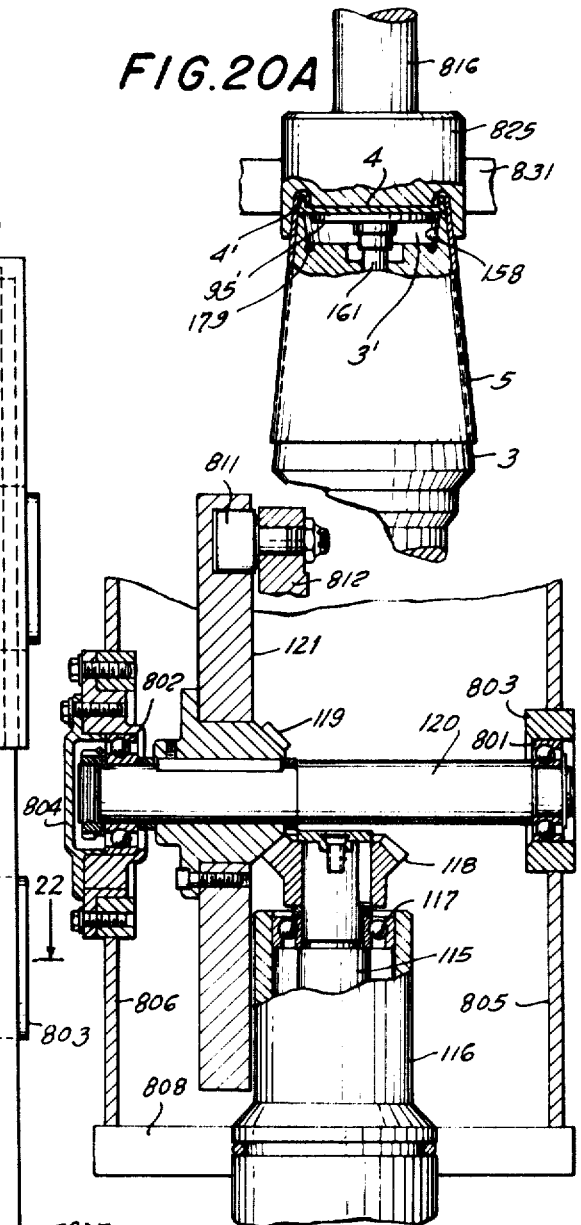

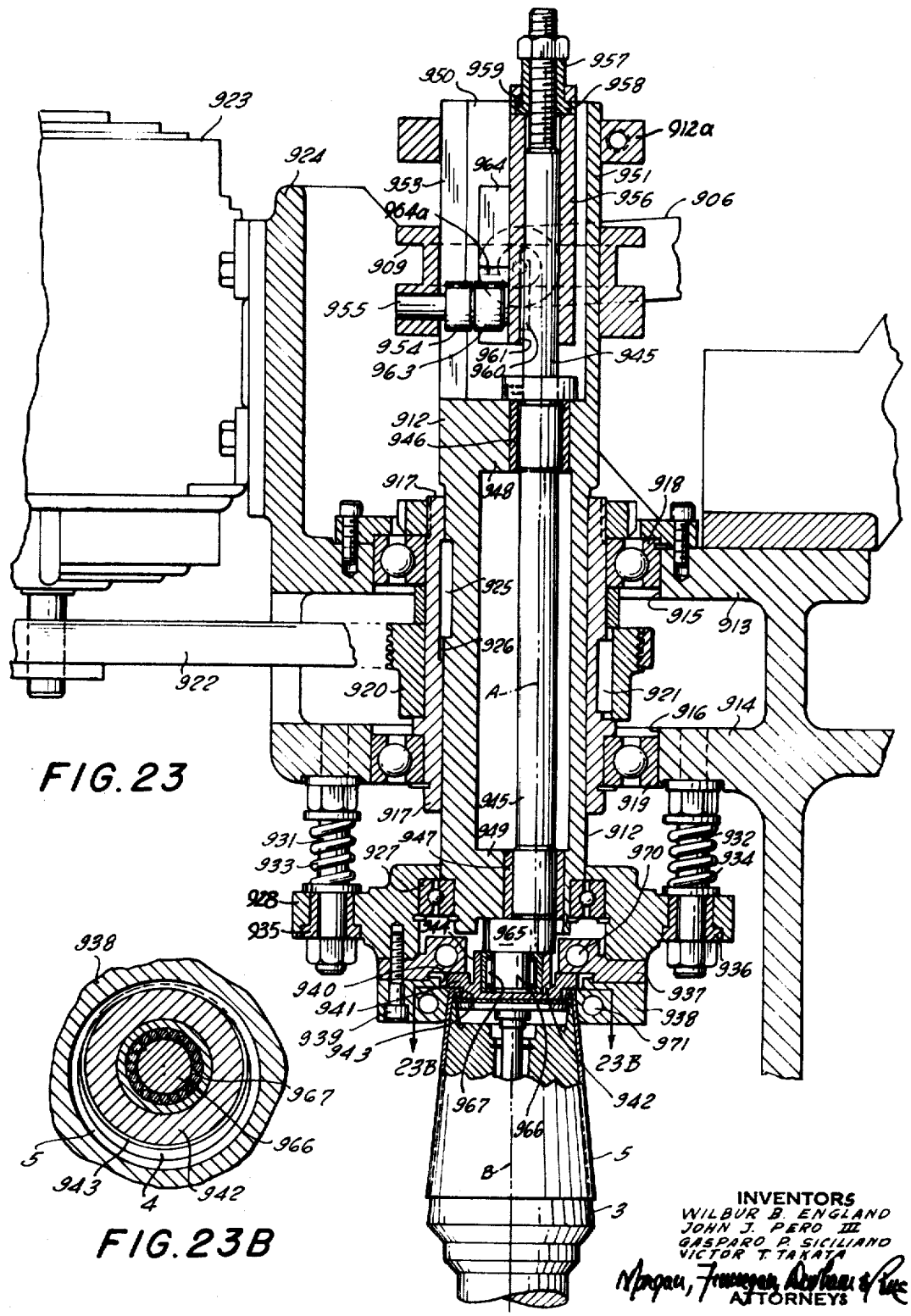

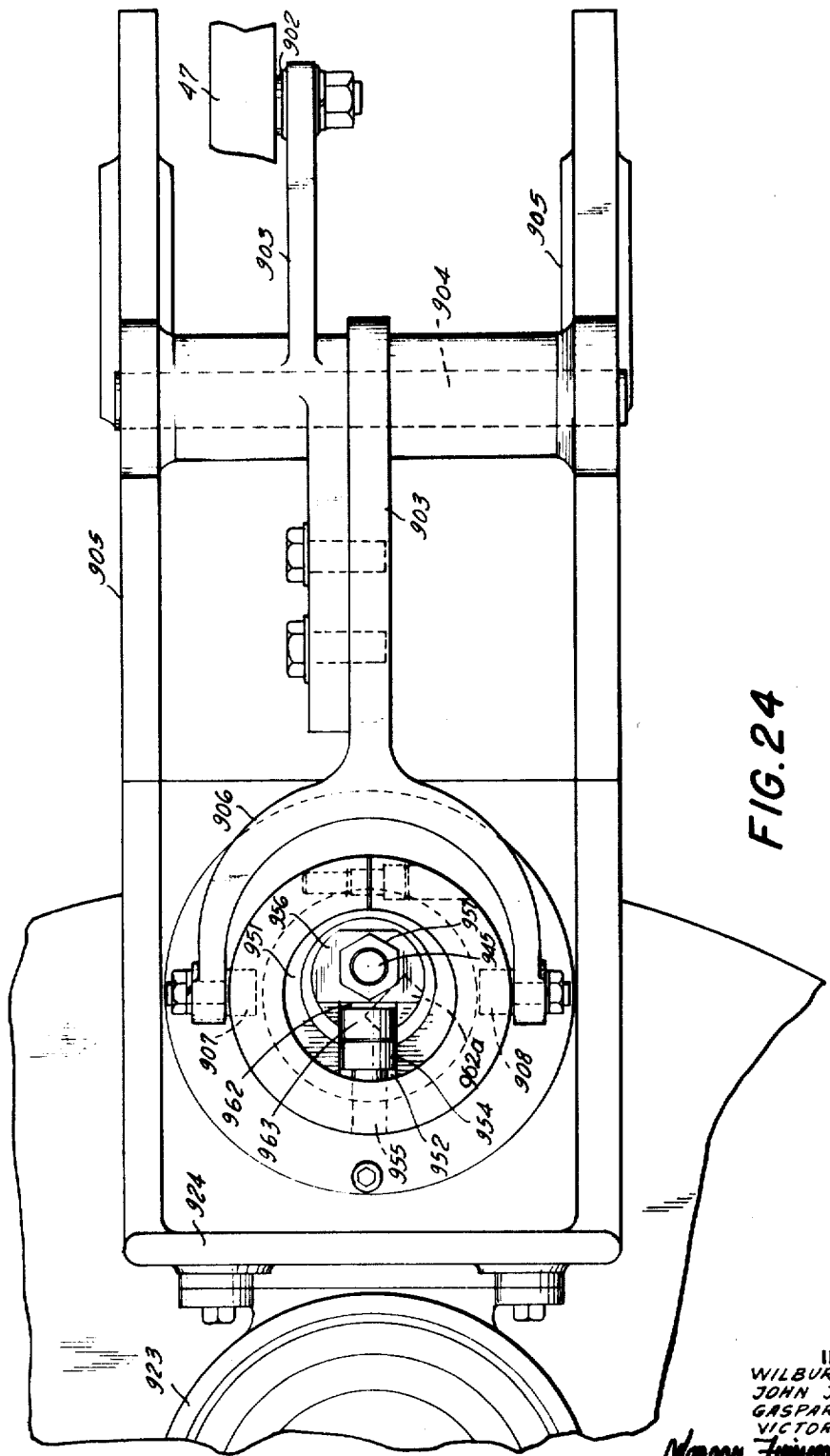

Sept. 23, 1969  W. B. ENGLAND ET AL  3,468,226
CUP-MAKING METHOD AND APPARATUS
Filed March 8, 1967  27 Sheets-Sheet 26

INVENTORS
WILBUR B. ENGLAND
JOHN J. PERO III
GASPARO P. SICILIANO
VICTOR J. TAKATA

Morgan, Finnegan, Durham & Pine
ATTORNEYS

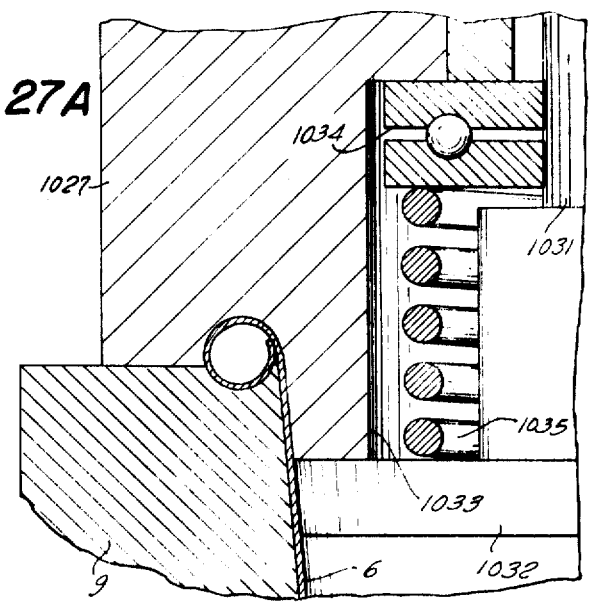
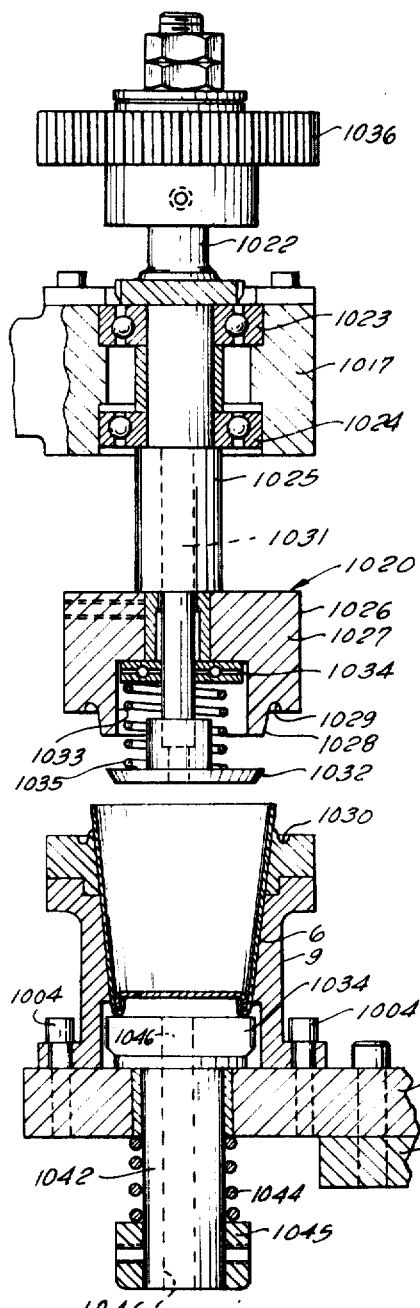
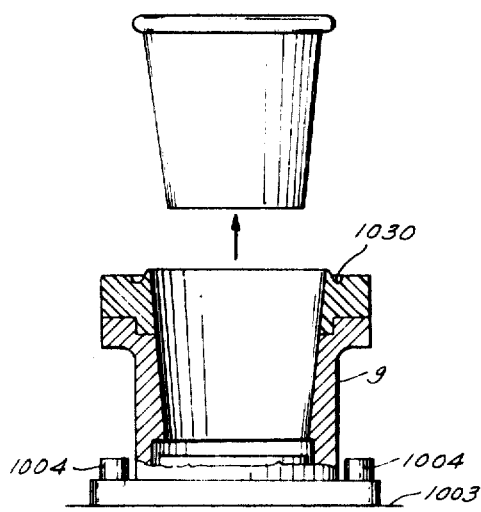

United States Patent Office 3,468,226
Patented Sept. 23, 1969

3,468,226
CUP-MAKING METHOD AND APPARATUS
Wilbur B. England, 51 Prentiss Lane, Belmont, Mass. 02178; John P. Pero III, Mendota Ave., Rye, N.Y. 10580; Gasparo P. Siciliano, East St., Middletown, Conn. 06457; and Victor T. Takata, P.O. Box 59, Cambridge, Mass. 02101
Filed Mar. 8, 1967, Ser. No. 621,567
Int. Cl. B31b *17/74, 3/74*
U.S. Cl. 93—39.3            3 Claims

ABSTRACT OF THE DISCLOSURE

A cup-making apparatus and method which performs the same cup-making operation simultaneously at a plurality of locations so as to progressively form and finish a plurality of cups simultaneously. A plurality of identical sets of stationary cup-making stations are arranged about the periphery of a primary turntable unit which rotates in a step-wise fashion, each cup-making station in each set of stations being occupied by a cup-forming mandrel carried on the primary turntable at equal angular distances apart, the mandrels being each independently rotatable about a vertical axis parallel to the axis of rotation of the turntable. The entire circular row of mandrels rotates as a unit, each mandrel being indexed progressively into and through all of the cup-making stations during one complete revolution of the turntable. Each set of cup-making stations includes: a bottom blank feed; a body blank feed and wrap; a side seam seal and pre-heat; a bottom pre-form; a bottom roll-out; and a blow-off station. The cups are semi-finished at the primary turntable and are blown through conduits to a secondary turntable unit where they are simultaneously received, rim-rolled, and blown to a finished cup stacking station.

---

This invention relates to the manufacture of cup-like containers, especially drinking cups, and relates more particularly to a new and improved method of and apparatus for making such cups and to certain essential or desirable cooperating mechanisms.

It is therefore an object of this invention to provide a novel method and apparatus for making cups.

Another object of this invention is to provide a novel method and apparatus for making a plurality of cups simultaneously.

Another object of this invention is to provide a novel apparatus capable of performing the same cup-making operation simultaneously at a plurality of locations so as to progressively form and finish a plurality of cups simultaneously.

Another object of this invention is to provide a novel apparatus for depositing a flat-disc-shaped bottom blank onto a cup-forming mandrel and die-forming the bottom blank at the mandrel so as to have a circumferentially extending up-standing rim.

Another object of this invention is to provide a novel apparatus for shaping a flat body blank into a cup body of generally frusto-conical configuration.

Another object of this invention is to provide a novel cup-making apparatus wherein a plurality of cup-forming mandrels are carried in a circular row on a rotatable turntable unit, and are each mounted for independent rotation about an axis parallel to the axis of rotation of the turntable.

Another object of this invention is to provide a novel cup-making apparatus wherein a plurality of cup-forming mandrels are indexed into and through a plurality of identical sets of stationary cup-making stations by means of a turntable unit rotating in step-wise manner, and wherein each of the mandrels rides on a circular cam track having rotatable bridge segments at each of body blank feed and wrap stations for rotating the mandrels so as to wrap the body blank thereabout.

Another object of this invention is to provide, in a novel apparatus for making cups, a novel cup-forming mandrel adapted to receive a flat bottom blank disc and die-form the disc so as to have a circumferentially extending up-standing rim, to hold a body blank on its peripheral surface as it rotates on its axis of revolution through 360° so as to wrap the body blank onto the mandrel, to urge the rim of the bottom blank disc into close-fitting, circumferentially abutting engagement with the inner surface of the wrapped body blank, and to blow the cup from the mandrel.

Another object of this invention is to provide, in a novel apparatus for making cups, a clamping mechanism for clamping a wrapped body blank to a cup-forming mandrel during the side seam seal, bottom pre-form and bottom roll-out cup making operations and adapted to open so as to permit the cup to be blown from the mandrel.

Another object of this invention is to provide, in a novel apparatus for making cups, a side seam sealing mechanism having cam means for actuating sealing means into and out of contact with the cup side seam and constant pressure means for holding the sealing means in contact with the side seam at a predetermined, constant pressure.

Another object of this invention is to provide, in a novel apparatus for making cups, a novel bottom roll-out mechanism for applying a radially outwardly directed rolling pressure against the end portion of a body blank folded annularly over the upstanding rim of the bottom blank, to thereby seal the body blank to the bottom blank.

Objects and advantages of the invention have been set forth in part herein and in part will be obvious herefrom, or may be learned by practice with the invention, the same being realized and attained by means of the instrumentalities, steps, processes, and combinations pointed out in the appended claims.

The invention consists in the novel parts, constructions, arrangements, steps, combinations and improvements herein shown and described.

The accompanying drawings, referred to herein and constituting a part hereof, illustrate one embodiment of the invention, and together with the description, serve to explain the principles of the invention.

Brief description of the drawings

Of the drawings:

FIGURE 1 is a schematic view, in perspective, of an arrangement of cup-making stations of apparatus for the making of two cups simultaneously in accordance with this invention, the stations, as shown, consisting of a primary assembly of two identical sets of six stations each arranged in a circular row, and of a secondary assembly of two identical sets of three stations each arranged in a circular row, for receiving, and finishing, semifinished cups transferred thereto from the primary assembly, the view also illustrating the sequence of operations carried out cyclically by the respective sets of cup-making stations;

FIGURE 2 is a schematic view, in side elevation, of cup-making apparatus of this invention for the making of two cups simultaneously in the employment of the cup-making station arrangement of FIGURE 1, the view omitting, for clarity, stations of the primary assembly of FIGURE 1 other than the blow-off stations of that assembly, and showing a primary turntable unit at the right and a secondary turntable unit at the left;

3,468,226

Figure 4:
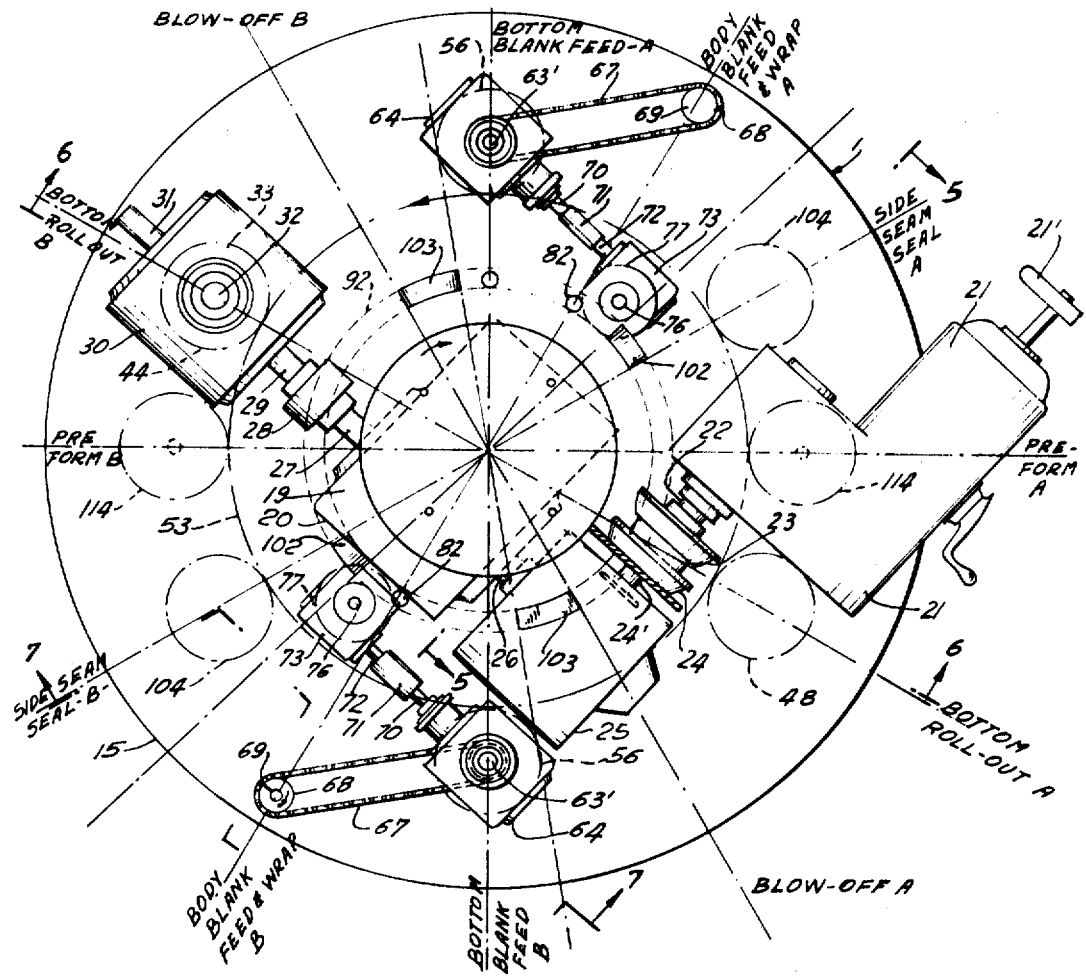
Figure 5:
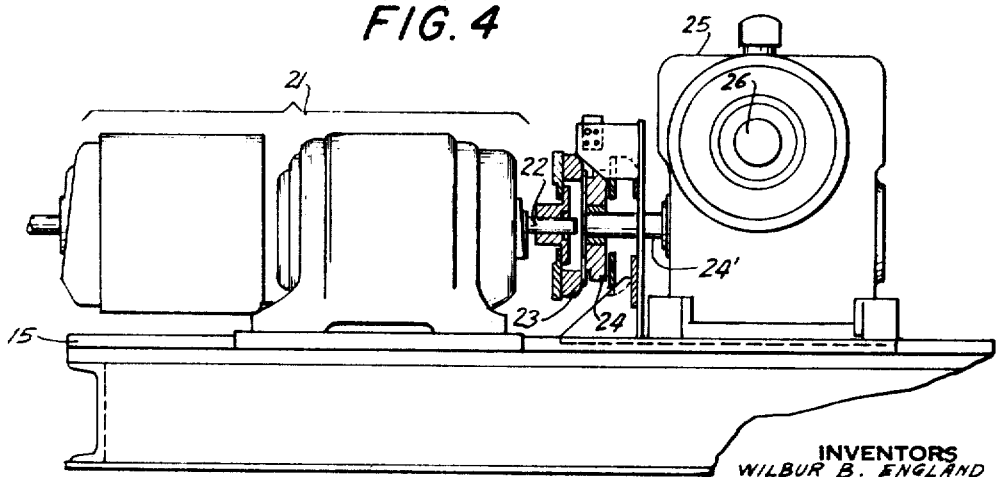
Figure 6:
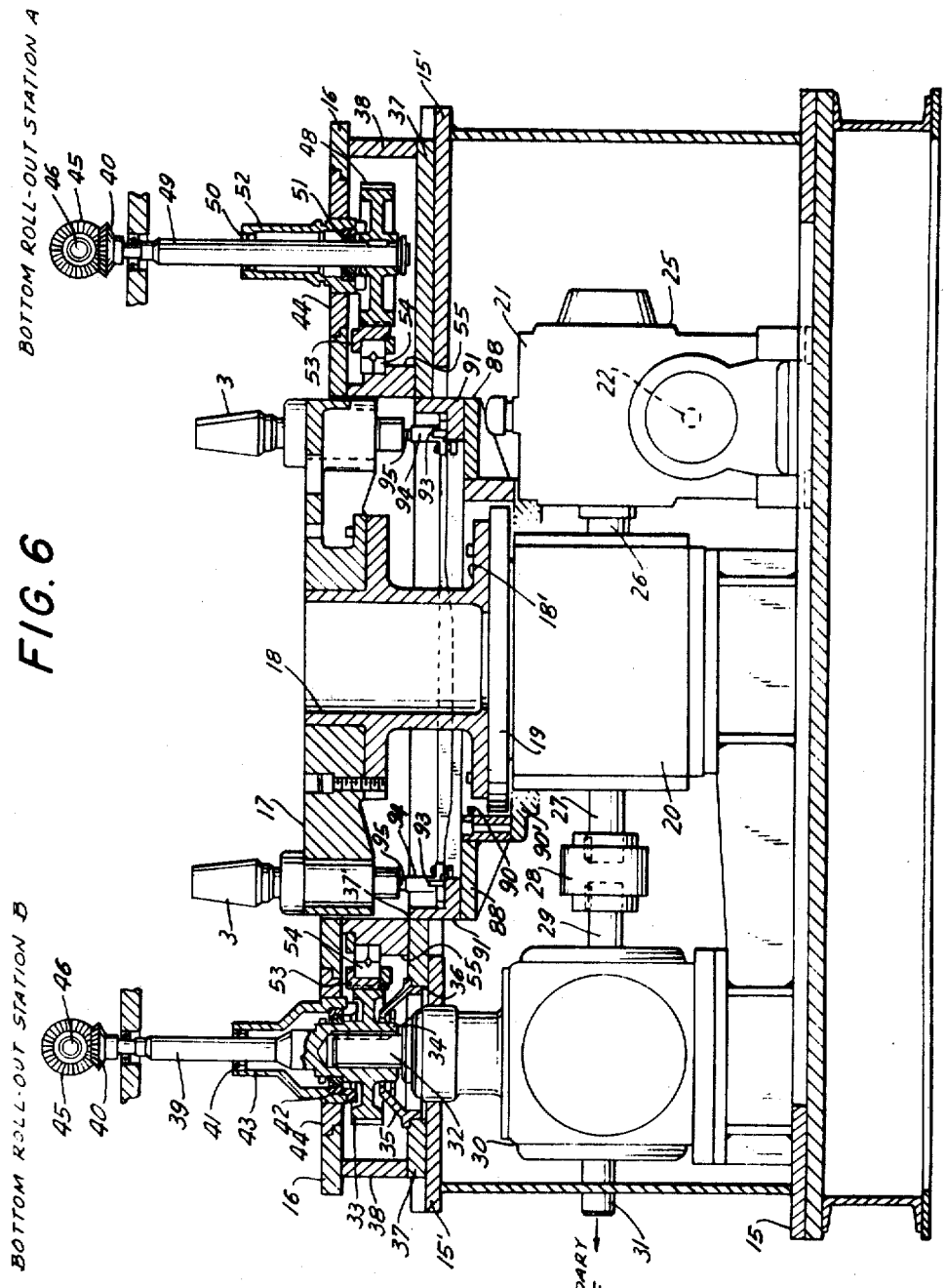
Figure 7:
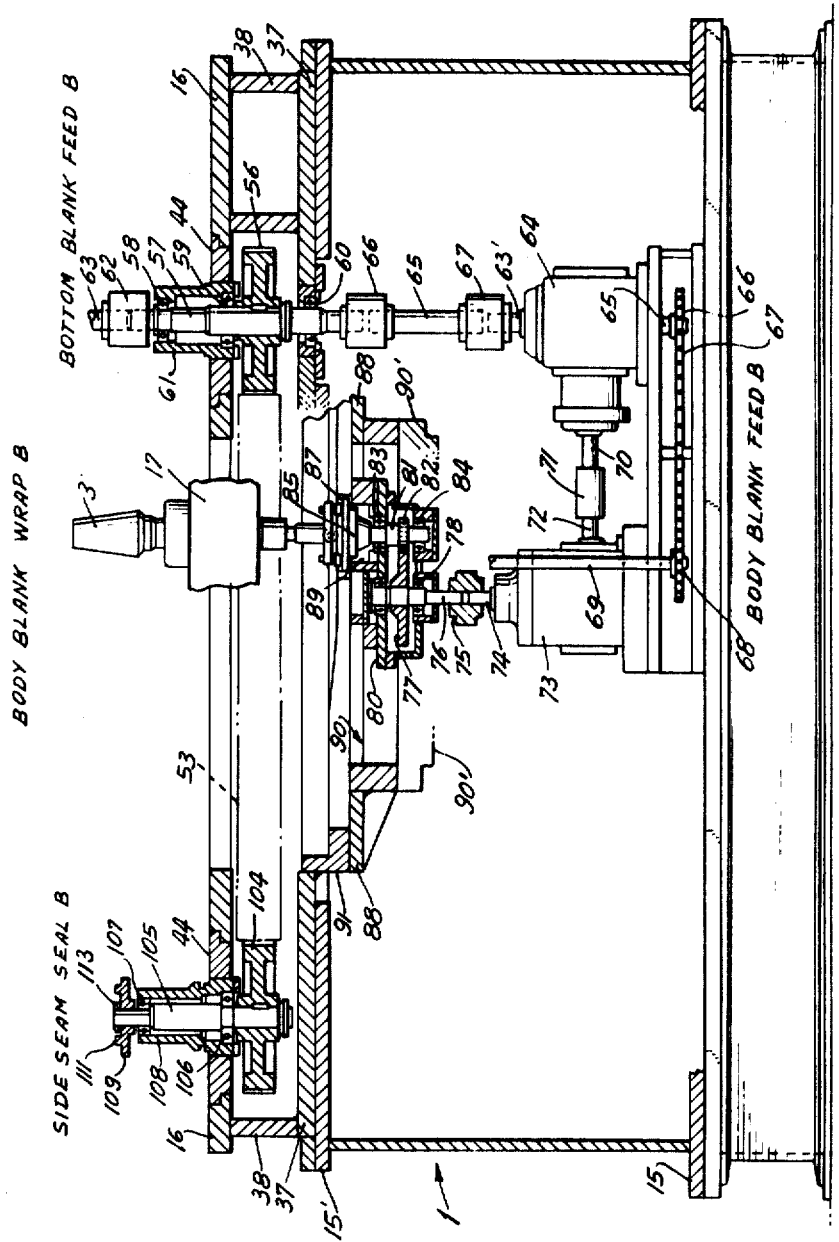
Figure 8:
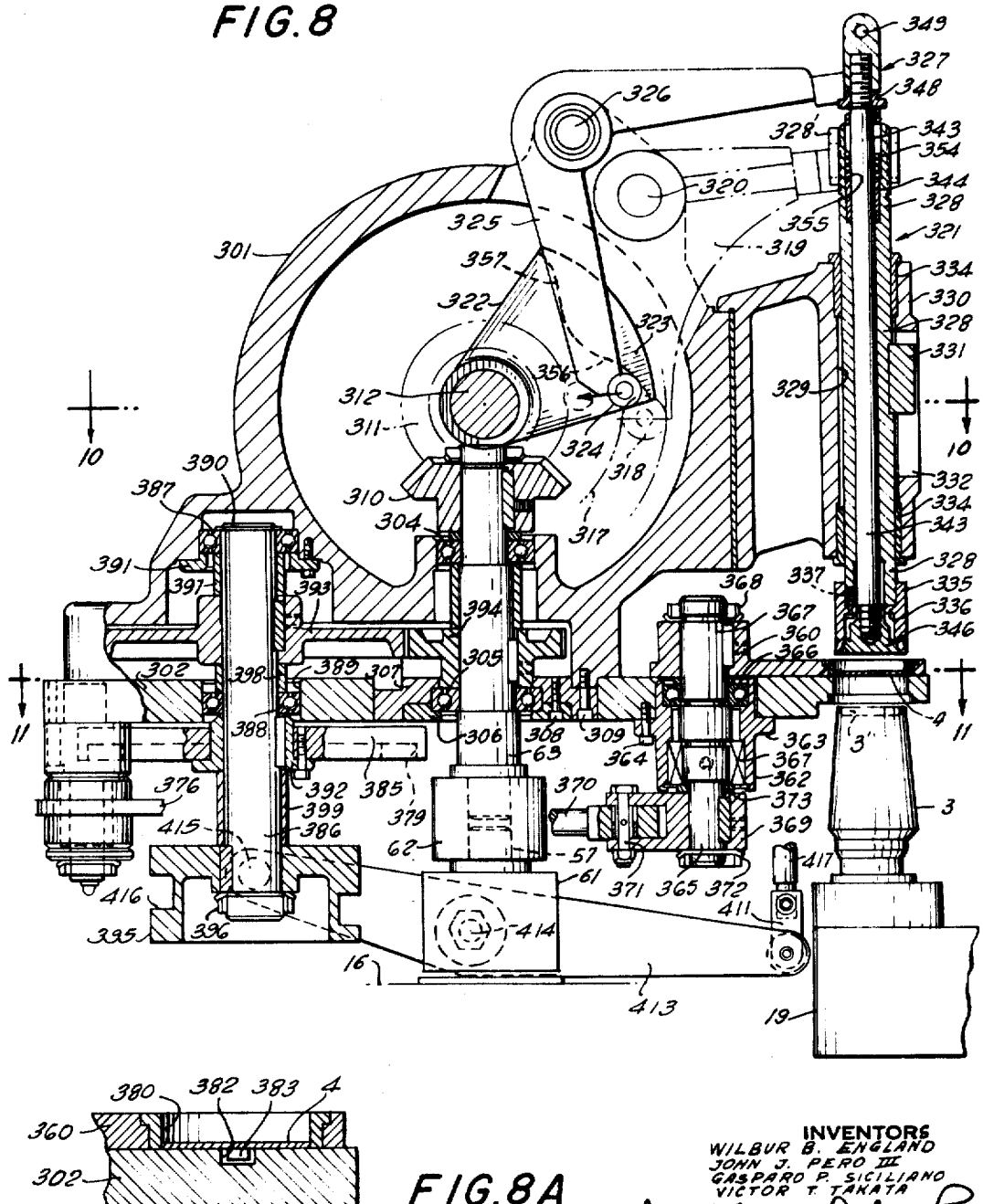
Figure 9:
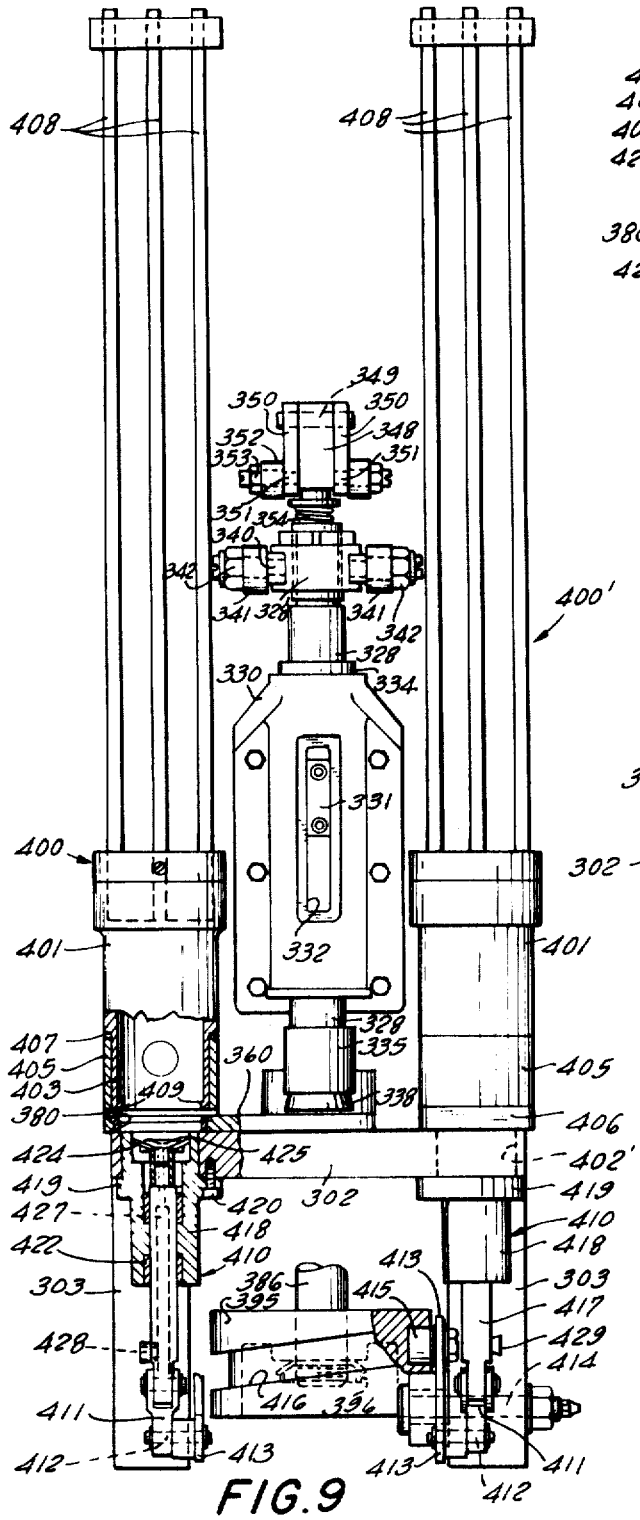
Figure 9A:
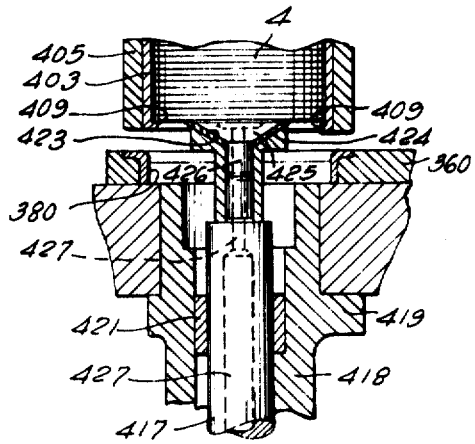
Figure 9B:
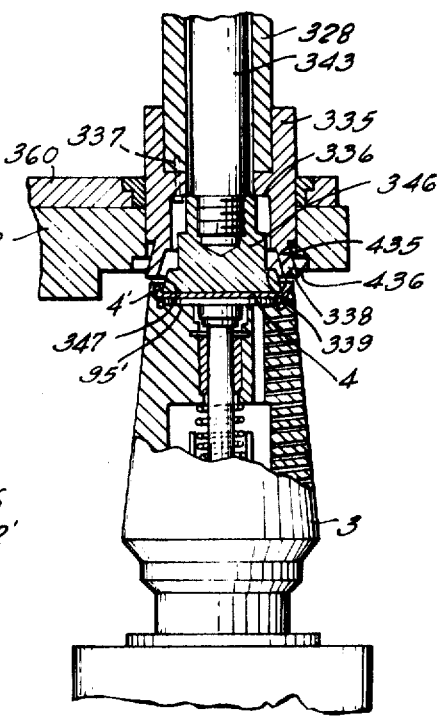
Figure 10:
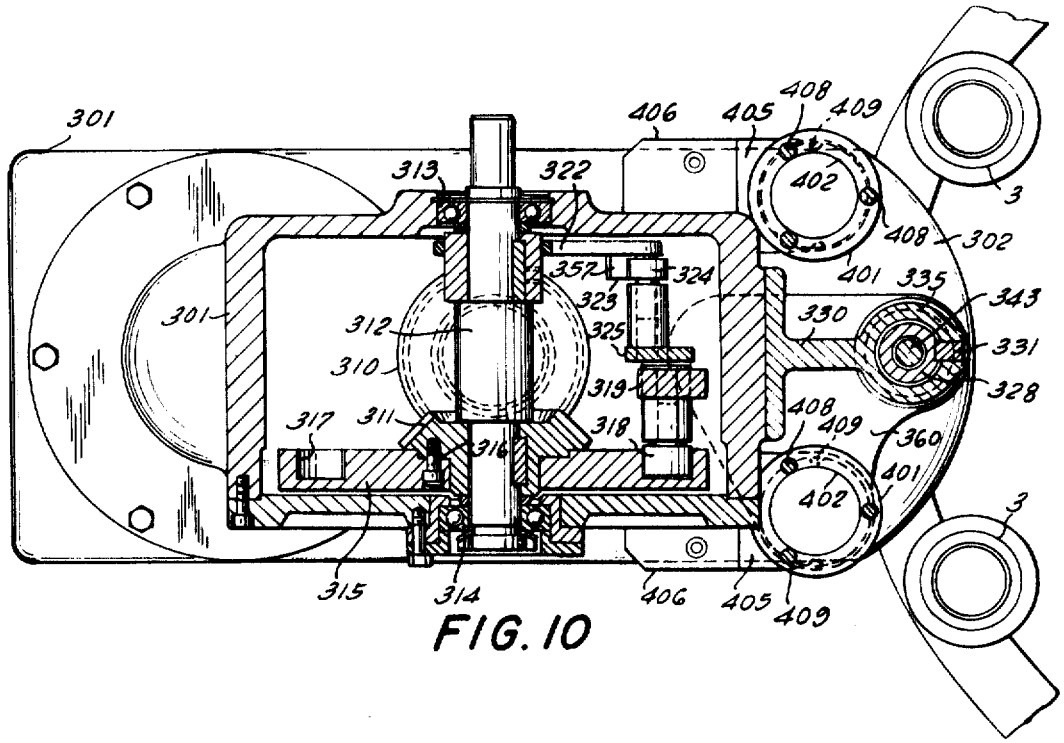
Figure 11:
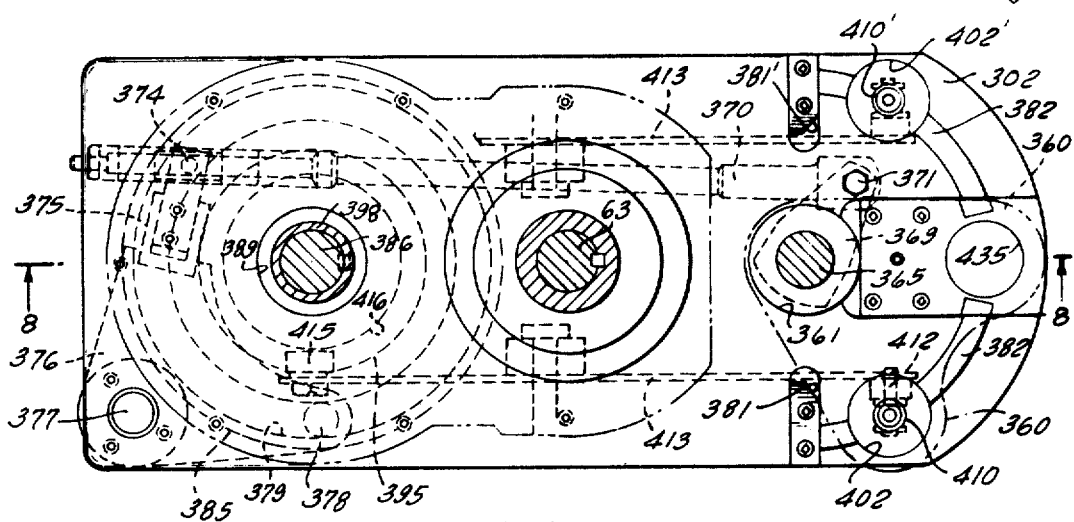
Figure 12:
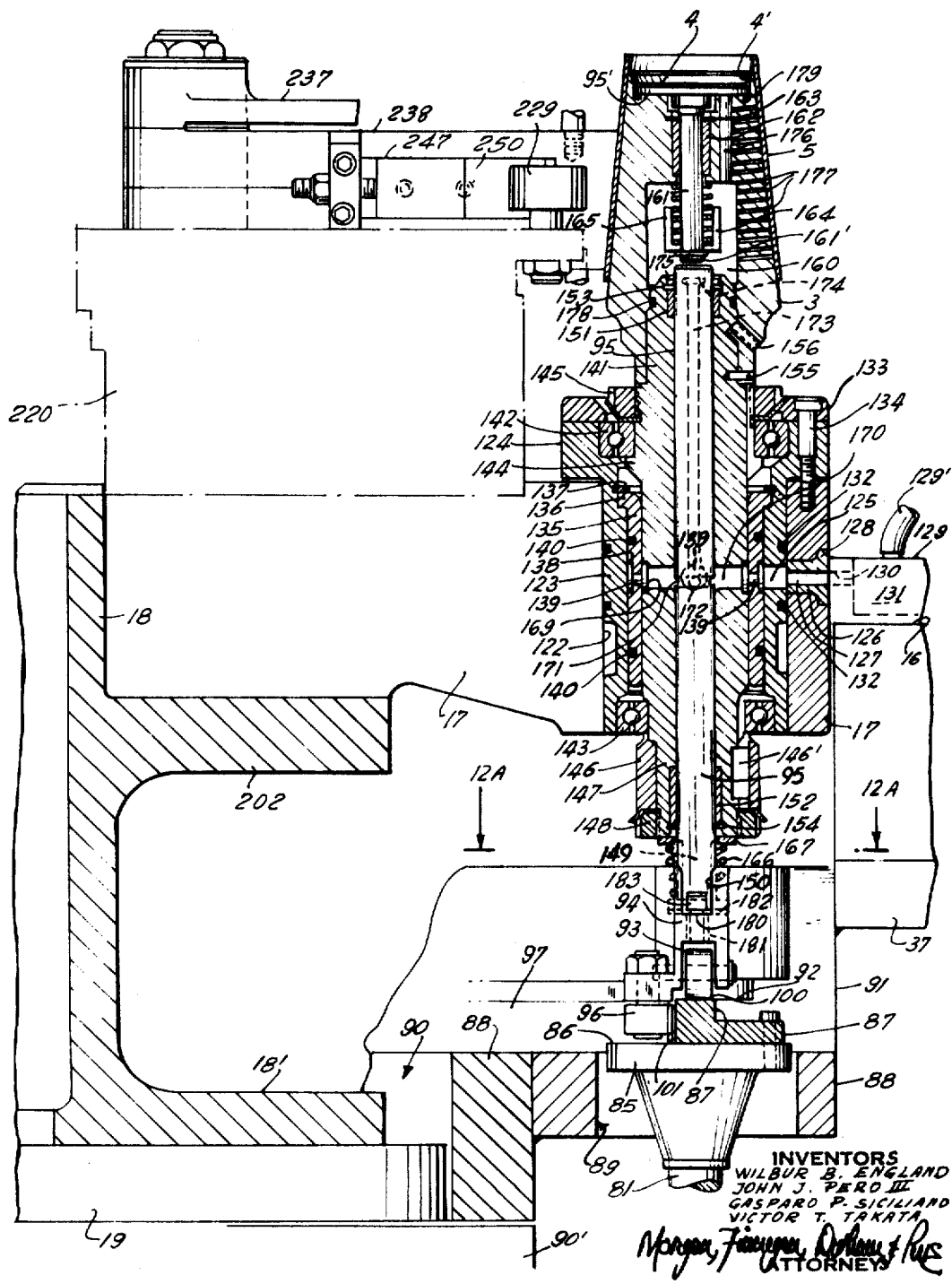
Figure 13:
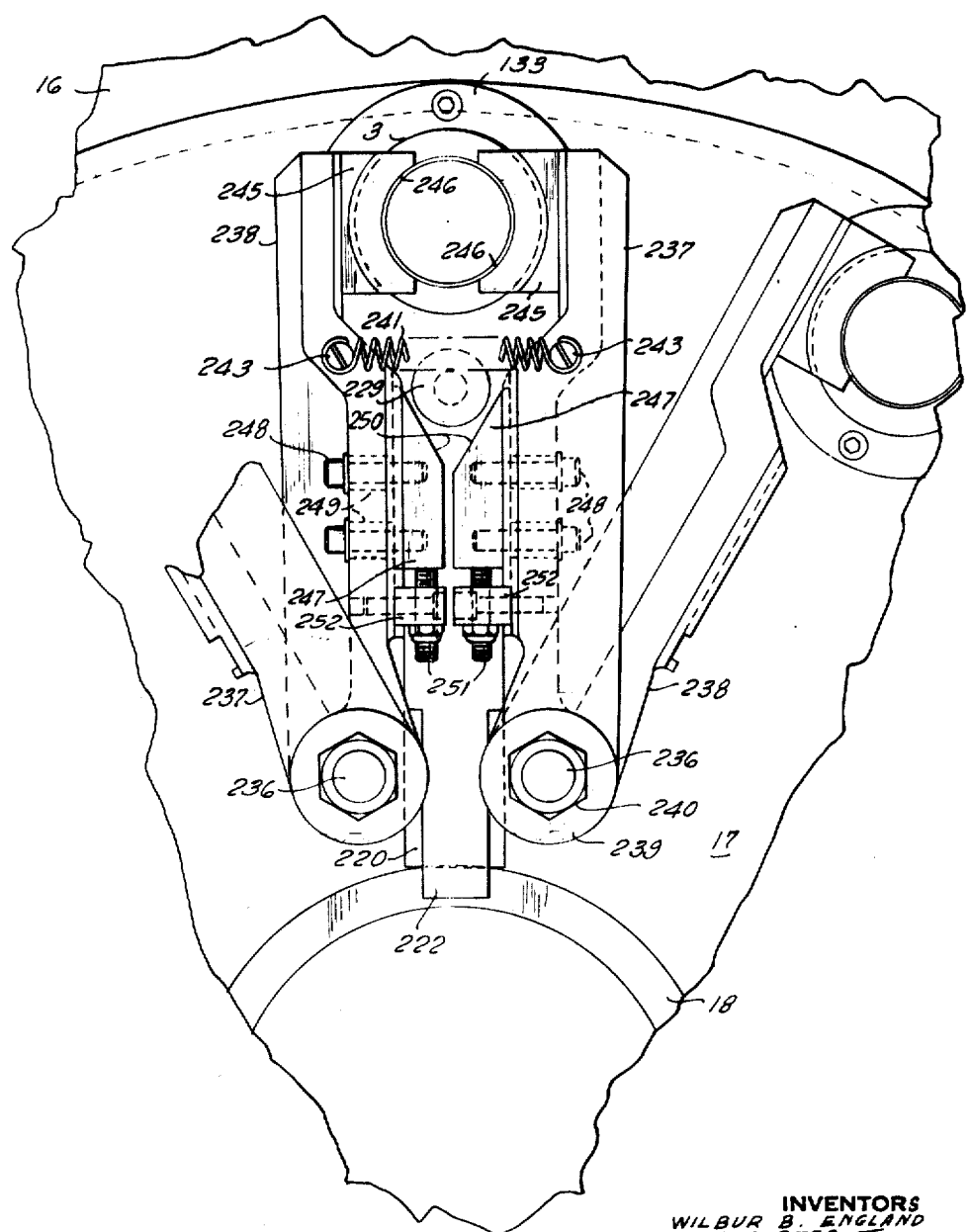
Figure 14:
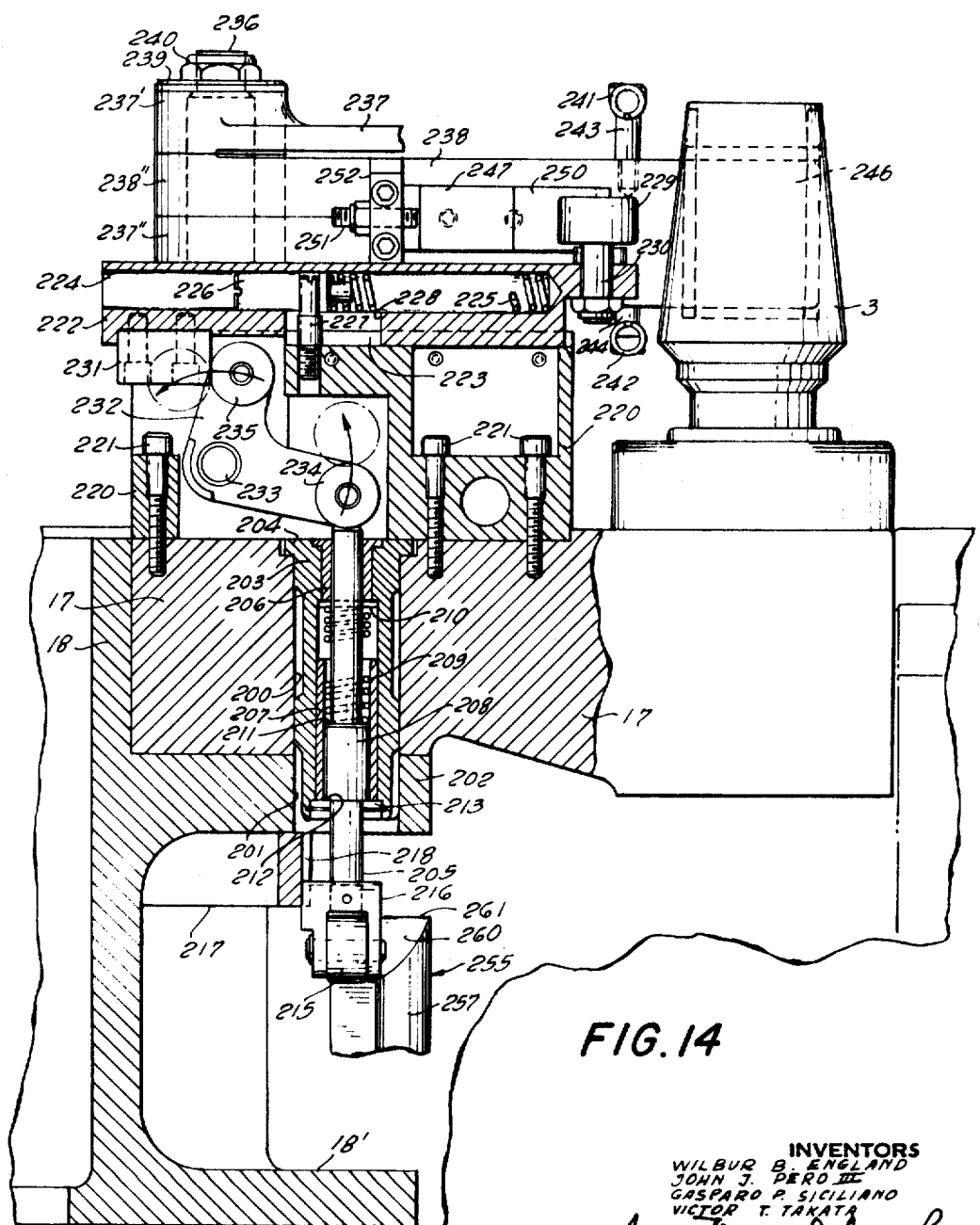
Figure 14A:
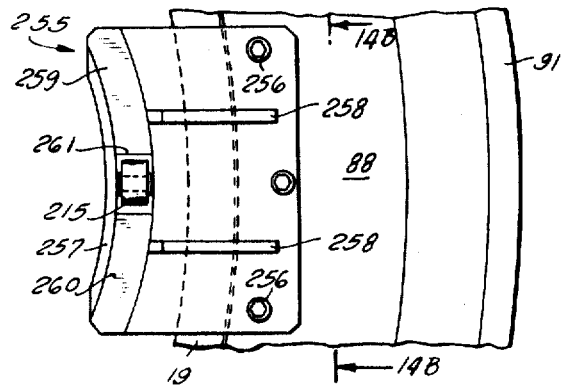
Figure 14B:
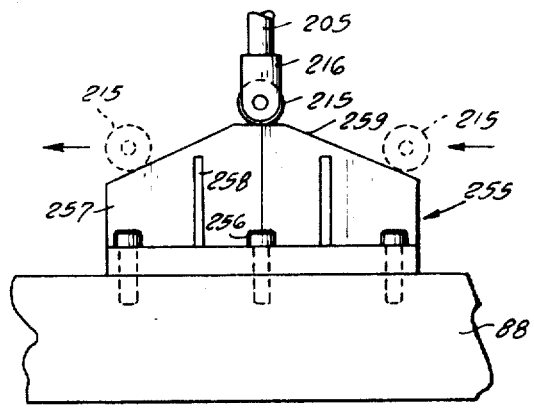
Figure 14C:
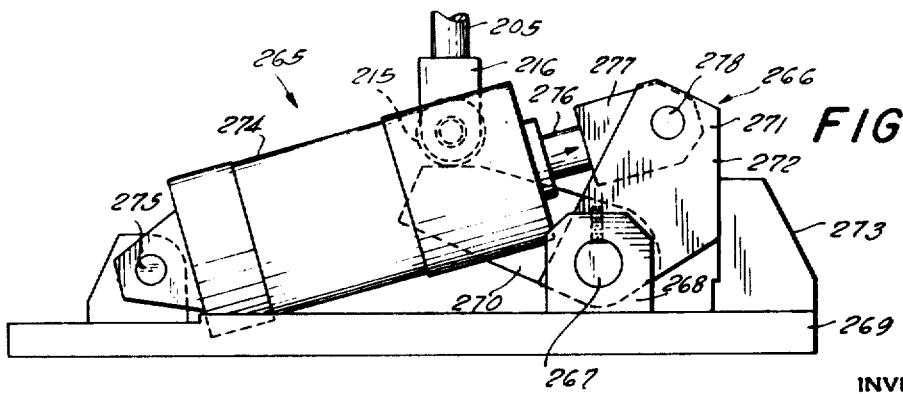
Figure 16A:
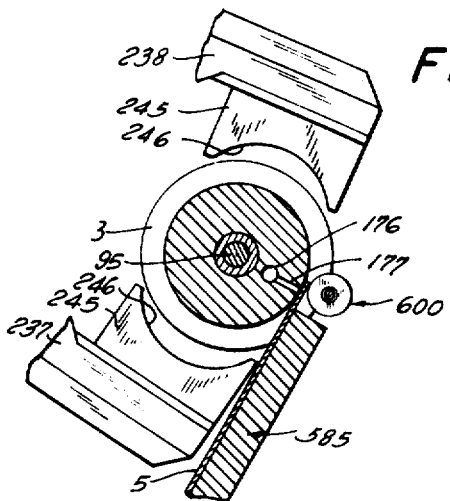
Figure 16B:
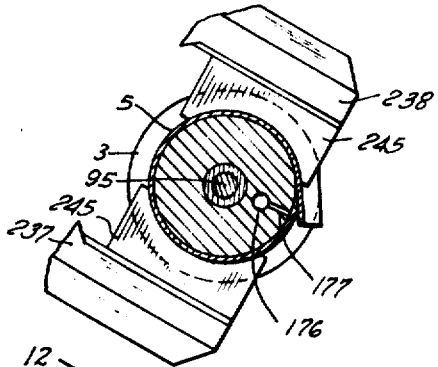
Figure 12A:
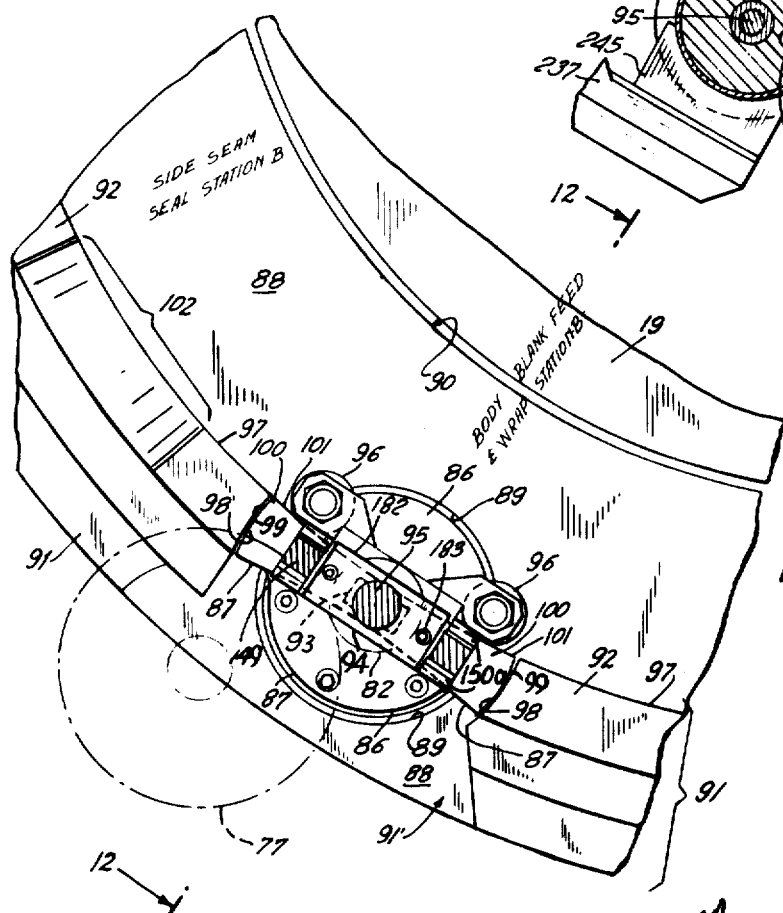
Figure 18:
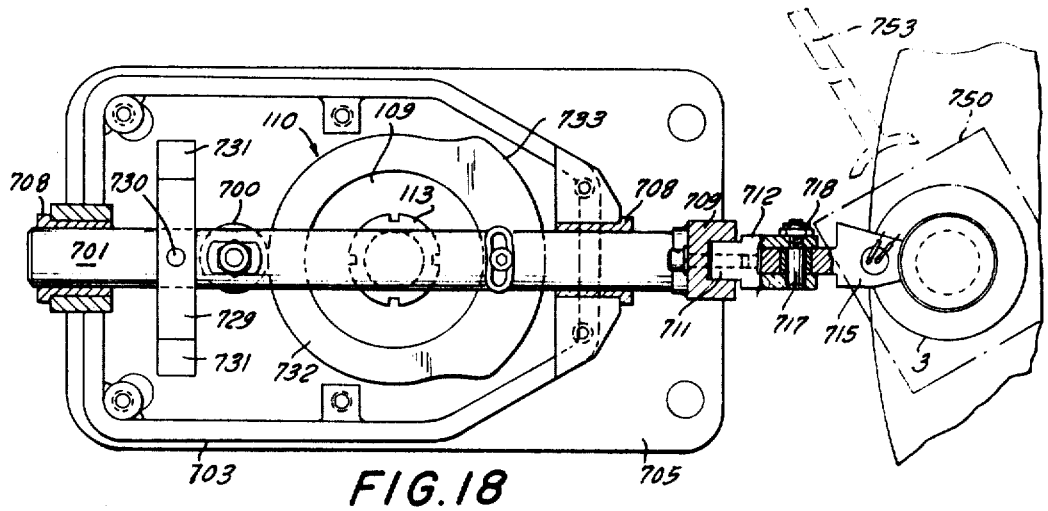
Figure 18A:
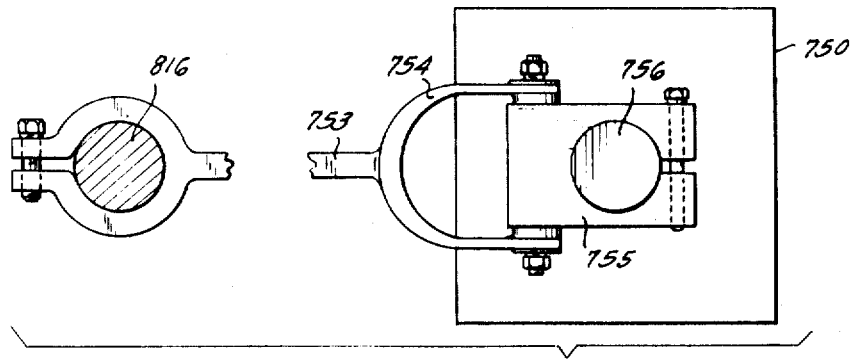
Figure 18B:
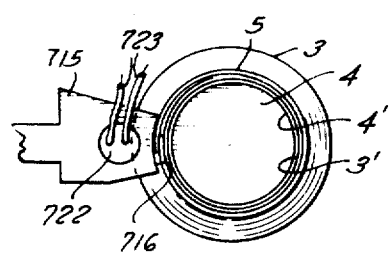
Figure 23A:
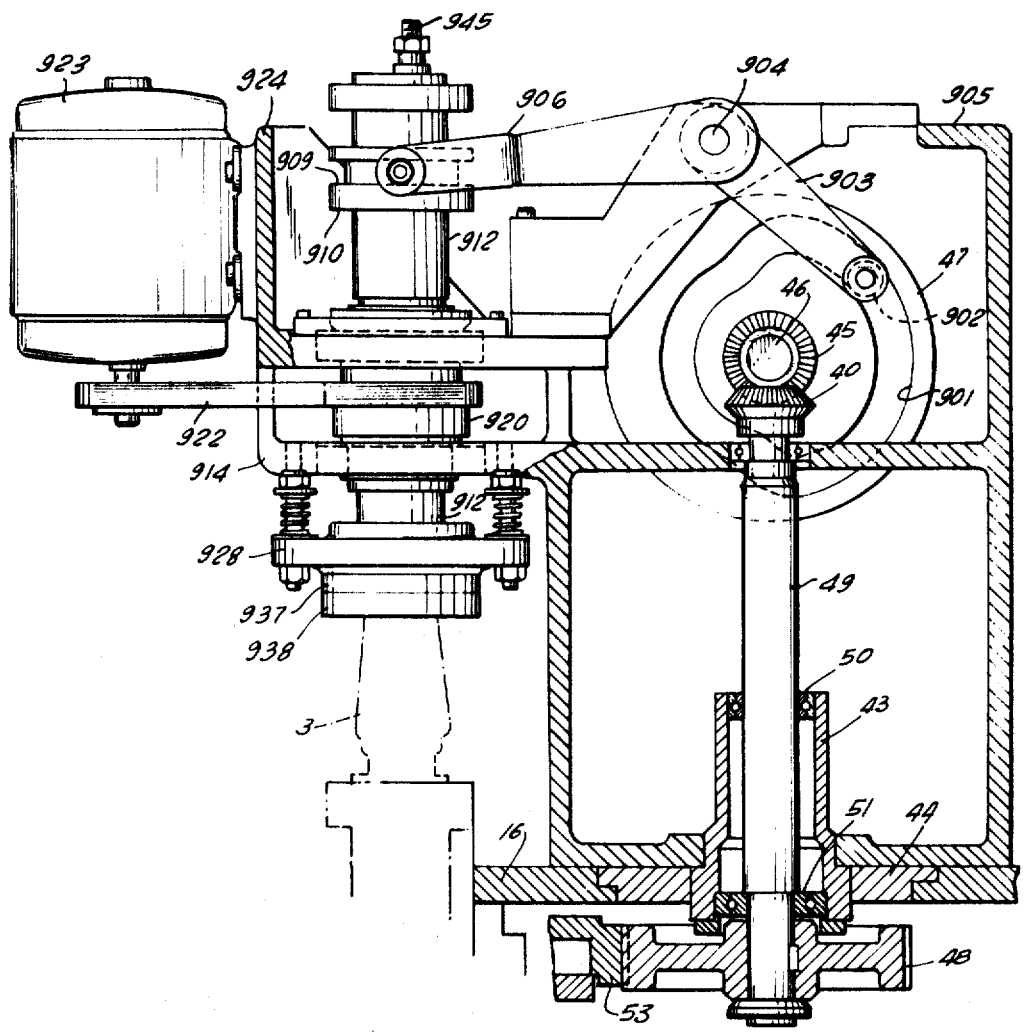
Figure 25:
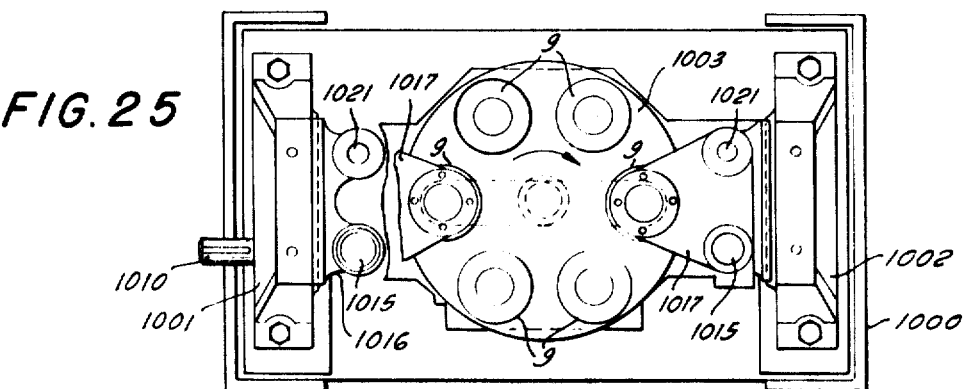
Figure 26:
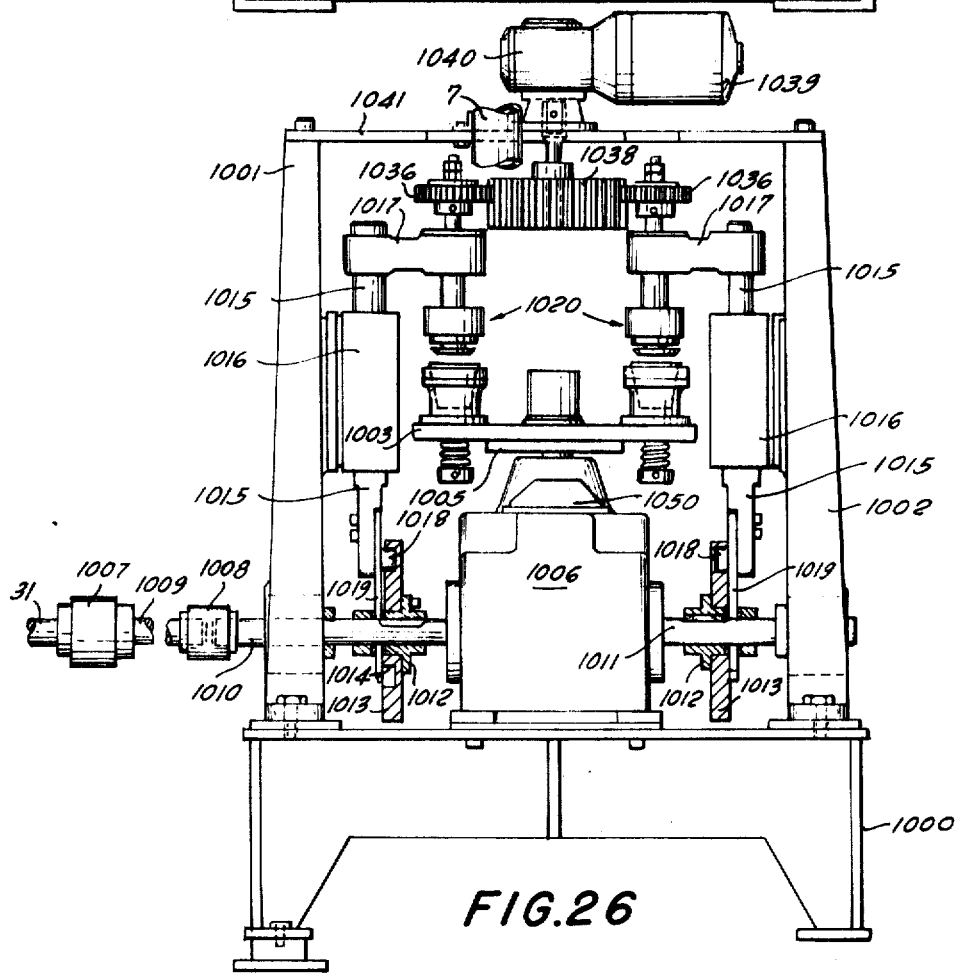

FIGURE 3 is a schematic view in plan of the apparatus of FIGURE 2, the view depicting the arrangement of the primary assembly of cup-making stations on the primary turntable unit and the arrangement of the secondary assembly on the secondary turntable unit;

FIGURE 4 is a view in plan of the main drive system for the stations of the primary and secondary turntable units of FIGURE 3;

FIGURE 5 is a view in elevation, taken along the line 5—5 of FIGURE 4 of the main drive system, the view showing, in particular, the main motor unit, the gear reduction unit, and the brake-clutch assembly coupling these units;

FIGURE 6 is a part-sectional view in elevation taken along the line 6—6 of FIGURE 4, the view showing in particular the mounting and arrangement of the mandrel-carrying turret of the primary turntable unit and also showing the driving connections between the main drive system, the turret drive, and certain of the station drives of the primary station assembly;

FIGURE 7 is a part-sectional view in elevation taken generally along the line 7—7 of FIGURE 4 and showing the driving connections between the main drive system, the mandrel drive, and certain of the station drives of the primary station assembly;

FIGURE 8 is a view in vertical section taken along the line 8—8 of FIGURE 11, of the bottom-blank feed mechanism located at each of the two bottom blank feed stations, the view showing the bottom blank stripper and draw punch in retracted position for inserting a bottom blank in a recess in the underlying mandrel;

FIGURE 8A is a fragmentary view in vertical section of a detail of the bottom blank feed shuttle of the feed mechanism of FIGURE 8;

FIGURE 9 is a view in front elevation with parts in section of the bottom blank feed mechanism of FIGURE 8, the view showing the twin bottom blank magazines and details of one of the twin bottom blank vacuum disc pickers;

FIGURE 9A is a fragmentary view in vertical section of one of the disk pickers of FIGURE 9 in position for removing a bottom blank from its magazine;

FIGURE 9B is a fragmentary view in elevation with parts in section, of a portion of the bottom blank feed mechanism, the view showing the bottom blank draw punch and stripper in extended position with the bottom blank seated in the top of a mandrel located at the bottom blank feed station;

FIGURE 10 is a view in section of the bottom blank feed mechanism, taken along the line 10—10 of FIGURE 8, the view showing details of the draw punch and stripper cam drive system;

FIGURE 11 is a view in plan of the bottom blank feed mechanism, taken along the line 11—11 of FIGURE 8, the view showing details of the picker drive;

FIGURE 12 is a view in elevation with parts in section of a typical mandrel at a wrapping station, the view showing both a bottom blank and a body blank on the mandrel;

FIGURE 12A is a view taken along the line 12A—12A of FIGURE 12 and showing details of the mandrel wrapping-cam drive;

FIGURE 13 is a fragmentary view in plan of a typical mandrel clamp carried by the mandrel turret, the view showing the clamp jaws in closed position about a typical associated mandrel with body blank wrapped thereon;

FIGURE 14 is a view in side elevation with parts in section of the clamp-mandrel assembly of FIGURE 13, the view showing details of the drive mechanism, including cam and cam-follower, for opening and closing the mandrel clamp jaws at the cup blow-off stations;

FIGURE 14A is a view in top plan of the clamp-actuating cam depicted in FIGURE 14;

FIGURE 14B is a view in side elevation illustrating the profile of the arcuate cam depicted in FIGURE 14A;

FIGURE 14C is a view in side elevation of the special pneumatically-actuated cam-follower actuating device for opening, and closing the clamp jaws at the wrapping stations only;

FIGURE 15 is a view in side elevation of a typical body blank feed mechanism located at each wrapping station;

FIGURE 15A is a view in section of the body blank feed mechanism of FIGURE 15 taken along the line 15A—15A of FIGURE 15;

FIGURE 15B is a view in section of a portion of the body blank feed mechanism of FIGURE 15 taken along the line 15B—15B of FIGURE 15C;

FIGURE 15C is a view in plan of the feed mechanism of FIGURE 15 taken along the line 15C—15C of FIGURE 15;

FIGURE 16 is a view in plan of the body blank wrap roller, and actuating mechanism, the view showing the roller in its forward or extended position relative to the mandrel with the latter located in a wrapping station;

FIGURE 16A is a fragmentary part-sectional view of a mandrel located at a wrapping station with the mandrel clamp open and the body blank in position at the start of the body blank wrapping operation;

FIGURE 16B is a view corresponding to FIGURE 16A but with the parts positioned as they would appear at the finish of the wrapping operation;

FIGURE 17 is a view in side elevation of the body blank wrapping roller and actuating mechanism, the view showing the roller in its rearward or retracted position relative to the mandrel as it would appear at the completion of the wrapping operation;

FIGURE 18 is a view in top plan of one of the two side sealing mechanisms located at the two side seam sealing stations;

FIGURE 18A is a broken view in top plan of the pre-heater located at the side seam seal station and carried by the vertical shaft of the pre-former;

FIGURE 18B is a fragmentary view in plan of a detail of the heater of the side seam sealer of FIGURE 18, the view showing the relationship of the heater, side seam overlap and mandrel during the sealing operation;

FIGURE 19 is a view in side elevation with parts in section of the side seam sealing mechanism, the view also showing a detail of the bottom pre-heater;

FIGURE 19A is a fragmentary part sectional view in elevation of the mandrel at the sealing station, the view showing the cup bottom in elevated position from the mandrel recess bottom during sealing;

FIGURE 20 is a view in vertical section of one of the two identical bottom pre-forming units, the view showing the preforming die in retracted position;

FIGURE 20A is a fragmentary view in elevation with parts in section of the pre-forming die in extended bottom pre-forming position;

FIGURE 21 is a view in front elevation of the pre-forming unit of FIGURE 20;

FIGURE 22 is a fragmentary view in vertical section of the pre-forming unit of FIGURE 20, the view showing details of the drive mechanism;

FIGURE 23 is a view in vertical section of one of the two identical bottom roll-out units;

FIGURE 23A is a view in side elevation with parts in section of the bottom roll-out unit of FIGURE 23;

FIGURE 23B is a view in section taken along the line 23B—23B of FIGURE 23 and showing a detail of the roll-out roller mounting;

FIGURE 24 is a view in top plan of the bottom roll-out unit of FIGURE 23;

FIGURE 25 is a view in top plan of the rim-rolling turntable unit of the assembly of FIGURES 2 and 3;

FIGURE 26 is a view in elevation of the unit of FIGURE 25;

FIGURE 27 is a view in vertical section through one of the two identical rim-rolling units of the unit of FIG- URE 26, the view showing the rim-rolling die in its retracted position;

FIGURE 27A is a view in vertical section and to an enlarged scale of a detail of the rim-rolling unit of FIGURE 27, the view showing the rim-rolling die in extended rim-rolling position; and FIGURE 27B is a part-sectional view in elevation of a detail of the unit of FIGURE 27, showing blow-off of a finished cup from the unit.

General description

Referring now more particularly to the embodiment of the invention illustrated by way of example in the accompanying drawings, there is depicted schematically in FIGURE 1 the cyclic series of operations followed in each of two identical sets of primary and secondary cup-making stations provided for the making of two finished cups simultaneously. For convenience, the stations of the two sets are designated A and B, respectively. The A stations are divided between a primary turnable unit designated generally by the numeral 1 and a secondary or rim-rolling turntable unit designated generally by the numeral 2. More specifically and as here preferably embodied, the A stations on the primary turntable unit are six in number and those on the rim-rolling turntable unit are three in number. The B stations are correspondingly divided.

The A and B stations on the primary turntable unit 1 are arranged in a circular row, the stations being at equal angular distances from each other. Each station is occupied by a cup-forming frusto-conical mandrel 3, the mandrels 3, as shown, being spaced at 30° intervals from each other and the entire circular row of mandrels being rotatable as a unit on an axis concentric with the row. Thus, as the circular row of mandrels rotates on its axis, each and every mandrel moves progressively in step-wise fashion through all of the stations of the circular row in one complete revolution.

The sequence of operations performed at the six A stations of the primary turntable unit in FIGURE 1, commences with the arrival of an empty mandrel 3 at the Bottom Blank Feed Station A. At that instant, and with the mandrel at rest, a cup bottom blank 4 of disc-shape is deposited from a bottom blank magazine into a recess 3' in the upper end of the stationary mandrel 3. The bottom blank is die-formed during this operation, as will be more fully described hereinafter, so as to have a circumferentially extending up-standing rim 4' when seated in the mandrel recess 3'. The entire row of mandrels 3 is then rotationally indexed through 30° to the next station.

By this indexing the mandrel carrying the formed bottom blank 4 is advanced from the Bottom Blank Feed Station A into the Body Blank Feed and Wrap Station A, is there brought to rest, and a body blank 5 of suitable shape and material is applied from a magazine to the conical surface of the mandrel. The body blank is held, by suction applied to one end, to the mandrel and the mandrel is caused to rotate on its vertical axis of revolution to wrap the body blank closely, from end to end, around the mandrel with one pair of opposite ends of the body blank overlapping to form a side seam. The body blank is thereafter clamped to the mandrel.

The mandrel row is again indexed to advance the mandrel to the next station, the Side Seam Seal Station A, where, with the mandrel at rest, the side seam is heat-treated so as to sealingly bond the overlapping ends together. At this station also, the bottom end of the cup which is in the process of being made, is subjected to a pre-heating operation preparatory to preforming of the bottom. Upon completion of this operation, the mandrel row is again indexed to advance the mandrel from the Side Seam Seal Station A to the next station, the Bottom Pre-Form Station A.

At the Bottom Pre-Form Station A, the extending upper end of the body blank 5 is folded radially inwardly and axially downwardly into facing engagement with the axially up-standing rim 4' of the bottom blank 4. Upon completion of the pre-forming operation, indexing again follows to move the mandrel into the next or Bottom Roll-Out Station A.

In the latter, the inwardly folded end of the body blank is sealingly bonded to the bottom blank by suitable bottom rollout means to be described hereinafter and, upon completion of this operation, indexing of the mandrel row is effected to move the mandrel into the next station, the Blow-Off Station A.

At the Blow-Off Station A and with the mandrel at rest, an air blast applied to the inside of the semi-finished cup 6 strips it from the mandrel 3 and propels it through a transfer conduit 7 to the Rim Rolling Receiving Station A of the rim-rolling turntable unit 2. The cup in transit is rotated through 180° in a vertical plane.

Indexing of the primary turntable row of mandrels 3 follows to move the stripped mandrel 3 from the Blow-Off Station A into the Bottom Blank Feed Station B for application thereto of a bottom blank as the start of the B station sequence of operations. It will be understood that the application of a bottom blank at the Bottom Blank Feed Station B occurs simultaneously with the application of a bottom blank at the Bottom Feed Station A, the operations in each pair of corresponding A and B stations being carried out simultaneously. Thus, two semi-finished cups are produced to each 180° of revolution of the mandrels 3 through the series of stations A and B.

In a manner similar to that described for Blow-Off Station A, the cup 6 discharged from the Blow-Off Station B is propelled by an air blast through a transfer conduit 8 to a Rim-Rolling Receiving Station B of the rim-rolling turntable unit 2.

Each of the stations A and B of the secondary turntable unit 2 is provided with a number of hollow die receptacles 9, one at each station, in which the semi-finished cups 6 are seated and held with their open end up during the rim-rolling operation. The receptacles 9 are arranged in a circular row at equal angular distances from each other, in this case at 60° intervals.

The circular row of receptacles 9 is caused to revolve in steps in suitably timed relation to the step-wise revolution of the circular row of mandrels 3. Thus, upon two semi-finished cups 6 from Blow-Off Stations A and B being simultaneously deposited in Rim-Rolling Receiving Stations A and B, respectively, through transfer lines 7 and 8, respectively, the row of die receptacles 9 is indexed 120° to advance the cups from Receiving Stations A and B, respectively, into Rim-Rolling Stations A and B, respectively. With the receptacles at rest, the rim-rolling operation is performed on both cups simultaneously by rim-rolling means described hereinafter. Upon completion of this operation, the row of receptacles 9 is again step-wise indexed 120° to advance the finished cups from the Rim-Rolling Stations A and B, respectively, into the Stacking Stations A and B, respectively. While the receptacles 9 are at rest in the latter the two cups are discharged by air blast from the Stacking Stations A and B through transfer conduits 10 and 11, respectively. The cups discharging from the conduits 10 and 11 may be stacked and accumulated in suitable packaging containers (not shown) for storage and shipment.

Although the foregoing description is concerned with the manufacture of two cups simultaneously during each sequence of operations, it will be apparent that if it be desired that more than two cups be made simultaneously the number of sets of primary cup-making stations on the turntable unit 1 will be increased accordingly. It follows that, as the number of sets of stations is increased, the angular spacing between stations must be decreased commensurately. Hence, for a turntable unit of given diameter, the number of sets permissible will be dictated by practical engineering considerations, including size of station mechanisms required, drive line mechanisms and power requirements, ease of servicing and maintenance, and other considerations which will be readily apparent to those skilled in this art.

Also, while the following detailed description relates to a preferred embodiment of the invention, in which there is simultaneously produced a plurality of frusto-conical cups from paper blanks coated with a thermosetting polymerizable resin, it will be understood that the materials of construction and the shape of the cup formed are in no way limited by the method and apparatus of the invention herein described. Thus, for example, the cups may also be formed from a flexible plastic material. As another example, the side and bottom of the cup may be sealingly bonded by means of an adhesive material applied along one straight edge and one arcuate edge of the body blank. As another example, the cup-forming mandrel may be cylindrical in shape and the body blank rectangular so as to form a container having a cylindrical configuration.

Thus, it will be understood that the foregoing general description and the following detailed description as well are exemplary and explanatory of the invention but are not restrictive thereof.

Primary turntable main drive mechanisms

The primary turntable unit 1, as depicted in FIGURES 4–7, comprises a stationary rigid circular hollow base 15 which provides a strong and highly rigid supporting structure for an annular station platform 16 to which the several station mechanisms, to be described hereinafter, for carrying out the individual cup-making operations are removably mounted in a circular row.

Concentric with the station platform 16 is a smaller diametered annular rotatable mandrel turret 17 which, as is best seen in FIGURE 6, carries a circular row of mandrels 3, one for each station. The turret is mounted, by means of an annular flanged adapter 18, to a circular indexing table or dial 19, for step-wise rotation therewith on a vertical axis successively into and through positions opposite twelve fixed cup-making stations located in a circular row on the platform 16 at 30° angular intervals from each other. These stations will be more fully described hereinafter.

The indexing table 19 forms a rotational part of an indexing unit 20 supported on the base 15 and having interiorly and for the purposes hereof, a rotary twelve stop precision commercial indexing cam (not shown) for effecting precise stepwise rotation of the dial 19. The indexing unit 20, as here preferably embodied, is a commercial unit such, for example, as manufactured by the Commercial Cam & Machine Co., St. Louis, Mo.

The precision rotary cam of the indexing unit 20 is driven by means of a primary drive unit 21 supported by the base 15. The unit 21, preferably, comprises an electric motor-driven so-called "Vari-Drive" unit having a control wheel 21', adjustable manually at will in known manner to vary the rotational speed of the output drive shaft 22 within desired limits and, hence, to vary the speed of the indexing table 19. The output drive shaft 22 of the drive unit 21 is coupled through an electric clutch 23, an electric brake 24 and input drive shaft 24' to a suitable gear reducer 25 which, in turn, is coupled by a suitable output drive shaft 26 to the indexing cam (not shown) located internally of the indexing unit 20. Preferably, the gear reducer 25 provides a gear reduction ratio of 25 to 1 but other and different ratios may prove desirable or advantageous depending on production requirements and other factors. An output shaft 27 leading from the indexing cam of the indexing unit 20, rotates continuously and is coupled by a coupling collar 28 to the input drive shaft 29 of a mitre gear box 30.

The mitre gear box 30 is mounted firmly to the base 15 and serves to drive the majority of the various cup-making mechanisms located at the several primary stations on the stationary annular platform 16, as well as to drive the rotary turrent of the rim-rolling secondary turntable unit 2. A horizontal output shaft 31 is provided for driving the latter and is operatively suitably connected thereto as will be more fully described hereinafter. An output drive shaft 32 extends vertically upwardly from the mitre box through the annular top 15' of the base 15 and carries, at its upper end, a primary pinion drive gear 33 which is removably keyed to the shaft 32 for rotation therewith.

The hub 34 of primary pinion gear 33 is journalled at its lower end in an annular bearing housing 35 which, in turn, is removably secured in an opening 36 provided in an annular lower bearing platform 37 concentric with station platform 16.

The lower bearing platform 37 and the upper station platform 16 are welded or otherwise suitably interconnected into a unitary rigid structure by means of a cylindrical side wall member 38 concentric therewith.

The hub 34 of primary pinion gear 33 is extended axially upwardly through the station platform 16 to provide a vertically extending drive shaft 39 for driving the bottom rollout unit located at Bottom Roll-Out Station B on the station platform 16.

The bottom roll-out station drive shaft 39 terminates above the platform 16 in a bevel gear 40 and is journalled for rotation with the pinion gear 33 in suitable anti-friction bearings 41 and 42 carried by a circular bearing housing 43. The latter is seated in and carried by an annular bearing housing support plate 44 which, in turn, is removably anchored to the platform 16 in a suitable opening provided therein.

The bevel gear 40 meshes with and serves to drive a complementary bevel gear 45 secured to a horizontal drive shaft 46 for rotating an actuating cam such as actuating cam 47 (FIGURE 23A) of the bottom roll-out mechanism there shown and to be described more fully hereinafter in connection with the bottom roll-out unit of FIGURES 23, 23A, 23B and 24.

Diametrically opposite the Bottom Roll-Out Station B in FIGURES 4 and 6 is located Bottom Roll-Out Station A and, as is depicted in FIGURE 6, primary drive mechanism therefor is provided and comprises a pinion gear 48 of the same pitch diameter as pinion gear 33 and keyed to an output shaft 49. Shaft 49 is journalled for rotation in anti-friction bearings 50 and 51 carried in bearing housing 52. The latter, in turn, is seated in and carried by housing support plate 44 anchored removably in a suitable opening in the station platform 16.

The shaft 49, like shaft 39, carries a bevel gear 40 meshing with and serving to drive a complementary bevel gear 45 secured to horizontal input drive shaft 46 for rotating actuating cam 47 (FIGURE 23A) of the Bottom Roll-Out Unit shown in FIGURES 23, 23A, 23B and 24.

A ring-gear 53 (FIGURE 6) concentric with the turret 17 inter-connects the pinion gears 33 and 48. The ring-gear is driven by the primary pinion drive gear 33, thereby to drive the pinion gear 48 at the same rotational speed. The ring-gear is mounted to a suitable annular anti-friction bearing 54, which, in turn, is mounted to an annular bearing support 55 located between, and secured to the lower annular bearing platform 37 and the upper annular station platform 16.

The ring-gear 53 also serves as a primary drive member for the individual primary station mechanisms located at the remaining stations of the two sets of primary stations A and B.

As has been noted hereinbefore and as is depicted in FIGURES 3 and 4, there are two identical sets of primary cup-making, namely, set A and set B. It will be understood that, except as has been set forth above with respect to the primary drive mechanisms for the Bottom Roll-Out Stations A and B, the primary drive mechanism for any given primary station in Set A is duplicated for the corresponding primary station in Set B. It follows that a description of one shall be understood to be equally applicable to the other.

Referring now more particularly to FIGURES 4 and 7, there is depicted in FIGURE 7 the primary drive mechanism for the following primary stations in Set B:

Bottom Blank Feed;
Body Blank Feed (and Wrap); and
Side Seam Seal.

The primary drive for the Bottom Blank Feed Station B, comprises a primary pinion gear 56 keyed to a primary drive shaft 57 which is journalled at its upper end for rotation in suitable anti-friction bearings 58 and 59 and is journalled at its lower end in a suitable anti-friction bearing 60. The bearings 58 and 59 are carried by a removable bearing housing 61 which, in turn, is carried by a removable bearing support plate 44. The bearing 60 is mounted to and carried by the lower bearing platform member 37. The pinion gear 56 meshes with the ring gear 53 so as to be driven thereby and to rotate shaft 57. Shaft 57 is co-axially coupled at its upper end by a collar 62 to an input drive shaft 63 of the Bottom Blank Feed Unit shown in FIGURE 8 and to be described more full hereinafter.

The primary drive shaft 57 is co-axially vertically aligned with an input drive shaft 63' of a mitre box 64 and is suitably detachably coupled to the shaft 63' by an intermediate coupling shaft 65 and upper and lower coupling collars 66 and 67, respectively.

The primary drive for the Body Blank Feed Station B is best seen in FIGURES 4 and 7. As here preferably embodied, the input drive shaft 63' to the mitre box 64 is extended axially below the box to provide an output drive shaft 65 to which is mounted a drive sprocket 66 for rotation therewith. A roller chain 67 operatively couples the sprocket 66 to an equal-diameter sprocket 68 mounted to the lower end of a vertical primary input drive shaft 69 for the Body Blank Feed Unit depicted in FIGURES 15, 15A and 15B. Thus, as the ring gear 53 is caused to rotate by power transmitted thereto from the main drive 30 (FIGURE 6) via input shaft 32 and pinion gear 33, the input drive shaft 69 to the Body Blank Feed Unit B is driven at a uniform rotational speed corresponding to that of the input shaft 32. The construction and operation of the Body Blank Feed Unit B will be described more fully hereinafter.

The primary drive for rotating the mandrels 3 when they are at the Body Blank Feed (and Wrap) Stations A and B (FIGURE 4), is best seen in FIGURES 4 and 7. Means are provided for rotating each mandrel 3 on its vertical axis through one complete revolution when the mandrel is on station at one of the other of the Body Blank Wrapping Stations A and B. This rotation of the mandrel is designed to effect wrapping of the Body Blank 5 around the mandrel, all as will be more fully described hereinafter.

The mandrel rotating means is depicted in FIGURES 7, 12 and 12A with reference to a mandrel at Body Blank Wrapping Station B. As here preferably embodied, the mandrel rotating means comprises a drive shaft 70 (FIGURE 7) leading from the mitre gear box 64. The shaft 70 is rotated by the drive shaft 63' of the gear box, through suitable 45° bevel gearing therein (not shown) at the same rotational speed as the drive shaft 63'. The shaft 70 is coupled to a drive shaft 72 of an indexing cam unit 73, by means of a collar 71.

The indexing cam unit 73 may be a commercial cam unit having, internally, a continuously rotating 12-stop precision indexing cam (not shown) driven by shaft 72 and, in turn, driving a rotatable output shaft 74 extending vertically from the cam unit. The shaft 74 is indexed rotationally by the indexing cam to rotate 90° in azimuth, when mandrel is on wrapping station, after each 30° step-wise movement of the mandrel turret 17. This 90° movement of the shaft 74 is stepped up by suitable gearing means to effect a 360° rotation of the mandrel when on station in the Body Blank Wrapping Station B.

The step-up gearing means, as here preferably embodied, comprises a pinion drive shaft 76 coupled to the indexing cam output shaft 74 by a collar 75 and provided with a driving pinion gear 77 rotatable therewith. The shaft 76 is journalled by means of a pair of suitable anti-friction bearings 78 and 79 in a gear box 80. A parallel jack shaft 81 in the gear box 80 has mounted thereto a driven pinion gear 82 operatively meshing with the pinion gear 77 so as to be rotated thereby and, in turn, rotate the jack shaft 81. The latter is journalled for rotation in suitable anti-friction bearings 83 and 84 carried by the gear box 80. The gears 77 and 82 have a ratio of diameters of 4:1 so that the 90° movement of the driving gear 77 will effect the desired 360° movement of the driven gear 82 and its shaft 81.

The driven shaft 81 terminates at its upper end in an enlarged wrapping head 85 of, preferably, circular configuration and having a flat circular top surface 86 supporting a wrapping cam 87 (FIGURE 12).

An annular cam track platform 88, FIGURES 7, 12 and 12A, having a pair of diametrically opposite circular openings 89 located at the Body Blank Wrap Stations A and B, respectively, is mounted to the base structure 15 concentric with the turret-indexing dial 19 and with the base 18' of the dial and turret adapter 18. The platform 88 telescopically receives dial 19 and base 18' within its central opening 90. A supporting structure 90' fixedly secures the platform 88 to the base 15 so as to provide a firm, rigid and ample lower support for the platform. The gear box 80 enclosing the gear train 77, 82 is suitably removably secured below and to the cam track platform 88.

An annular stepped cam track member 91 is mounted to the cam track platform 88 in the central opening of the annular bearing platform 37. The cam track member 91 is concentric with the turret 17 and is welded or otherwise suitably fixedly secured to the platform 88 and to the bearing platform 37. The track member 91 is interrupted circumferentially at diametrically opposite locations coinciding with the Body Blank Feed and Wrap Stations A and B to provide a radial opening 91' (FIGURE 12A) at each such station. The mandrel wrapping head 85 with its upstanding wrapping cam or turning bar 87, is accommodated in this opening.

As is best seen in FIGURE 12A, the stepped cam track member 91 is provided with an annular cam track surface 92 for raising and lowering a piston 95' in the mandrel 3, FIGURE 12. To this end, surface 92 is normally engaged by a roller 93, FIGURE 12, rotatably mounted to a mandrel cam follower bracket 94 which, in turn, is carried by and at the lower end of a central push rod 95 of the mandrel 3. The push rod 95 functions at predetermined intervals to elevate the spring-pressed piston 95' and hence a bottom blank 4 in the mandrel recess 3', from the seated position during the body blank wrapping, shown in FIGURE 12, to an elevated position, shown in FIGURE 19A, wherein the annular rim 4' of the bottom blank is in close-fitting circumferential engagement with the body blank 5, all as will be more fully described hereinafter. The rollers 93 of the mandrels 3 ride the track surface 92 as the turret 17 carrying the mandrels rotates.

Also carried by the mandrel cam follower bracket 94 are a pair of wrapping rollers 96 which, as is best seen in FIGURE 12A, are disposed for rolling engagement with the innermost cylindrical surface, 97, of the cam track member 91. To this end also, the pair of opposing end surface portions 98 of the cam track member 91 in each radial opening 91', are of cylindrical configuration at opposing ends of the cam track 92, the portions 98 being concentric with the common vertical rotational axis of the wrapping cam or turning bar 87 and the mandrel 3. The wrapping cam 87 traverses the opening 91' and is provided with cylindrical end surfaces 99 concentric with the cam back member end surface portions 98 and in closely-spaced relation thereto. Thus, the wrapping head 85 and cam 87 can rotate in the opening 91'.

The top surface 100 of the wrapping cam 87 lies in the plane of the cam track surface 92 at the opening 91' and provides a cam track portion bridging the opening 91' between the cam track end portions 98 for travel of the mandrel push-rod roller 93.

A pair of oppositely-disposed side faces 101 of the wrapping cam 87 span the opening 91' between the opposing ends 98 of the cam track 92. The inner face 101 thus forms a continuation of the inner cylindrical surface 97 of the cam track member 91. The faces 101 have the same radius of curvature as the surface 97 so that the wrapping rollers 96 are able freely to travel the surface 101 across the opening 91'.

It will be apparent from the foregoing that, with the mandrel 3 at rest in the Wrapping Station as depicted in FIGURE 12, in which position the rotational axes of the wrapping head 85 and the push rod 95 are co-axially aligned, revolution of the wrapping head on its axis will cause the wrapping cam 87 to rotate the pair of wrapping rollers 96 and the cam follower bracket 94 as a unit around the same axis, and thus rotate the push rod 95 on the same axis. This rotation of the cam follower bracket 94 also effects a corresponding rotation of the mandrel as will be described more fully hereinafter. Upon completion of a single rotation, the mandrel-carrying turret 17 is indexed by the indexing unit 20 to rotate the turret 30° and thus move the mandrel from the Wrapping Station B to the next station, the Side Seam Seal Station B shown in FIGURES 3 and 4. In so doing, the roller 93 travels clockwise, as viewed in FIGURE 12A, along the top surface 100 of the wrapping cam 87 onto the cam track 92. Similarly, the wrapping rollers 96 travel along the inner circumferential surface 101 of the wrapping cam 87 onto the wrapping roller cam track surface 97. It will be understood that the same conditions obtain at the Body Blank Feed and Wrap Station A.

After the roller 93 has moved along the cam track portion 92 through an angle in azimuth of about 15° from the Body Blank Wrapping Station B toward the Side Seam Seal Station B, it engages and ascends an inclined surafce portion or ramp 102 of the cam track 92 whereby the mandrel push rod 95 is fully elevated in the mandrel 3 as the mandrel arrives at the Side Seam Seal Station B. Thus, the bottom blank 4 is raised in consequence thereby by the mandrel piston 95' from its seated position in the mandrel recess 3', as shown in FIGURE 12, to its fully elevated position with its rim 4' in firm engagement with the formed body blank 5 as depicted in FIGURE 19A. As best illustrated in FIGURE 4, this elevated condition of the piston 95' is maintained by the circular cam track 92 through the remaining Stations of the B set of Stations, namely, through the Bottom Pre-Form Station, the Bottom Roll-Out Station, and the Blow-Off Station, until the roller 93 reaches a point suitably prior to its arrival at the first of the A set of Stations, namely, the Bottom Blank Feed Station A. Advantageously, this point is approximately 15° before this Station and at this point the roller 93 engages and descends an inclined surface portion or ramp 103 which ends at the same level as the level of the cam track 92 at the Bottom Blank Feed Station B. It follows that by reason of the descent of the roller 93 to this level, the mandrel piston 95', being spring-pressed, is again seated in the mandrel recess 3' for the initiation of the cycle for the A Stations.

As noted above, the Side Seam Seal Station B follows immediately after the Bottom Blank Feed and Wrap Station B. The primary drive mechanism for the Side Seam Seal Station is best seen in FIGURES 7 and 19. As here preferably embodied, a pinion gear 104 is keyed to a primary drive shaft 105 for rotation therewith. The gear 104 meshes with the main ring gear 53 so as to be driven thereby. The shaft 105 is journalled in suitable anti-friction bearing 106 and 107 carried in and by an up-standing bearing housing 108.

The housing 108 is, in turn, mounted fixedly to the annular bearing plate 44 which, in turn, is removably fixedly secured to the annular station platform 16 in a suitable opening therein.

The primary drive shaft 105 carries at its upper end an annular cam hub 109 to which an annular driving cam 110, FIGURE 19, is bolted for rotation therewith. The cam hub 109 is provided with an annular flange 111 concentric with the shaft 105 for receiving and locating the cam. Mounting bolts, of which a single bolt 112 appears in FIGURE 19, secure the cam to the hub. The hub 109 is suitably keyed to the shaft 105 and is releasably secured thereto by a nut 113 threadedly engaging the shaft end. The specific details of construction of the Side Seam Seal mechanism shown in FIGURE 19 will be more fully described hereinafter.

The Bottom Pre-Form Station B fellows immediately after the Side Seam Seal Station B. The primary drive mechanism therefor is depicted in FIGURES 4, 20 and 22 and comprises a pinion gear 114 meshing with ring gear 53. Gear 114 is carried by a drive shaft 115 to which it is keyed for rotation therewith. Shaft 115 is mounted for rotation in a bearing housing 116 by means of suitable upper and lower anti-friction bearings seated in the bearing housing. The upper bearing 117 is shown in FIGURE 22. Bearing housing 116 is secured in a bearing plate 44 which, in turn, is removably secured to upper bearing platform 16 in a suitable opening therein provided.

A bevel gear 118 is mounted to the upper end of the shaft 115 for rotation therewith and meshes with a complementary bevel gear 119 keyed to a shaft 120 and carrying an actuating cam 121 for driving the bottom pre-forming mechanism all as will be more fully pointed out hereinafter.

Typical mandrel unit

Referring now more particularly to FIGURE 12 of the accompanying drawings there is depicted a typical mandrel unit in accordance with this invention. As embodied, the mandrel 3 is adapted to receive a bottom blank 4 in the recess 3' in its top, then to have a body blank 5 applied to it and held at one end by suction, then to be rotated on its vertical axis of revolution through 360° to wrap the body blank around the mandrel preparatory to being clamped thereto, then to have the bottom blank 4 with its upstanding circumferential flange 4' moved axially upwardly by means of piston 95' into close-fitting circumferentially abutting engagement with the inner surface of the body blank 5; and, after the overlapping ends of the body blank have been sealed along its side seam and the bottom of the cup has been pre-heated, pre-formed, rolled-out, and sealed, to blow the partly finished cup off the mandrel to the secondary or rim-rolling turret 2, FIGURE 1, for finishing.

To this end, the turret 17 is provided with a circular row of cylindrical openings 122 concentric with the vertical rotational axis of the turret. As here preferably embodied, the turret is provided with twelve such openings, one for each of the twelve cup-forming stations located at equal angular distances from each other in a circular row around the annular station platform 16, as is best seen in FIGURE 3.

The typical opening 122 depicted in FIGURE 12, fixedly removably receives a mandrel bearing housing 123 of cylindrical configuration extending from top to bottom of the turret 17 and having an annular mounting flange 124 at its top by which the bearing housing is supported on the turret. A radial duct 125 traverses the housing wall and communicates at its outer end with a tubular fitting 126 which provides an air passageway 127 leading to the outer rim of the turret 17. The fitting 126 terminates at its outer end in an annular flange 128 which, as shown, is in sliding sealing engagement with the opposite face of a valve structure 129 mounted to the station platform structure 16. The valve structure 129 is provided with a duct 130 leading from an interior cavity 131 into axial alignment with the fitting duct 127. A flexible conduit 129' connects the cavity 131 with either a source (not shown) of vacuum or air pressure depending on whether vacuum or pressure is fed to the mandrel 3. It is to be understood that when the mandrel 3 is stationed at a Body Blank Feed and Wrap Station, vacuum is applied to the mandrel interior through the valve structure 129 and duct 125 whereas when the mandrel is stationed at a Blow-Off Station, air under pressure is applied through the valve structure to the mandrel interior. It is to be understood also that one such valve structure is mounted to the station platform 16 at each of the two Body Blank Feed and Wrap Stations and one at each of the two Blow-Off Stations. It is to be understood further that the annular sealing flange 128 is brought into sealing engagement with the face of each such valve structure 129 as the turret rotates the mandrel into these particular Stations.

A pair of O-rings 132 of rubber, neoprene or other suitable sealing material are mounted to the bearing housing 123 above and below the duct 125 in suitable annular grooves provided in the outer cylindrical surface of the bearing housing. The rings 132 serve to seal the interface between the housing 123 and wall of the mandrel cavity 122, so as to prevent loss of vacuum or pressure between the duct 125 and the atmosphere.

A bolting and bearing-retaining ring 133 overlies the bolting flange 124 of the bearing housing and clamps the housing fixedly to the turret 17 through the medium of a circular row of bolts passing through the ring and bolting flange into threaded engagement with the turret. One such bolt 134 is depicted in FIGURE 12.

A cylindrical header bushing 135 having a circumferential flange 136 at its upper end is telescopically received within the housing 123 in co-axial relation thereto, being supported on the housing against axial displacement downwardly, by means of the flange 136. An O-ring 137 overlies the flange 136 and is releasably seated in an annular groove in the housing 123 to prevent axial displacement of the header bushing 135. The outer circumferential surface of the bushing 135 is recessed opposite the duct 125 to provide an annular header groove 138 extending circumferentially of the bushing. Manifold ducts 139 extend radially inwardly from the groove 138 to the inner circumferential surface of the bushing. Advantageously, there are four such ducts spaced at 90° intervals from each other. A pair of O-rings 140 extend circumferentially of the bushing 135 above and below the ducts 139 in grooves provided in the bushing 135 and sealingly engage the inner face of the bearing housing. The rings 140 are similar to the O-rings 132 and serve to seal the interface between the bushing 135 and the bearing housing 123 so as to prevent loss of vacuum or pressure between the manifold ducts 139 and the atmosphere. It will be apparent from the foregoing that vacuum or pressure in the valve cavity 131 will be communicated through the ducts 130, 127 and 125 seriatim to the header duct 138 and thence to the manifold ducts 139, for applying pressure or vacuum to the mandrel 3 at selected intervals all as will be more fully described hereinafter.

As has been pointed out above, the mandrel 3 is adapted to be rotated on its axis by means of the cam follower bracket 94. To this end, a tubular mandrel stem 141, telescopically slidably receiving the mandrel push rod 95 within its central bore, is journalled for rotation in the stationary header bushing 135 by means of suitable upper and lower anti-friction bearings 142 and 143, respectively, seated in complementary bearing recesses in the bearing housing 123. An annular bearing flange 144 is formed by an enlarged diameter portion of the stem 141 and underlies the upper bearing 142 so as to prevent axial upward movement of the stem 141. A bearing retaining nut 145 threadedly engages the upper end portion of the stem 141 and serves to lock the inner race of the upper bearing 142 against the annular bearing flange 144 for rotation of the nut, inner race and stem as a unit.

The lower bearing 143 is secured in its bearing recess by a cylindrical bracket guide member 146, axially keyed by a key 146' to a reduced diameter portion 147 of the stem 141 and axially compressed against the inner race of the bearing by a retaining nut 148 threadedly engaging the reduced diameter stem portion 147. Bracket guide 146 has diametrically opposed depending lugs 149 which are slidably telescopically received in slotted openings 150 formed between a pair of upstanding studs 150a (FIGURE 12a) provided at each of the longitudinal ends of the cam follower bracket 94. It will thus be seen that rotation of cam follower bracket 94 by wrapping head 85 causes a corresponding rotation of the mandrel 3 by means of bracket guide 146 and mandrel stem 141.

The upper and lower ends of the central bore of mandrel stem 141 are internally circumferentially recessed so as to receive suitable anti-friction bushings 151, 152 which are held in place by retaining rings 153, 154, respectively. Bushings 151, 152 thus provide co-axial bearing surfaces for mandrel push rod 95 as it slides within stem 141.

Frusto-conical mandrel 3 is suitably fixedly secured to the upper end of mandrel stem 141 for co-axial rotation therewith by means of a pin 155. Minor adjustments in the desired vertical alignment of mandrel 3 may be obtained preferably by means of three equi-spaced set screws, one of which is shown at 156. The top of mandrel 3 is provided with a circular recess 3', having a bottom diameter approximately corresponding to the diameter of piston 95'. The circumferential wall 158 of recess 3' preferably tapers slightly outwardly from the bottom of the recess so as to provide an annular opening 159 between the periphery of piston 95' and wall 158 when the piston is in the elevated position (FIGURE 19A).

Mandrel 3 includes a central bore extending downwardly from recess 3' in substantial axial alignment with the central bore of mandrel stem 141, opening onto an enlarged interior cavity 160 which communicates with the upper end of the mandrel stem 141 and push rod 95. Telescopically slidably extending through the central bore of mandrel 3 and terminating in cavity 160 is a piston rod 161 depending from piston 95'. The central bore of mandrel 3 is provided with an axial anti-friction bearing surface for the sliding movement of piston rod 161, in the form of a co-axially circumferentially extending bushing 162, which is held in place by retaining ring 163. A spring guide cup 164 is suitably secured to piston rod 161 within cavity 160 and contains a compression spring 165 surrounding rod 161 and bearing against the upper surface of cavity 160. Thus, compression spring 165 biases piston 95' to a seated position in the bottom of the mandrel recess 3' and locates the distal end 161' of piston rod 161 in substantially co-axially aligned, closely-spaced, tandem relationship to the upper end of push rod 95 when the latter is in its down position, as shown in FIGURE 12. Push rod 95 is biased downwardly in a similar fashion by compression spring 166 carried by mandrel cam follower 94 and bearing against thrust washer 167 at the lower end of mandrel stem 141.

From the foregoing, it will be understood that as the mandrel push-rod roller 93 ascends a ramp 102 of the cam track 92, push rod 95 thereby slides vertically axially upwardly in the central bore of mandrel stem 141, engaging and axially upwardly displacing end 161' of piston rod 161, to thereby unseat and elevate piston 95'.

The upward displacement of piston rod 161 is limited so as to accurately establish the location of piston 95' in the fully elevated position shown in FIGURE 19A, where the top surface of the piston 95' is flush with the top of wall 158 of mandrel 3 when push-rod roller 93 travels along the upper portion cam track 92. To this end, mandrel cam follower 94 includes a table 180 above roller 93. A reduced diameter portion 181 at the lower end of push-rod 95 threadedly engages the cam follower at a borehole in the table 180. A shim plate 182 is suitably secured to table 180 as by set screws 183, and serves to determine the position of push-rod 95 within mandrel stem 141. Thus, by adjusting the thickness of shim 182, the height of push-rod 95 may be accurately set so as to elevate piston 95' flush with the top of mandrel 3 when cam follower 94 is at the top of its rise.

The outer circumferential surface of mandrel stem 141 is recesed opposite manifold ducts 139 to provide an annular groove 169 extending circumferentially of the stem. A radial duct 170 transverses the mandrel stem and communicates groove 169 with the central bore of the mandrel stem. In a similar fashion, the outer circumferential surface of push-rod 95 is provided with an annular semi-circular groove 17 extending circumferentially thereof. Transverse intersecting radial ducts 172 communicate groove 171 with the push-rod central air passageway 173. Advantageously, there are two such transverse ducts, providing four openings onto groove 171, spaced at 90° intervals from each other. Central passageway 173 extends upwardly from the intersection of ducts 172, co-axially of push rod 95, and terminates near the upper end thereof. A plurality of pin-holes 174 extend radially inwardly from the outer circumferential surface of push rod 95 to the terminal end of pasageway 173. Advantageously, there are six such pin-holes spaced at 60° intervals from each other. The central bore of mandrel stem 141 has its upper end recessed above bushing retainer ring 153 so as to provide an open annular groove 175 opposite pin-holes 174 when push rod 95 is in the down position.

An offset axial duct 176 extends downwardly from the bottom of recess 3' and communicates at its inner end with cavity 160. A series of closely-spaced pin-holes 177, located in a common vertical plane, extend radially inwardly from the outer frusto-conical surface of the mandrel 3 to the axial duct 176 and interior cavity 160. Advantageously, pin-holes 177 extend over a major portion of the length of the frusto-conical surface of mandrel 3.

An O-ring 178 of suitable sealing material extends circumferentially of the mandrel stem 141 below the cavity 160 of mandrel 3 in a groove provided in the stem so as to sealingly engage the inner circumference of mandrel 3 facing stem 14. Ring 178 thus serves to seal the interface between mandrel stem 141 and mandrel 3 so as to prevent loss of vacuum or pressure from cavity 160 to the atmosphere. Similarly, a suitable O-ring 179 extends about the peripheral edge of circular recess 3' in a groove provided in the bottom of the recess and sealingly engages the bottom face of piston 95' when seated in the recess. Ring 179 thus prevents loss of vacuum between piston 95' and the atmosphere when the mandrel 3 is stationed at a Body Blank Feed & Wrap Station and vacuum is applied to the mandrel interior.

It will be seen from the foregoing that vacuum or pressure will be communicated from the manifold ducts 139 through the ducts 169, 170, 171, 172 and 173 seriatim to the pin-hole ducts 174, and thence to the internal cavity 160 of mandrel 3. When the push rod is located in the down position the air passageways include the open annular duct 175. It will be understood that the annular groove 171 and transverse ducts 172 are located in push rod 95 so as to be in communicaiton with the mandrel stem duct 170 in either the down position or fully elevated position of the push rod. Likewise, central passageway 173 terminates at a point such that pin holes 174 will be located above retaining ring 153 and opposite the open groove 175 when the push rod is in its down position. The vacuum or air pressure is communicated from internal cavity 160 to the bottom and side of the cup 5 through offset duct 176 and pin-hole ducts 177. Thus, when mandrel 3 is stationed at a Body Blank Feed & Wrap Station, one end of a body blank applied thereto is initially held on the mandrel by suction created at pin-holes 177 by a vacuum communicated thereto through the mandrel interior in the manner previously expalined. Likewise, when mandrel 3 arrives at a Blow-off Station, air under pressure is applied through the mandrel interior to create a blast of air at pin-holes 177 and at the annular opening 159, to thereby blow the cup off the mandrel.

Station clamping mechanism

At each of the A and B Stations on the primary turntable unit, there is provided a clamping mechanism in association with each of the mandrels 3. The clamping mechanism opens and closes about mandrel 3 at predetermined intervals so as to permit the body blank to be applied and wrapped onto the mandrel, to thereafter hold the body blank onto the mandrel, and finally, to permit the partly finished cup to be blown off the mandrel.

To this end, as best depicted in FIGURE 14, the turret 17 is provided with a circular row of cylindrical openings 200 concentric with the vertical rotational axis of the turret and in radial alignment with the mandrel openings 122. Corresponding cylindrical openings 201 extend in co-axial alignment with openings 200 through the intermediate flanged rib 202 of dial adapter 18.

Each of the co-axial openings 200, 201 depicted in FIGURE 14 fixedly removably receives a lift rod axial bearing housing 203 of cylindrical configuration extending from the top of turret 17 to within adapter flange 202. An annular mounting flange 204 is provided at the top of the bearing housing for supporting the housing on the turret.

A lift rod 205 is telescopically slidably received within bearing housing 203. The central bore of housing 203 is provided with upper and lower axial anti-friction bearing surfaces in the form of co-axial, circumferentially extending bushings 206, 207. Intermediate of the upper bushing 206 and enlarged diameter portion 208 of lift rod 205, a compression spring 209 surrounds lift rod 205 and bears against an annular shoulder of the bearing housing through a thrust-receiving washer 210 at its upper end and against the lift rod annular shoulder 211 at its lower end. The lower annular shoulder 212 of the enlarged lift rod portion 208 is thereby normally spring-pressed against bushing retaining washer 213.

A roller 215 is rotatably mounted in a cam follower 216 mounted to the lower end of lift rod 205. A cam follower positioner ring 217, carried by the undersurface of adapter flange 202 is provided with a plurality of axially extending slotted recesses 218 in its outer peripheral surface, each of recesses 218 being radially aligned with cylindrical openings 200, 201 and adapted to slidably receive the lift rod cam follower 216 to guide its upward and downward movement, more fully described hereinbelow. It will be seen that, as here preferably embodied, ring 217 is provided with twelve such openings, one for each of the clamping mechanisms located at each of the cup-forming stations.

A bell crank housing 220 is fixedly mounted on turret 17 at each of the cup-forming stations by bolts 221 passing through the bottom of the housing into threaded engagement with the turret, housing 220 longitudinally extending between mandrel 3 and dial adapter 18 in radial alignment with the mandrel and the vertical axis of the turret.

A spring-pressed cam follower block 22 is slidably carried on the upper surface of bell crank housing 220 for horizontal radial inward and outward movement between longitudinal guide rails 223. To this end, cam follower block 22 has a longitudinally extending bore 224 carrying a compression spring 225 at the outer end thereof. A cylindrical thrust-bearing spring stop 226 is telescopically fixedly mounted in bore 224 by stop pin 227 extending radially therefrom through a slotted opening 228 in block 222 and into threaded engagement with bell crank housing 220. It will thus be seen that spring 225, bearing against the fixed stop 226, biases cam follower block 22 in a normal radially outwardly extended position.

A roller 229 is rotatably mounted to an upstanding shaft 230 suitably bolted to the outer end of cam follower block 22 and a depending cam block 231 is likewise suitably secured as by bolting to the inner end of cam follower 222.

A bell crank shaft 232 is mounted for free pivotal movement about pivot shaft 233 within housing 220 between a first normal position, illustrated in solid lines in FIGURE 14, and a second pivoted position, illustrated in dotted lines. Thus, the free ends of the bell crank are provided with roller bearing assemblies 234, 235, roller 234 bearing against the top end of lift rod 205 and roller 236 bearing against the inner face of cam block 231.

As is best seen in FIGURES 3 and 13, turret 17 is provided with a circular row of vertically upwardly extending mandrel clamp pivot shafts 236, extending along the inner circumferential edge of the turret and concentric with the vertical axis of the turret. As here preferably embodied, the turret includes twelve such shafts, each shaft being advantageously located closely adjacent one side of each of two bell crank housings. Also advantageously, shafts 236 are located at 30° intervals, offset 15° from the radial position of the respective mandrels 3.

Two mandrel clamps 237, 238, are suitably pivotally mounted to each shaft 236, as by washer 239 and lock nut 240, the clamps on each shaft adapted to engage and be clamped onto separate, consecutive mandrels 3. Thus, in the typical mandrel clamp mechanism depicted in closed, clamping position in FIGURE 13, clamps 237 and 238, pivotally mounted onto adjacent shafts 236, are clamped about a mandrel 3 by means of upper and lower tension springs 241, 242, stretched between respective upper and lower spring pins 243, 244 projecting from each clamp.

It will be understood that advantageously, and as here preferably embodied, each of the mandrel clamps 237, 238 is of the same construction. However, the clamps on a single shaft are mounted in inverted vertical relation to one another and are therefore conveniently designated by different reference numerals to identify this inverted relationship. Thus, each clamp 237 terminates at one end in a generally cylindrical hub, bifurcated into spaced upper and lower sections 237', 237''. A bore extending through the hub is adapted to receive the shaft 236 in close-fitting relationship permitting pivotal movement of the clamp 237 thereabout. In similar fashion, each clamp 238 terminates at one end in a generally cylindrical hub, bifurcated into spaced upper and lower sections 238', 238''. A bore extending through the hub is adapted to receive the shaft 236 in close-fitting relationship permitting pivotal movement of the clamp 238 thereabout. Of course, since clamp 238 is mounted in inverted relationship to clamp 237, the bifurcated hub section 238'' assumes the upper position (FIGURE 14).

Clamps 237, 238 are provided with generally vertically extending jaws 245 on their inner surfaces at the outer ends thereof, jaws 245 being mounted on the clamp ends so as to be in opposed relation in the closed, clamping position. The opposing inner faces 246 of jaws 245 taper outwardly from top to bottom and are recessed so as to conform to the frusto-conical shape of mandrel 3.

Intermediate the pivot mounting hub and jaws 245, adjusting blocks 247 are fixedly slidably mounted to the inner surfaces of clamps 237, 238 by threaded engagement with screws 248 extending through elongated slots 249 in the clamps, blocks 247 having opposed converging surfaces 250 adapted to be engaged and urged apart by roller 229 against the tension of springs 241, 242. The longitudinal position of blocks 247 is adjusted by means of abutting threaded screws 251 passing through mounts 252 fixedly secured to the clamps so as to closely space converging surfaces 250 from the peripheral surface of roller 229.

An arcuate cam 255, FIGURES 14, 14A and 14B, is suitably mounted as by bolts 256 on the annular cam track platform 88 at diametrically opposite locations corresponding to the Blow-Off Stations A and B, the raised arcuate cam track 257 being concentric with turret 17, and in co-axial, circumferential alignment with the circumferential path defined by roller 215 carried by lift rod 205 as the turret is rotationally indexed about its vertical axis. Angle struts 258 extend from the raised cam track to the base of the cam to provide a rigid support for the track. The arcuate cam track surface 257 is provided with inclined surfaces 259, 260 each terminating at a common upper plateau level 261. The lower level of each inclined surface substantially corresponds to the level of the bottom of roller 215 in its normal, spring-pressed down position.

Also suitably mounted on the annular cam track platform 88, at diametrically opposite locations corresponding to the Body Blank Feed & Wrap Stations A and B, are two special pneumatically-actuated cam-follower actuating devices, indicated generally by reference numeral 265 (FIGURE 14C). Each such device includes an integral pivot-and-stop cam 266 pivotally supported about a shaft 267 extending between mounts 268 secured to a longitudinally-extending base 269. Cam 266 includes a lower cam arm 270 positioned laterally of a generally upright body portion 271 and extending longitudinally of the base, cam body 271 having a flat exterior surface 272 adapted to be pivoted into vertical facing engagement with a stop 273. It will be understood that, in similar fashion as for blow-off cam 255, pneumatic actuators 265 are mounted on cam platform 88 so as to position cam arm 270 at each wrapping station on the circumferential path defined by roller 215 as it is rotated by turret 17.

A double-acting pneumatic cylinder 274 is pivotally mounted to a base 269 at 274, and piston rod 276 is in turn connected to cam body 271 by a mounting clevis 277 of pivoting about pin 278 received in a suitable bore extending transversely of the cam body. Cylinder 274 may be of conventional construction and is suitably operated through pneumatic fluid pressure lines (not shown) to raise cam arm 270 by pivoting cam 266 by means of piston 276 against the face of stop 273 and to lower the arm 270 by pivoting cam 266 in the opposite direction on the return stroke of the piston. Advantageously, the fluid pressure is conducted through the desired pressure line from a source (not shown) by means of a 4-way solenoid valve (not shown) operated by a rotating cam limit switch (not shown) to pivot cam 266, and thereby raise and lower cam arm 270, at the wrapping stations. Cam arm 270 is adapted to engage and raise roller 215 and, to this end, the upper surface of the arm is preferably beveled at 279 so as to provide a substantially horizontal cam surface when the arm is pivoted to its fully raised position, illustrated in FIGURE 14C.

It will be apparent from the foregoing that, except at the Blow-Off & Body Blank Feed & Wrap Stations, there are no interruptions in the circumferential path of roller 215 and it rotates freely in the spring-pressed, down position at the end of lift rod 205. Hence, cam-follower block 222 likewise spring-presses roller 229 radially outwardly and spaced from the cam blocks 247 on mandrel clamps 237, 238 and the jaws are tightly clamped onto mandrel 3 by tension springs 241, 242, as depicted in FIGURES 14 and 16B.

When the mandrel 3 and roller 215 are rotationally indexed into the Body Blank Feed & Wrap Station, the pneumatic cam-follower actuator 265 is charged by the cam limit switch (not shown) and pivots cam 266 so that cam surface 279 engages and raises roller 215 to the elevated position shown in FIGURE 14C. Roller 215 thereby elevates lift rod 205 which pivots bell crank 232 to slide cam follower block 222 radially inwardly to thereby draw roller 229 between cam blocks 247 and urge the clamp jaws out of engagement with mandrel 3. While cam surface 279 dwells at the raised position, holding the clamping jaws open, a vacuum is communicated to the mandrel interior and a body blank 5 is applied to the mandrel and held on the mandrel by suction as it is wrapped about the mandrel surface. The cam-follower actuator 265 is then charged by the cam switch (not shown) so as to pivot cam 266 in the opposite direction and lower cam surface 279 out of contact with roller 215. The cam follower mechanisms are thereby returned to their spring-pressed positions and jaws 245 thereby tightly clamp the body blank 5 onto the mandrel as it is indexed out of the wrapping station and the vacuum is cut-off.

Jaws 245 remain tightly clamped about the body blank and mandrel as the mandrel is advanced through the Side Seam Seal, Bottom Pre-Form and Bottom Roll-Out Stations.

After the roller 215 has moved through an angle in azimuth of preferably about 15° from the Bottom Roll-Out Station, it engages and ascends the inclined surface portion 259 of arcuate cam track 257 arriving at the upper flat level 261 as the mandrel 3 arrives at the Blow-Off Station, whereby lift rod 205 is fully raised and the clamping jaws are held open. Thus, the partly finished cup is free to be blown off the mandrel by an air blast for completion on the secondary turntable unit. As the mandrel 3 is indexed out of the Blow-Off Station, roller 215 engages and descends the inclined surface 260 which ends at the level of the bottom of roller 215 in its spring-pressed position, so that jaws 245 are again clamped about the mandrel. It follows that the jaws remain clamped about the mandrel until its arrival at a Body Blank Feed & Wrap Station, whereupon the cycle is again initiated and repeated.

Bottom blank feed station mechanism

Referring now more particularly to FIGURES 8, 8A, 9, 9A, 9B, 10 and 11, there is illustrated a bottom blank feed mechanism in accordance with the invention, which is located at each of the two Bottom Blank Feed Stations, for inserting a disc-shaped bottom blank 4 into the recess 3' in the upper end of the mandrel 3.

As previously described, the input drive shaft 63 for the bottom blank feed mechanism is co-axially coupled to a primary drive shaft 57 which, in turn, is driven by pinion gear 56 in meshed engagement with ring gear 53.

The input drive shaft 63 terminates above station platform 16 in a cam housing 301 secured to a horizontal housing support plate 302 which, in turn is removably anchored to platform 16 by upright frame members 303. Drive shaft 63 is journalled at its upper end for rotation in a suitable anti-friction bearing 304 carried in a cylindrical opening in the housing 301, and is likewise journalled at its lower end in a suitable anti-friction bearing 305. Bearing 305 is seated in and carried by complementary bearing recesses in annular bearing plates 306, 307, which are removably secured to one another as by bolting, one such bolt appearing at 308. Similarly, bearing plate 307 is removably anchored by bolting to the housing support 302 in a suitable opening provided herein, one such bolt appearing at 309.

Drive shaft 63 carries at its upper end a bevel gear 310 keyed for rotation therewith which meshes with and serves to drive a complementary bevel gear 311 similarly keyed to a horizontal drive shaft 312, journalled for rotation in suitable anti-friction bearings 313 and 344 carried by cam housing 301. An annular draw punch actuating cam plate 315 is secured to the hub of bevel gear 311 by mounting bolts, of which a single bolt 316 appears in FIGURE 8, for rotation with drive shaft 312. Cam plate 315 is recessed on its inner face to provide a generally annular cam track groove 317 for receiving a roller 318 carried by one end of a draw punch rocker cam follower arm 319. Rocker arm 319 is pivoted about horizontal pivot shaft 320 carried by housing 301 and carries at its free end a draw punch indicated generally by reference numeral 321. The rocker arm 319 functions at predetermined intervals to downwardly extend the spring-pressed punch 321 to deposit a bottom blank disc 4 on the top of a mandrel 3 stationed therebeneath, to temporarily dwell the punch in its extended position, and to thereafter retract the punch to the retracted postion illustrated in FIGURE 8, as will be more fully described hereinafter.

Also secured for rotation with horizontal drive shaft 312 is an arcuate stripper actuating cam plate 322. Cam plate 322 carries on its inner face a laterally extending cam track 323 adapted to be engaged by roller 324 carried by one end of a stripper cam follower rocker arm 325. Rocker arm 325 permits stripper 327 to normally follow the downward and upward movement of punch 321 and, while punch 321 dwells in the downwardly extended position, functions to continue the downward movement of stripper 327 a short distance further and thereby die form bottom blank 4 into recess 3' with an upstanding circumferentially extending rim 4', to retract the stripper to the extended position of the draw punch, and to thereafter permit the stripper and draw punch to be retracted together by rocker arm 319, as more fully described hereinafter.

To this end, as here preferably embodied, draw punch 321 includes a tubular shank 328 telescopically slidably received in a vertically extending bore 329 provided in a forward section 330 of cam housing 301. Shank 328 is axially keyed by a key 331 mounted in an axially extending keyway 332 in housing section 330. Bore 329 is recessed at its upper and lower ends to provide circumferentially extending grooves for the receipt of cylindrical flanged anti-friction bushings 333 and 334, providing co-axial bearing surfaces for the sliding movement of the punch shank therewithin. A punch sleeve 335 is carried at the lower end of shank 328 by mounting bolts extending through an inner annular rib 336, one such bolt appearing at 337. As best seen in FIGURE 9B, the bottom end of punch sleeve 335 has a reduced thickness, outwardly flared portion 338 so as to provide an inner annular seat 339 having an outwardly tapering side wall. The upper end of the draw punch shank 328 threadedly engages a pivot mount 328', pivotally mounted onto opposed stud shafts 340 extending through a yoke 341 carried by the free end of rocker arm 319, the shafts 340 being suitably secured to yoke 341, as by retaining nuts 342.

Stripper 321 includes a plunger rod 343 telescopically slidably received in the central bore of the draw punch shank 328, provided with suitable circumferentially extending anti-friction bushings 344 and 345 so as to permit relative co-axial anti-friction bearing movement. An upper die member 346 threadedly engages the lower end of plunger rod 343 and is provided with an outwardly flared head 347 normally seated in the annular complementary-flared seat 339 of draw punch sleeve 335. The upper end of the stripper plunger rod 343 threadedly engages a flanged pivot mount 348 pivotally mounted to a horizontal pivot shaft 349 extending through links 350 pivoted at their opposite ends to opposed stud shafts 351 extending inwardly from yoke 352 carried by the free end of rocker arm 325, stud shafts 351 being suitably secured to yoke 352, as by retaining nuts 353. A compression spring 354, surrounding plunger rod 343 and bearing against the stripper pivot mount 348 and an annular shoulder 355 in the central bore of the draw punch shank 328, serves to spring-press the stripper die 346 into normal seated engagement with the annular tapered seat 339 of the draw punch.

It will be apparent from the foregoing that draw punch 321 and stripper 328 move together in spring-pressed association into extended and retracted positions and, while so associated, are driven by the movement of rocker arm 319 which, in turn, is actuated by rotating cam plate 315 as roller 318 rides in cam track 317. Advantageously, and as here preferably embodied, cam track 317 is grooved of a configuration so as to drive the stripper and draw punch downwardly over an arcuate distance of 160°, thereby depositing a bottom blank disc on the top of a mandrel 3; to maintain the draw punch in its extended down position for an arcuate distance of 60°; and to thereafter retract the stripper-draw punch unit to the retracted position through an arcuate distance of 65°. It follows that the unit remains in the retracted position over an arcuate distance of 75° before the cycle is repeated.

Arcuate cam plate 322 is secured to drive shaft 312 at a predetermined angular position with respect to the cam track 317, such that during the period that draw punch 328 dwells in its fully extended position, roller 324 engages and rides the radially inwardly curved portion 356 of the cam track 323 to thereby drive stripper 327 forwardly of the draw punch sleeve 335, whereby the stripper head 347 die-forms the bottom blank in the mandrel die recess 3'. Upon completion of the die forming, roller 324 rides the radially outwardly curved portion 357 of cam track 323 until it disengages cam 322 to thereby retract and seat the stripper head 347 in the draw punch. Advantageously, cam track 323 has a 5° lead configuration, is radially inwardly and outwardly curved over equal arcuate distances of 25° each, and has a 5° trail configuration.

In accordance with the invention, and as here preferably embodied, a feeder shuttle 360 oscillates between twin bottom blank magazines 400, 400' so as to simultaneously receive and feed a single bottom blank disc 4, vacuum-picked and deposited therein alternately from the two magazines, to a position directly beneath the draw punch and stripper assembly to permit the blank to be inserted and die-formed in mandrel 3, as previously explained.

To this end, a cylindrical opening 361 is suitably provided in housing support plate 302 and fixedly removably receives a bearing housing 362 of cylindrical configuration extending from the top of the support plate to a point below the support plate. An annular mounting flange 363 serves to support the housing 362 to the support plate by means of a plurality of bolts passing through the mounting flange into threaded engagement with the support plate, one such bolt 364 appearing in FIGURE 8.

A shuttle drive shaft 365 is journalled for oscillatory motion in suitable upper and lower anti-friction bearings 366 and 367 seated in bearing housing 362. Feeder shuttle 360 is carried at the upper end of shaft 365 in faced sliding contact with the upper surface of housing support 302, releasably secured to the shaft by a nut 368 threadedly engaging the shaft end and suitably keyed to the shaft for oscillatory movement therewith. The shuttle drive shaft 365 carries at its lower end a clevis 369 to which a connecting rod 370 is pivotally connected by clevis pin 371. Clevis 369 is suitably keyed to the shaft 365 for oscillation therewith and is releasably secured thereto by a nut 372 threadedly engaging the shaft end. A bearing-retaining ring 373 serves to suitably space clevis 369 from bearing housing 362.

Shuttle connecting rod 370 is suitably pivotally linked to pivot shaft 374 mounted in a yoke bracket 375 carried by one end of a cam follower rocker arm 376. Rocker 376 is pivoted about a shaft 377 extending vertically downwardly from housing support plate 302. The other end of rocker follower 376 carries a roller 378 received in a grooved cam track 379, provided in shuttle actuating cam plate 385.

As here preferably embodied, bottom blank feeder shuttle 360 is of a generally triangular shape and is provided with two cylindrical openings 380, 380', located at equal radial distances from the vertical axis of oscillation of the shuttle and arcuately spaced from each other so that when one opening 430 receives a bottom blank disc 4 from one of the bottom blank magazines, the other opening is positioned directly beneath the draw punch and stripper assembly. Stops 381, 381' are secured to the top surface of supporting plate 302 and serve to accurately define these two positions of shuttle 360. It will be understood that the diameter of cylindrical openings 380, 380' is substantially equal to that of the bottom blank discs.

As best seen in FIGURES 8A and 11, the upper surface of support plate 302 is recessed to provide an arcuate slot 382 having a radius of curvature corresponding to the radius of the arcuate movement of openings 380 and 380'. A tongue 383 on the trailing side of each opening 380, 380' extends axially downwardly from the inner circumferential surfaces thereof into slot 382. Tongue 383 thereby prevents the bottom blank discs from slipping under the shuttle and insures positive transportation of the discs from the magazines to the draw punch and stripper assembly.

For purposes of simplicity only, cam track 379 of shuttle actuating cam 385 is illustrated in FIGURE 11 as being of circular configuration, it being understood that the actual configuration will be such as to sequentially drive the shuttle operating rod 370 forward to the position shown in FIGURE 11 where shuttle opening 380 is in co-axial alignment with magazines 400; to dwell the rod in the illustrated position for a length of time sufficient to receive a bottom blank from magazine 400; to retract the rod a sufficient distance to oscillate the shuttle into position for receiving a bottom blank from the opposite magazine 400' in shuttle opening 380'; and to dwell the rod in the retracted position for a length of time sufficient to receive a bottom blank from magazine 400' and for the draw punch and stripper assembly to die-form the bottom blank received from magazine 400, and carried in shuttle opening 380, into a mandrel die recess 3'. Advantageously, the configuration of cam track 379 is such as to dwell the operating rod 370 in each of the forward and retracted positions over an arcuate distance of 90° and to drive the rod between the dwell positions over an arcuate distance of 90° each.

Cam plate 385 is driven by a vertically extending drive shaft 386, journalled for rotation in suitable upper and lower anti-friction bearings 387 and 388, respectively carried by the cam housing 301 and in a suitable opening 389 in support plate 302. A flange 390 on the upper end of shaft 386 overlies bearing 387 and a bolting and bearing-retaining ring 391 secures bearing 387 in housing 301. Cam plate 385 is bolted for rotation with an annular cam hub 392 which, in turn, is suitably keyed to shaft 386 for rotation therewith beneath support plate 302. A pinion gear 393 is also keyed to shaft 386 for rotation therewith and meshes with a corresponding pinion gear 394 keyed to input drive shaft 63, so that shaft 386 is driven by drive shaft 63. As here preferably embodied, gears 393 and 394 have a 2:1 ratio of diameters so that two revolutions of the driving gear 394 will effect a single revolution of the driven gear 393 and its shaft 386.

Drive shaft 386 also carries at its lower end a cylindrical driving cam 395, suitably keyed to the shaft for rotation therewith and releasably secured thereto by a nut 396 threadedly engaging the shaft end. Cam 395 serves to drive twin bottom blank vacuum disc pickers 410 in alternate up and down motion, as will be more fully described hereinafter. Suitable cylindrical bushings 397, 398 and 399 serve to axially vertically space the bearing, gear and cam elements mounted on shaft 386.

The twin bottom blank magazines 400, 400', are located on either side of, and closely adjacent to, the forward section 330 of cam housing 301. Each magazine includes a cylindrical casing 401, having an inner diameter substantially equal to that of the bottom blank discs 4, located in co-axial, vertical alignment with suitable corresponding cylindrical openings 402, 402' extending through the housing support plate 302. The lower end of each cylindrical casing 401 has a reduced outer diameter portion 403 telescopically received in a bore 404 provided in a centilever arm 405, extending forwardly of a cantilever support block 406, suitably fixedly removably mounted to housing support plate 302. Casings 401 are thus supported and located in the cantilever arm by the circumferentially extending shoulder 407 bearing on the top of cantilever arm 405. A plurality of rods 408, preferably three in number, are mounted in equispaced relationship in top of casing 401 and extend vertically co-axially upwardly therefrom to provide storage space for a suitable supply of bottom blank discs 4.

Means are provided on the bottom end of each of casings 401 for releasably holding the supply of discs within the magazines and for permitting the removal therefrom of a single disc at a time by vacuum picker means. To this end, as here preferably embodied, a pair of ears 409 extend radially inwardly from the inner wall casing 401 at the bottom end thereof. It will be seen that when a downward suction force is applied to the bottommost disc, the disc is caused to flex as it moves past the ears and out of the magazine. This flexing action serves to break any suction permeating the bottommost disc and thereby prevents the withdrawal of more than one disc at a time.

As previously indicated, a single bottom blank disc 4 is sequentially alternately removed by vacuum means from bottom blank magazines 400, 400' and deposited in shuttle 360. To this end, twin vacuum disc pickers 410, 410' driven by cam 395 in an alternate up and down motion, as also previously noted, are each pivotally mounted to a yoke 411 which, in turn, is mounted for pivotal movement about a pivot shaft 412 carried at the free end of a bell crank shaft 413. Each bell crank 413 is suitably pivoted about a horizontal pivot shaft 414 secured to frame 303. Bell cranks 413 are driven by rollers 415, carried at the remaining ends thereof and riding in diametrically opposite positions in a circumferentially extending helical cam track 416, recessed in the peripheral surface of cylindrical cam 395.

Vacuum disc pickers 410, 410' are positioned in co-axial, vertical alignment with cylindrical openings 402, 402' in housing support plate 302 and, consequently, with bottom blank magazines 400, 400' and are adapted to be displaced by bell crank 413 upwardly, into contact with the bottommost disc 4 in each magazine and downwardly, to a position beneath the top surface of support plate 302.

Each disc picker assembly includes a vertical shaft 417 pivotally connected at its lower end to yoke 411 and telescopically slidably received within the central bore of a guide bearing housing 418. Housing 418 is telescopically received within a cylindrical opening 402 or 402', in co-axial relation thereto, and is supported on the housing plate 302 by a plurality of bolts passing through a mounting flange 419 into threaded engagement with the undersurface of the plate, one such bolt appearing at 420 in FIGURE 9. Suitable anti-friction bushings 421 and 422 provide axial bearing guide surfaces for the sliding motion of picker shaft 417 within bearing housing 418.

Picker shaft 417 preferably terminates at its upper end in a conical recess 423, carrying a washer 424, formed of rubber or other suitable flexible material, suitably secured thereto by a countersunk screw 425, mounted in threaded engagement with a threaded borehole in the top of the shaft. Screw 425 is provided with a central bore 426 extending therethrough and communicating with a central air passageway 427 in picker shaft 417 which, in turn, communicates with a radial duct 428 having a hose fitting 429 mounted therein. A flexible hose conduit (not shown), communicates a source of vacuum (not shown) through the passageway 428 and 427 seriatim to the duct 426, for applying a vacuum at the upper end of the picker shaft. Advantageously, suitable switching means (not shown) is provided for applying the vacuum to the picker shafts at predetermined intervals, synchronized with their up and down motion, so as to apply a vacuum from a time just prior to flexible washer 424 contacting the bottommost disc in the associated magazine until the washer returns to a position approximately level with the top surface of support plate 302.

A third cylindrical opening 435 extends through the housing support plate 302 at a position directly beneath, and in vertical co-axial alignment with, the draw punch and stripper assembly. The diameter of opening 435 at its upper end substantially corresponds to that of a typical bottom blank disc 4, however the bottom of the opening has a slightly enlarged portion 436 so as to permit the discs to expand and be free of the support plate when punched therethrough by draw punch 321 and held on top of the mandrel 3 for the subsequent die forming operation by stripper 328.

It will be apparent from the foregoing that, when a mandrel 3 comes to rest in a Bottom Blank Feed Station as depicted in FIGURE 8, it is in accurate co-axial alignment with cylindrical opening 435 in the housing support plate 302, and with the draw punch and stripper assembly positioned thereabove. At this time, one of the shuttle openings, for example 380', is likewise positioned in co-axial alignment with cylindrical opening 435 and the draw punch and stripper assembly, and carries therein a bottom blank disc 4. While shuttle 360 dwells in this positon, the draw punch and stripper assembly is extended, punching the disc blank through the support plate opening 435, die-forming the blank in the mandrel recess 3' and thereafter returned to its retracted position. At the same time, vacuum disc picker 410 moves upwardly through shuttle opening 380 into facing suction engagement with the bottommost disc in magazine 400, withdraws the disc from the magazine on its downward return stroke and deposits the disc in the shuttle opening 380. It will be seen that the disc rests within the opening 380 primarily on the upper annular surface of bearing housing 418.

Shuttle 360 is thereafter oscillated to its alternate position, with opening 380' co-axially aligned beneath magazine 400', at which time the opening 380 has transported the bottom blank received therein into position beneath the draw punch and stripper assembly. At the same time, another mandrel 3 is indexed to the station and the sequence of operations is repeated.

Body blank feed and wrap station mechanism

Referring now more particularly to FIGURES 15, 15A, 15B, 15C, 16, 16A, 16B, and 17, there is illustrated a body blank feeding and wrapping mechanism in accordance with the invention, which is located at each of the two body blank feed and wrap stations, for applying a body blank 5 to the frusto-conical surface of a mandrel 3 and holding the blank thereagainst as the mandrel rotates about its vertical axis to wrap the blank about the mandrel surface.

The input drive shaft 69 for the body blank feed mechanism terminates within an upstanding gear frame 500 suitably removably anchored to station platform 16 having opposed, parallel side panels 501, 502 for supporting the various gearing drive shafts for the body blank feeding mechanism, more fully described hereinafter. Drive shaft 69 is journalled for rotation at its upper end in suitable anti-friction bearings (not shown) carried by a circular bearing housing 503, ilustrated in dotted lines in FIGURE 15.

Drive shaft 69 carries at its upper end a bevel gear 504 secured for rotation therewith which meshes with and serves to drive a complementary bevel gear 505 secured to a main horizontal drive shaft 506, which extends between the frame side panels 501, 502 and is journalled for rotation in suitable anti-friction bushings 507, 508 carried by the respective side panels. Also secured for rotation with horizontal drive shaft 506 are duplicate eccentric driving cams 509, 510 located interiorly of the respective side panels 501, 502 and in equal spaced relation respectively thereto.

Cams 509, 510 are normally engaged by rollers 511 carried by the lower ends of cam follower arms 512, 512', extending parallel with the frame side panels 501, 502, respectively. A horizontal drive shaft 513 passes through the mid-section of each of the cam followers arms 512, 512' and is journalled for rotation therein by suitable anti-friction bushings 514. Drive shaft 513 also serves to support and guide the lower ends of the arms as they are reciprocally driven by rotating cams 509, 510. To this end, drive shaft 513 carries circumferentially extending sleeves 515 transversely received and located by opposed arcuate slots 516 in the frame side panels 501, 502. Journal bushings 517 are telescopically received within sleeves 515 so as to permit the sleeves to freely rotate about shaft 513 and within slots 516. Additionally, sleeves 515 serve as journal mounts for linking arms 518 which are pivotally mounted at each end of shaft 513 exteriorly of the side frames and extend generally normally from arms 512, 512' into similar pivotal engagement with a horizontal gear shaft 519, suitably journalled for rotation in the gear frame about a stationary axis. Thus, links 518 serve to limit and guide the stroke of cam followers 512, 512' as they are reciprocally driven by cams 509, 510.

Shaft 513 carries a pinion gear 520 at its end exteriorly of side panel 501. Gear 520 is secured for rotation with shaft 513 and is m meshed engagement with a pinion gear 521 secured for rotation with shaft 519. Pinion gear 521 meshes with idler gear 522 which, in turn, meshes with and is driven by a main pinion gear 523, secured for rotation on the main horizontal drive shaft 506. Gear 520 is thus train gear driven by main pinion gear 523 and thereby rotates drive shaft 513. A second pinion gear 524 is also secured for rotation with drive shaft 513 and meshes with an idler gear 525, journalled for rotation on a stud shaft. 526 suitably mounted to arm 512'.

Journalled within suitable anti-friction bushings in the uper ends of cam follower arms 512, 512' are inwardly extending, horizontally co-axially aligned hollow shafts 527 and 528, respectively. The inner ends of shaft 527, 528 terminate in spaced relationship to each other and are flanged to provide lower transport roller surfaces 529, 530, respectively, adapted to be brought into rolling engagement with the bottommost body blank 5 in magazine 550, as more fully described hereinafter. Shafts 527, 528 carry equal-diametered pinion gears 531, 532, respectively, secured for rotation with each of the shafts. Pinion gear 532 meshes with idler gear 525 so as to be driven thereby through pinion gear 524 and to rotate shaft 528. Pinion gear 532 also meshes with and serves to drive pinion gear 533, secured for rotation with horizontal upper transport roller shaft 534 to thereby rotate shaft 534. Shaft 534 carries at its opposite end a second equal-diameter pinion gear 535 also secured for rotation therewith and in meshed engagement with pinion gear 531. Pinion gear 531 is thus driven by the pinion gear 535 to thereby rotate shaft 527. A pair of body blank transport rollers 536, 536' are fixed to shaft 534 in vertical alignment with lower roller surfaces 529, 530 and in lightly contacting, oppositely directed, rolling engagement therewith.

As here preferably embodied, drive shaft 513, opposed hollow lower transport roller shaft 527, 528 and upper transport roller shaft 534 are adapted to reciprocate as a unit in a plane passing through their longitudinal axes of rotation, driven by arms 512, 512' engaging actuating cams 509, 510 by means of rollers 511. To this end, the frame side panels 501, 502 are provided with rectangular slots 537 extending longitudinally from a point forward of arcuate slots 516 to the upper front edges of the panels. A longitudinal plate member 538 is slidably mounted in each of slots 537 and is advantageously held in place by means of rabbet grooves formed on its longitudinal edges and extending the length of the plate.

Each plate 538 is bifurcated at its outer end so as to form therein a second slot 539, extending longitudinally within each slot 537. Generally rectangular bearing mounts 540 having circular boreholes extending transversely therethrough are also rabbet grooved along two opposed edges so as to be slidably mounted and held within slot 539 in a similar manner to the sliding mounting arrangement of plates 538 in slots 537. The upper transport roller shaft 534 is journalled for rotation in suitable anti-friction bushings 541 telescopically received within the boreholes of mounts 540 in co-axial relation thereto, each bushing being supported against axial displacement by a circumferentially extending flange 542. Fixed to shaft 534 at its opposite ends are spacer rollers 543 whose inner faces bear against the journal bushing flanges 542 and thereby hold the flanges against the outer faces of bearing mounts 540.

A cap plate 544 extends across the open end of slot 539 and is fixedly secured to the bifurcated ends of plate 538, as by cap bolts 545. A partially threaded adjustment bolt 546, passing through cap plate 544 and into threaded engagement with bearing mounts 540, serves to locate shaft 534 so that pinion gears 533, 535 are maintained in meshed engagement with pinion gears 532, 531, respectively, and upper transport rollers 536, 536' lightly engage lower transport roller surfaces 529, 530. A compression spring 547 surrounds adjustment bolt 546 and bears against cap plate 544 so as to provide resilient meshing engagement of the respective pinion gears and resilient, spring-pressed contact between the transport roller surfaces. It will thus be seen that a body blank 5, picked off body blank magazine 550, is received and resiliently gripped between the transport rollers so as to be transported away from the body blank magazine for application to a mandrel 3, as will be more fully explained hereinafter.

The body blanks 5, as best depicted in FIGURE 15C, are preformed as flat sheets having two opposed parallel arcuate edges connected at their ends by two opposed straight edges of equal length extending in a direction normal to each of the arcuate edges. Thus, when the opposed straight edges are brought into parallel, slightly overlapping relationship to each other, the blank is shaped into a frusto-conical configuration.

With the foregoing configuration of a typical body blank in mind, it will be seen that the body blanks are advantageously stored in magazine 550 with one straight edge perpendicularly aligned to the axes of rotation of the transport rollers and having the arcuate edge of the greatest radius of curvature positioned upwardly in the magazine so as to form the leading edge of the blank as it is transferred toward the mandrel.

In accordance with the invention, vacuum means are provided for removing body blanks 5 from the body blank magazine 550, one at a time, at predetermined intervals corresponding to the arrival at the station of a mandrel 3 having a bottom blank disc die-formed in its upper recess. To this end, a vacuum pick-up roller 555 is provided in the space between opposed lower transport rollers 529, 530 in abutting sliding contact with the spaced annular end faces thereof, pick-up roller 555 being of equal diameter to, and horizontally co-axially aligned with, transport rollers 529, 530. Extending horizontally co-axially from either face of roller 555 within the respective bores of the lower transport roller shafts 527, 528 are shafts 556, 557, integral with the pick-up roller and journalled for rotation in the shaft bores by means of suitable journal bushings 558.

Shafts 556, 557, extend through suitable openings in the sliding plates 538 to be thereby mounted for reciprocable movement with the transport roller and drive shaft unit previously mentioned. Spacer rollers 559, 560, respectively, are fixed to the shafts 556, 557 exteriorly of the frame side panels and in opposed, rolling engagement with the spacer rollers 543 of shaft 534, so as to provide thrust bearing surfaces for receiving and transmitting compressive forces between the respective rotating transport roller shafts.

A vacuum is communicated to the surface of roller 555 by means of pin-holes 561, advantageously two in number, which extend radially inwardly from the peripheral face of the roller to an axially extending borehole 562 in shaft 557. A flexible conduit (not shown) is adapted to be threadedly engaged into borehole 562 so as to communicate a source of vacuum (not shown) to the pin-holes.

As previously noted, the upper and lower transport roller drive shafts and, consequently, vacuum pick-up roller 555, reciprocate as a unit in the plane of their axes of rotation. It will be understood that the amplitude of displacement of the unit is determined by the eccentricity of cams 509, 510. Advantageously, the unit reciprocates from the "down" position, whereat pick-up roller 555 is free of the body blank magazine illustrated in FIGURE 15, to an "up" position, at which pick-up roller 555 contacts the upper arcuate surface of the bottommost body blank 5 in the magazine.

Pick-up roller 555 is adapted to oscillate during the cycle of reciprocation so that, at the point of maximum upward displacement of the unit, pin-holes 561 are in facing engagement with the bottommost body blank (FIGURE 15A) and, when at the point of maximum downward displacement, pin-holes 561 have rotated upwardly beneath upper transport rollers 536, 536' (FIGURE 15B). To this end, a pinion gear 565 is keyed to the outer end of pick-up roller shaft 556 and meshes with a rack 566 suitably secured to a cantilever bracket 567 which, in turn, is suitably fixedly removably mounted to the upper rear edge of side frame panel 501. Rack 566 extends in a plane parallel to the plane which passes through the axes of rotation of the driving shafts in the reciprocating shaft unit and thereby serves to drive pinion 565 and to rotate shaft 556 as they reciprocate. It will be understood that rack 566 rotates pinion gear 565 and consequently, shaft 556, in a first clockwise direction during the upward stroke of reciprocation and in a second, counterclockwise direction during the return stroke to the down position.

It will be apparent from the foregoing that a body blank 5 is picked up and transported away from the body blank magazine 550 as follows. As the eccentric cams 509, 510 rotate so as to drive continuously rotating shafts 513, 527, 528 and 534 forward as a unit, rack 566 rotates pick-up roller 555 in a clockwise direction so that, at the point of maximum upward displacement, pin-holes 561 are brought into facing suction engagement with the upper arcuate edge of the bottommost body blank carried by magazine 550. Continued rotation of the cams immediately starts the shaft unit on its return to the down position whereupon rack 566 drives roller 555 in an opposite, counterclockwise direction. The bottommost body blank is held onto roller 555 by the suction created at pin-hoes 561 so that, as the roller simultaneously rotates counterclockwise and moves linearly downwardly, the blank is removed from the magazine and partially wrapped about the roller as the pin-holes are rotated upwardly and away from the bottom of the magazine. At the point of maximum downward displacement, the leading edge of the body blank has been carried beneath the resiliently contacting, oppositely rotating, transport rollers 536, 536' and 529, 530, is gripped therebetwen and transferred thereby away from pickup roller 555, and the cycle is repeated.

The body blank is transported by transport rollers 536, 536' and 529, 530 onto an inclined feed tray 570 on which it is transported by secondary sets of upper and lower, oppositely rotating, resiliently contacting transport rollers to a vacuum transfer platen 585, more fully described hereinafter. Advantageously, these are two sets of such secondary transport rollers indicated by reference numerals 571, 571', 572, 572' and 573, 573', 574, 574', respectively, each of which are suitably secured to drive shafts journalled for rotation in the frame side panels. Suitable pinion gears 571", 572" and 573", 574" are secured for rotation with the respective transport roller drive shafts, respective gears meshing and serving to drive respective transport rollers, all as will be understood to one of ordinary skill in this art. An idler pinion gear 575, suitably journalled for rotation in side panel 501 and meshing with pinion gears 572" and 574", serves to interrelate the rotation of the secondary transport rollers. A pinion gear 576, secured for rotation to the outer end of the drive shaft carrying rollers 572, 572' and having an equal diameter to pinion gear 572", meshes with pinion gear 521, whereby the secondary transport rollers are train-gear driven through idler gear 522, by the main pinion gear 523. It will be understood to one of ordinary skill in the art that the various gearing ratios for the gear train may be altered as desired in order to achieve the desired speed and direction of rotation for the transport rollers and that the gear train shown, while illustrating a preferred embodiment, is intended to be exemplary only.

It will be seen that the upper transport rollers 571, 571' and 573, 573' are spring-pressed into resilient rolling engagement with their lower counterparts in simliar fashion to the resilient mounting of rollers 536, 536'. Thus, the respective driving shafts are journalled for rotation in mounting blocks 577, 578, each of which are rabbet grooved so as to be slidably receivably mounted in suitable longitudinal slots in each of the frame side panels. Cap plates 579, 580 are mounted across the open ends of the slots and each receive a partially threaded adjustment bolt 546 surrounded by a compression spring 547, which are identical to the adjustment bolt and spring used in the mounting of rollers 536, 536'. Also in similar fashion, the adjustment bolts are in threaded engagement with the mounting blocks against which the springs bear, to thereby resiliently press the upper transport rollers 571, 571' and 573, 573' into contact with the lower rollers 572, 572' and 574, 574', respectively, Thus, the body blank is gripped between the oppositely rotating, resiliently pressed secondary transport rollers and carried to the transfer platen 585.

As the body blank 5 slides off the lower end of the feed tray 570, it is located on the platen 585 by an arcuate ridge 586 which defines the face 587 of the platen in a configuration corresponding to that of the flat body blank. A plurality of air passages 588 in the platen communicate with a flexible conduit 589 for conducting a source (not shown) of vacuum to the face of the platen, to thereby hold the blank on the platen after it has located itself against ridge 586.

As here preferably embodied, the body blank 5 is applied to the mandrel 3 by vacuum platen 585. To this end, the platen is secured for rotation with a horizontal shaft 590 journalled at each end in a stationary frame 591 suitably secured to the station platform 16. A pinion gear 592 is also secured for rotation with shaft 590 and meshes with a reciprocating rack 593 so as to be oscillated thereby and, in turn, oscillate platen 585 from a body blank receiving position (FIGURE 15—solid lines) to a position in which the body blank is applied to the mandrel (FIGURE 15—dotted lines; FIGURE 16A). Rack 593 normally engages and is driven by roller 594 received in a generally annularly grooved cam track 595 in actuating cam plate 596 which, in turn, is secured for rotation with input drive shaft 69.

Cam track 595 is of a configuration so as, sequentially, to dwell rack 593 in the retracted position illustrated in solid lines in FIGURE 15 for a length of time sufficient for platen 585 to receive a body blank from magazine 550; to drive the rack forward so as to rotate platen 585 to the position illustrated in dotted lines in FIGURE 15 to thereby apply the body blank to the side of the mandrel; and to return the rack to the retracted position, so as to rotate platen 585 back to the body blank receiving position. It will be understood that, during this same time, suitable switching means (not shown) is provided for applying the vacuum to the face of the platen at predetermined intervals, synchronized with its oscillatory motion. Advantageously, this means operates to apply a vacuum to the platen from a time just prior to its leaving the body blank receiving position until one end of the body blank is held on the mandrel by suction created at the mandrel pin-holes 177, as previously described, whereupon the vacuum to the platen is cut-off.

As previously explained, upon application of one end of a body blank 5 to a mandrel 3, the mandrel is rotated about its vertical axis of revolution through 360° to wrap the body blank around the mandrel. At this same time, as here prferably embodied, a freely rotatable wrapping roller 600 is adapted to be actuated into spring-pressed engagement with the mandrel during rotation thereof so as to wrap the body blank tightly about the mandrel, prior to being clamped thereto by the clamping jaws, as previously described.

To this end, with particular reference to FIGURES 16 and 17, a main supporting beam 601 is advantageously anchored, as by bolting, to the longitudinal edge of the horizontal support plate 302 at the adjacent Bottom Blank Feed Station. Supporting beam 601 carries at its rearward end an integral upstanding pivot plate 602 to which a rocker cam follower 603 is pivotally mounted by means of horizontal pivot shaft 604. A roller 605 is rotatably carried by the linking end 606 of cam follower 603 and normally engages the peripheral cam track surface 608 of an annular driving cam 607. As preferably embodied, cam 607 is secured for rotation with, and is driven by, the horizontal cam driving shaft 312 of the Bottom Blank Feed Station mechanism.

The forward end of supporting beam 601 carries a depending strut 609 to which a vertically extending supporting plate 610 is fixedly anchored, as by bolts 611 which pass through the plate and into threaded engagement with the strut, plate 610 being anchored on a vertical angle corresponding to the vertical angle of the mandrel surface. A pivot shaft 612 is telescopically received within a bore extending through an enlarged section of plate 610 and carries at its upper and lower ends, wrapping roller pivot arms 613, suitably secured for rotation therewith. The wrapping roller 600 extends between the vertically spaced free ends of arms 613 and is here embodied as a plurality of spaced tires 615, freely rotatable about a shaft 616, journalled for rotation in shaft guides 617 adjustably secured to the ends of pivot arms 613. Shaft 616 is also located on a vertical angle so as to extend parallel with the surface of mandrel 3.

Means is provided for applying a predetermined radially outwardly directed pressure to the roller shaft 616 so that the roller tires 615 pressure contact the body blank applied to the mandrel surface. To this end, shaft guides 617 are slidably adjustably mounted to the roller arms 613 by means of a bolt 618 which passes through a slightly elongated slot in the shaft guide and into threaded engagement with the roller arm end. A cantilevered torsion spring 619 is secured at one end to each of the shaft guides and bears at its opposite end against a thrust-receiving surface on the roller arm, here embodied as a screw 620, secured by threaded engagement to the roller arm. From the foregoing, it will be understood that, upon loosening bolts 618, torsion springs 619 place a radially outwardly directed force on shaft guides 617 and, consequently, roller shaft 616. Hence, by retightening the bolts at the desired pressed position, a predetermined pressure may be maintained on the roller tires by the torsion spring.

The free end of rocker follower 603 carries a pivoted link 625 having a threaded shank 626 threadedly engaging one end of a horizontal push rod 627, the other end of push rod 627 similarly threadedly engaging the threaded shank of a universal bearing housing rod 628. Bearing housing rod 628 is provided with a spherical cavity in which a spherical bearing 630 is mounted for universal movement therewithin. A cap screw 631 having a partially threaded shank extends diametrically through spherical bearing 630 into threaded engagement with the lower wrapping roller arm 613, providing a universal pivotal connection between push rod 627 and the wrapping roller pivot arm 613.

Push rod 627 is spring-pressed toward a forward position by means of helical compression spring 632 which bears against a spring retaining ring 633, adjustably fixedly positioned longitudinally on the push rod, and stop plate 634, extending transversely of supporting beam 601. It will be seen that the longitudinal position of the spring retainer 633 may be fixedly adjusted by jam nut 635 and thereby cause compression spring 632 to exert a predetermined forward pressure on push rod 627. It will also be seen that jam nuts 636, 637, abutting push rod 627 at either end thereof, provide additional adjustment in the length of the stroke of the rod and, consequently, the pressure exerted by wrapping roller 600 on the body blank 5 being wrapped onto the mandrel.

It will be apparent from the foregoing that push rod 627 is substantially linearly horizontally advanced and retracted at predetermined intervals by the forces exerted thereon by compression spring 632 and the pivotal movement of rocker follower 603. Push rod 627 thereby functions to oscillate the wrapping roller arms 613 about pivot shaft 612 and, hence, to oscillate wrapping roller 600 into and out of pressure rolling contact with a body blank 5 applied to the peripheral surface of mandrel 3 by transfer platen 585. Advantageously, cam track 608 of cam 607 is of a configuration so as to permit compression spring 632 to advance the push rod, and thereby rotate wrapping roller 600 in a forward arc, immediately upon application of a body blank to the mandrel and to dwell the push rod and wrapping roller in their respective forward positions while the mandrel rotates 360° on its axis of revolution and until the clamping jaws 245 clamp the body blank onto the mandrel. Roller 605 thereafter engages a portion of cam track 608 having an increased radius to thereby pivot the free end of rocker follower 603 rearwardly and, hence, to return the push rod to its retracted position. Push rod 27 thereby rotates wrapping roller 600 in a rearward arc, out of engagement with the mandrel and the body blank. It will be understood that the increased radius portion of cam track 608 covers a sufficient arcuate distance to permit transfer platen 585 to receive the next body blank and apply it to the next mandrel indexed to the station, whereupon the forward movement of push rod 627 is again initiated and the cycle repeated.

Side seam seal station mechanism and bottom preheater

Referring now more particularly to FIGURES 18, 18A, 18B and 19, there is illustrated a side seam sealing and bottom pre-heating mechanism in accordance with the invention, located at each of the two side seam seal stations, for sealingly bonding together the overlapping straight ends of the body blank and pre-heating the bottom end of the cup preparatory to pre-forming the bottom.

As previously described, the primary drive shaft 105 for the side seam sealing mechanism rotates an annular driving cam 110 carried at its upper end. Cam 110 is normally pressure-engaged by a roller assembly 700 mounted to a horizontal ram rod 701 by means of a stud shaft extending transversely through the rod and secured thereto by threaded locknut 702. Ram 701 is carried by a housing 703 immediately above cam 110, housing 703, in turn, being supported above the station platform 16 by upstanding columns 704 secured to a baseplate 705 removably anchored to the station platform and overlapping the bearing housing support plate 44.

Ram 701 is mounted for linear horizontal movement by means of opposed, horizontally axially aligned, cylindrical bore-holes 706 and 707 provided in housing 703.

A flanged cylindrical bushing 708 is telescopically received within each of the bore-holes in co-axial relation thereto, and suitably supported against axial displacement therein. Bushings 708 are formed from suitable anti-friction material so as to provide axial bearing surfaces for the linear movement of the ram rod. The forward end of ram 701 carries a mounting plate 709 provided with a vertically extending channel recess 710 for receiving the shank 711 of a yoke holder 712 therein. Mounting bolts 713 pass through channel plate 710 into threaded engagement with shank 711 to thereby rigidly secure the yoke to the plate.

A heating iron 715, having a longitudinally extending transversely concave face 716, is pivotally mounted onto a stud shaft 717 extending through yoke 712 and suitably secured thereto, as by a lock nut 718 threadedly engaging the shaft end. Heating iron 715 is adapted to be pivoted about stud shaft 717 so as to align its longitudinal face 716 on a vertical angle parallel with the vertical angle of the surface of mandrel 3. To this end, adjustable stop means is provided at the lower end of the yoke shank for accurately positioning the heating iron on a predetermined vertical angle, embodied in a threaded screw 719 passing through the shank, against which the rear surface of heating iron 715 is adapted to abut. It will be seen that the end of the stop screw may be maintained in the desired threaded position by tightening jam nut 720 onto the yoke shank.

An elongated cartridge-type electric heater 722, having leads 723 connected to a source (not shown) of electrical current, is slidably received in a suitable longitudinally extending bore provided in the heater iron adjacent the face thereof, and serves to heat the iron to the desired temperature for sealingly bonding together the material from which the body blank is formed. It will be understood that cartridge heater 722 should tightly fit within the bore of the heating iron so as to provide a positive thermal connection therebetween. It will be also understood that heating iron 715 may be constructed of any suitable heat-conductive material and that use of the term "iron" is not intended to imply a particular required material of construction.

In accordance with the invention, constant pressure means is provided for biasing heating iron 715 in a forward, heat sealing position against the overlapping ends of a body blank 5, wrapped and clamped onto a mandrel 3. As here embodied, this means comprises a pneumatic cylinder 725, suitably mounted onto housing cover plate 726 and connected by fluid line 727 to a source (not shown) of fluid under pressure, such as air, to thereby urge the cylinder rod 728 forward against the heating iron mounting plate 709.

Roller follower 700 is maintained in pressure engagement with cam 110 by the action of cylinder rod 728 against plate 709 mounted on the forward end of ram rod 701. Thus, it will be understood that rotation of cam 110 advances and retracts the heating iron through ram rod 701 as roller 700 rides the annular surface of the cam.

A guide bar 729, slidably telescoped onto ram rod 701 and secured thereto by means of a tapered drift pin 730 extending through the bar and rod, is provided with guide arms 731 extending upwardly on either side of the rod into facing, sliding engagement with the under-surface of housing cover plate 726. Guide 729 thus prevents rotation of ram rod 701 and maintains heating iron 715 in a vertical plane.

As is best seen in FIGURE 18, the configuration of cam 110 includes a first arcuate portion 732 of predetermined radius which permits cylinder rod 728 to dwell heating iron 715 in heat sealing engagement with the overlapping ends of a body blank carried by the mandrel for a sufficient length of time to sealingly bond the overlapping ends together. A second arcuate portion 733 of increased radius dwells the heating iron in a retracted position for a sufficient length of time to permit the next mandrel to be indexed to the station. Advantageously, arcuate portions 732, 733 are connected by similar led configurations which serve to control the speed at which cylinder rod 728 advances and retracts the heating iron. Also advantageously, the arcuate distance of annular cam portion 732 is approximately 180° while that of portion 733 is approximately 120°.

As previously noted, preparatory to pre-forming of the bottom it is necessary to preheat the bottom end of the cup. To this end, oven 750 is suspended directly overhead of the mandrel at the Side Seam Seal Station, and is adapted to be lowered over the top of the mandrel so as to heat the bottom end of the cup just prior to indexing of the mandrel to the succeeding Bottom Pre-Form Station.

The undersurface of oven 750 is recessed so as to provide a generally circular chamber 751 and a radial channel 752 extending from the circular chamber to the outer wall of the oven. It will be understood that radial channel 752 is adapted to extend about either side of the heating iron mechanism upon lowering of the oven over the top of the mandrel to thereby permit chamber 751 to receive and heat the bottom end of the cup.

Advantageously, the pre-heater over 750 is suspended over the mandrel at the side seam sealing station by a supporting arm 753 clamped to the vertical die shaft 816 of the Bottom Pre-Form Station, whereby the oven is raised and lowered at the same time that the pre-forming operation takes place. Supporting arm 753 terminates at the side seam seal station in a yoke 754 which is clamped to a mounting 755 which, in turn, is clamped to a stationary stud shaft 756 anchored to the oven ceiling.

It will be understood from the foregoing that, upon arrival of a mandrel at the Side Seam Seal Station, a body blank 5 is wrapped about the mandrel and tightly clamped thereto, the overlapping straight-ends of the body blank being exposed between the clamp jaws 245 (FIGURE 16B) to the sealing mechanism. Thereafter, the locating iron 715 is driven forward into pressure contact with the overlapping ends of the body blank and is held thereagainst until the ends have been sealingly bonded together, whereupon it returns to its retracted position. At the approximate same time as heating iron 715 is driven forward, the vertical die shaft 816 at the Bottom Pre-Form Station is driven downwardly and thereby lowers the pre-heater oven 750 over the top of the mandrel at the Side Seam Seal Station. Thus, the bottom end of the cup is preheated by the oven for the length of time required for the bottom pre-forming operation, whereupon the oven is again raised by the pre-former die shaft.

Further, it will be understood to those of ordinary skill in this art that the temperature to which heating iron 715 is heated and the duration of time the iron is held in pressure-contact against the overlapping ends of the body blank are dependent upon each other, as well as on the particular material from which the body blank is constructed, and the material which serves to bond the ends together. Where the body blank is constructed from paper stock coated with a typical thermosetting resin, satisfactory bonds between the overlapping ends have been achieved by heating the iron to a temperature in the range of 300°–400° F. and holding it against the blank only momentarily, on the order of 1–2 seconds. In the same manner, the desired temperature for the pre-heater oven 750 will vary with the particular materials of construction of the body blank, it being understood that the function of the oven is to render the bottom of the cup sufficiently pliable to permit it to be easily preformed at the next station. For a body blank of the same construction as in the above example, satisfactory results have been achieved by heating the oven to a temperature of about 400° F.

Bottom pre-form station mechanism

Referring now more particularly to FIGURES 20, 20A, 21 and 22, there is illustrated a bottom pre-forming mechanism in accordance with the invention, which is located at each of the two Bottom Pre-form Stations, for folding the extending upper end of the body blank 5 radially inwardly and axially downwardly into facing engagement with the axially upstanding rim 4' of the bottom blank 4.

As previously noted, the primary drive shaft 115 for the bottom pre-form mechanism rotates a horizontal shaft 120 carrying an actuating cam plate 121. Shaft 120 is journalled for rotation at each end thereof in suitable anti-friction bearings 801 and 802 carried by suitably annular bearing housings 803 and 804, respectively, which, in turn, are removably secured in opposed, horizontal alignment in suitable openings provided in side walls 805, 806 of a frame housing, indicated generally by reference numeral 807. Side walls 805, 806 extend vertically upwardly from a baseplate 808 removably anchored to station platform 16 and overlying bearing housing support plate 44 to also clamp that plate to the station platform.

Cam plate 121 is recessed on one face to provide a grooved cam track 810 for receiving a roller assembly 811 rotatably carried at one end of a crank follower 812. Crank 812 is pivoted about a horizontal pivot shaft 813 carried by the frame side walls 805, 806 and is pivotally linked at its free end by linking arm 814 to a clevis 815 threaded onto a vertically extending pre-forming die shaft 816. It will be seen that the vertical position of the die shaft is adjustable by threading the clevis 815 upwardly or downwardly on the threaded portion of the shaft. A lock nut 817 secures the clevis in the desired position.

Shaft 816 is telescopically slidably received in upper and lower, co-axially aligned, flanged guide bushings 818 and 819 which, in turn, are telescopically received in suitable boreholes provided in a shaft mounting bracket 820 secured to frame housing 807 forwardly thereof. A guide 821 clamped to the upper end of shaft 816 is adapted to slide along the vertically extending side edges of an upstanding bar 822 mounted to bracket 820 and serves to further guide the movement of the shaft.

Shaft 816 carries at its lower end a bottom pre-forming die 825 whose underface is provided with a circular recess 826 having a circumferentially extending side wall 827 which tapers outwardly from a groove 828 extending around the top of the recess. Advantageously, side wall 827 is tapered along a vertical angle corresponding to the vertical angle of the surface of the mandrel 3.

The pre-former die 825 is preferably heated to a temperature in the same range as pre-heater oven 750 in order to maintain the bottom end of the cup in a soft, pliable condition so that it may be easily pre-formed and the thermosetting resin converted to a permanent bond at the next, Bottom Roll-Out Station. To this end, an annular cartridge-type heater 830, connected to a source (not shown) of electrical current, surrounds the die and is held thereon by means of an annular clamp 831.

It will be apparent from the foregoing that the pre-former die shaft 816 is axially downwardly extended and upwardly retracted by the movement of pivot crank 812, the latter being actuated by rotating cam plate 121 as roller 811 rides in cam track 810. Advantageously, as depicted in FIGURE 20, cam track 810 is of a configuration so as to dwell the die in the retracted position over an arcuate distance of about 180°; to drive the die downwardly over an arcuate distance of about 30°, thereby folding the extending upper end of the body blank radially inwardly and axially downwardly into facing engagement with the bottom blank rim 4'; to maintain the die in the extended down position for an arcuate distance of about 120°, thereby additionally heating and softening the overlapping end of the body blank as well as the upstanding rim of the bottom blank; and to thereafter retract the die through an arcuate distance of about 30°, whereupon the cycle is repeated.

Bottom roll-out station mechanism

Referring now more particularly to FIGURES 23, 23A, 23B and 24, there is illustrated a bottom roll-out mechanism in accordance with the invention, which is located at each of the two Bottom Roll-Out Stations, for applying a radially outwardly directed rolling pressure against the annularly folded end of the body blank 5, thereby sealingly bonding the body blank to the upstanding rim 4' of the bottom blank 4.

As previously noted, input drive shafts 39 and 49 for the bottom roll-out mechanisms at the B and A stations, respectively, serve to drive actuating cam plate 47 through horizontal shaft 46 by means of complementary bevel gears 40, 45.

Cam plate 47 is recessed on one face thereof to provide a generally annular cam track groove 901 which receives a roller 902 carried by one end of a bell crank 903. Bell crank 903 is adapted to be pivoted about horizontal pivot shaft 904 mounted at the upper end of frame 905 housing the roll-out mechanism. The other end of bell crank 903 terminates in a yoke 906 which carries opposed, horizontally aligned rollers 907 and 908 at its ends. Rollers 907, 908 ride in diametrically opposite positions in a circumferentially extending groove 909, recessed in the peripheral surface of cam ring 910 which, in turn, is telescopically slidably fitted about cylindrical bearing housing 912. An adjustable stop collar 912a is secured about bearing housing 912 at a predetermined vertical position so that, upon upward pivotal movement of yoke 906, cam ring 910 slides axially upwardly about housing 912 into engagement with stop 912a and continued axial upward movement of the ring 910 lifts housing 912 upwardly against a spring-biased force, more fully described hereinafter. It will thus be seen that, for a given stroke of bell crank 903, the distance of upward movement of housing 912 may be controlled by the vertical position of stop 912a.

Shaft bearing housing 912 is also mounted for rotation about a vertical axis which is co-axially aligned with the central vertical axis designated by reference numeral B in FIGURE 23, of a mandrel 3 at rest in the bottom roll-out station. To this end, housing 905 is provided with a pair of vertically spaced, upper and lower horizontal support plates 913, 914 integral therewith and extending forwardly thereof, having cylindrical openings 915, 916 therein, respectively, co-axially aligned with said central vertical axis B of a mandrel 3 located at the station.

A cylindrical drive sleeve 917 extends through cylindrical openings 915 and 916 and is journalled for rotation therein by means of upper and lower anti-friction bearings 918 and 919, respectively, each of said bearings being suitably secured within said openings. A sheave 920 is axially keyed by key 921 to sleeve 917 and is driven by a suitable pulley belt 922 which, in turn, is driven by a suitable electric motor 923, here preferably bolted to the front wall panel 924 of frame 905. Shaft bearing housing 912 is telescopically slidably received within sleeve 912 and is keyed for rotation therewith by a key 925 slidably received in an elongated axial keyway 926 provided in sleeve 912. From the foregoing, it will be understood that housing 912, sleeve 917 and sheave 920 rotate as a unit, driven by motor 923 by means of drive belt 922.

The lower end of bearing housing 912 is journalled for rotation by means of a suitable anti-friction bearing 927, carried in complementary bearing recesses formed in the outer circumferential surface of housing 912 and in an annular bearing housing 928 the latter surrounding bearing housing 912 in co-axial relation thereto. Suitable bearing retaining rings are mounted in the respective housings 912 and 928 so as to underlie the inner and outer races of bearing 927 and serve to transmit axial displacement of housing 912 to annular bearing housing 928.

Annular bearing housing 928 is mounted for vertical movement with housing 912 by means of diametrically opposed guide bolts 931, 932 which pass through the housing and threadedly engage the undersurface of support plate 914. Compression springs 933, 934 surround the respective guide bolts and thereby resiliently press housing 912 in a downwardly extending position. The unthreaded shank portions of the guide bolts 931, 932 are telescopically slidably received in bushings 935, 936, respectively, carried by bearing housing 928 to provide anti-friction bearing surfaces for the axial sliding movement of the bearing housing along the guide bolts.

A pair of annular roller collars 937 and 938 are removably secured to one another and to the undersurface of bearing housing 928 in co-axial relation thereto, by a plurality of bolts, one such bolt 939 appearing in FIGURE 23. Roller collars 937, 938 are complementarily recessed so as to provide an annular groove 940 therebetween adapted to freely rotatably receive a circumferentially extending flanged portion 941 of bottom roll-out roller 942. Roller 942 includes an outwardly flared forward die portion 943 and an internally bored rear portion 944, more fully described hereinafter.

A bottom roll-out shaft 945 is journalled within shaft bearing housing 912 for intermittent oscillation about a vertical axis "A," eccentric of the axes of rotation of housing 912 and mandrel 3, the latter being designated by reference numeral "B." Roll-out shaft 945 is also adapted to be continuously rotated with shaft bearing housing 912 as the latter is raised and lowered by cam ring 910, as previously noted.

To this end, housing 912 is provided with axially aligned, offset cylindrical bushings 946, 947 carried in suitable openings extending through internal upper and lower flanges 948, 949, respectively, provided in the bore of shaft housing 912, through which bushings shaft 945 extends.

An eccentric bore 950 extends from the upper internal flange 948 to the top of the housing. The circumferentially extending wall 951 of housing 912 surrounding the eccentric bore 950 is provided with an axially extending open slot 952 therein. The vertical side walls 953 of slot 952 provide straight parallel cam surfaces for a roller 954 slidably received in the opening and rotatably mounted to a stud shaft 955 extending radially inwardly from cam ring 910.

A cam sleeve 956, having a lower portion shaped similarly to the wall portion 951 of bearing housing 912, is telescopically fitted over the upper end of shaft 945 within bore 950 and is adjustably fixed longitudinally of the shaft by means of an adjustment nut 957 threadedly engaging the shaft. Thus, adjustment nut 957 is provided with a circumferentially extending flange 958 which is seated in annular groove 949 recessed in sleeve 956 to thereby carry the sleeve. Sleeve 956 is also keyed to shaft 945 for rotation therewith by means of key 960 slidably received in axial keyway 961 provided in the sleeve. The lower portion of sleeve 956 is provided with a cam slot having an axially extending upper portion 962 radially aligned with slot 952 provided in the bore wall 951 and a lower spiral portion 962a which extends from the upper portion at an angle of approximately 45°. Cam slot 962, 962a is adapted to slidably receive therein a roller 963 rotatably mounted to stud 955 at a position radially inwardly of roller 954.

From the foregoing, it will be understood that rotation of bearing housing 912 about axis "B" results in a corresponding rotation of cam ring 910 by means of roller 954 extending transversely within the vertical slot 952 of shaft bearing housing wall 951. It will be seen that cam ring 910 continues to rotate with housing 912 as the latter is raised or lowered by reason of roller 954 riding up and down the cam slot 952.

Roll-out shaft 945 is also caused to rotate with the housing 912 by means of roller 963 extending transversely within the cam in sleeve 956, but shaft 945 rotates about axis "B" only when roller 963 dwells in the upper axially extending portion 962. As roller 963 moves through the spiral portion 962a of the cam slot, due to the up and down movement of housing 912 as previously described, shaft 945 is caused to rotate about axis "A," relative to the continued rotation of housing 912 about axis "B." Advantageously, cam slot 962a is adapted to rotate shaft 945 approximately 30° about axis "A."

Roll-out shaft 945 terminates at its lower end in a crank 965 providing a stud shaft 966 journalled in anti-friction needle bearings 967, the latter being telescopically received in the internal bore of the rear portion 944 of roll-out roller 942. Thus, roll-out roller 942 is freely rotatable about stud shaft 966.

From the foregoing description, it will be seen that as roller 963 dwells within cam slot 962, roll-out shaft 945 and stud shaft 966 rotate with housing 912 about axis "B" and roll-out roller 942 consequently freely rotates in a circular pattern about axis "B." When a mandrel 3 has been indexed to and is at rest in the station and with the roll-out mechanism spring-pressed in the downwardly extended position, roll-out roller 942 rotates in an eccentric rotary pattern due to the rotation of shaft 945 about axis "A," forcing the forward die portion 943 against the annularly folded end of the body blank 5 with a radially outwardly directed rolling pressure, sealingly bonding the body blank to the upstanding rim 4' of the bottom blank 4 in the same manner that the side seam seal is effected, previously described.

Advantageously, for a body blank of the same construction as previously described, heat is also applied to the bottom end of the cup at this station to insure that the thermosetting resin coating is raised to a sufficiently elevated temperature so as to be converted to a permanent bond. To this end, annular cartridge type electric heaters 970 and 971 are provided in roller collars 937 and 938, respectively, and are preferably heated to a temperature in the range of 300°–400° F.

As has been previously noted, shaft bearing housing 912, cam ring 910 and roll-out shaft 945 rotate as a unit driven by motor 923, as they are raised and lowered by the pivotal movement of bell crank 903, the latter being actuated by rotating cam plate 47 as roller 902 rides in cam track 901.

Cam track 901 is grooved of a configuration so as to sequentially drive the shaft bearing housing 912 to the downwardly extended position shown in FIGURE 23, where the lower end of roller collar 938 extends over the bottom end of the cup secured to the mandrel and the face of the forward die portion 943 of roller 942 is in resilient pressing contact with the bottom blank 4; to dwell housing 912 in the downwardly extended position for a length of time sufficient to permit eccentrically rotating roll-out roller 942 to make at least one revolution, thereby sealingly bonding the annularly folded end of the body blank 5 to the rim 4' of the bottom blank 4; to return housing 912 to the raised position; and to dwell housing 912 in the raised position for a length of time sufficient to permit the mandrel with the now partially finished cup to be indexed to the next, Blow-Off Station and another mandrel to arrive at the roll-out station, whereupon the cycle is repeated. Advantageously, the configuration of cam track 901 is such as to dwell housing 912 in the downwardly extended position over an arcuate distance of about 150°; to dwell housing 912 in the raised position over an arcuate distance of about 120°; and to drive the housing between the dwell positions over an arcuate distance of about 45° each.

Secondary turntable drive and rim-rolling station mechanisms

Referring now more particularly to FIGURES 25–27, 27A and 27B, there is illustrated the secondary turntable unit 2 and its drive mechanism, together with two identical rim-rolling mechanisms, all in accordance with the invention. The rim-rolling mechanisms are located at each of the Rim-Rolling Stations A and B and serve to complete the semi-finished cup 6 by forming an annular rim about the open end of the cup.

The secondary turntable unit 2 comprises a stationary rigid base 1000 to which upright side frame panels 1001 and 1002 are rigidly anchored and provide rigid supporting structure for mounting the two rim-rolling mechanisms, more fully described hereinafter. Intermediate the side frames is an annular rotatable turret 1003 which carries a circular row of hollow die receptacles 9, one for each station, at equal angular distances of 60° from each other, as previously noted. Receptacles 9 are suitably removably anchored to turret 1003 as by bolting, two such bolts 1004 appearing in FIGURES 27 and 27B.

Turret 1003 is mounted, similarly to turret 17 at the primary turntable, for step-wise rotation with a circular indexing table or dial 1005 successively into and through the receiving, rim-rolling and stacking stations of the secondary unit. Thus, indexing dial 1005 forms a rotational part of an indexing unit 1006 supported on base 1000. Indexing unit 1006 includes therein a rotary three-stop commercial indexing cam (not shown) and thereby effects step-wise rotation of dial 1005 at precise 120° intervals. As here preferably embodied, indexing unit 1006 may be a commercial unit such, for example, as manufactured by The Commercial Cam & Machine Co., St. Louis, Mo.

As previously noted, the mitre gear box 30, located at the primary turntable unit 1, also serves to drive the rotary turret 1003. To this end, the horizontal output drive shaft 31 from gear box 30 is coupled by means of coupling collars 1007, 1008 and intermediate shaft 1009, to a horizontal input drive shaft 1010 which drives the rotary cam of indexing unit 1006. Also, as here preferably embodied, input drive shaft 1010 is extended axially out the opposite side of indexing unit 1006 to provide a horizontal output drive shaft 1011, suitably supported for rotation in frame upright 1002, and which rotates at a rotational speed corresponding to that of the input shaft 1010.

Each of horizontal drive shafts 1010 and 1011 carry an annular cam hub 1012 secured for rotation therewith and to which an annular driving cam plate 1013 is fixedly secured. Cam plates 1013 are each recessed on one face thereof to provide a generally annular cam track groove 1014 for raising and lowering a rim-rolling die and cup clamping unit 1020, FIGURE 27. To this end, a push rod 1015 is telescopically slidably received in a bracket 1016 and carries at its upper end a rim-rolling die shaft bearing housing 1017. Cam track 1014 is engaged by a roller 1018 rotatably mounted to a cam follower plate 1019 which, in turn, is carried by the lower end of push rod 1015. Push rod 1015 functions at predetermined intervals to drive the rim-rolling die and cup clamping unit 1020 from a retracted position, shown in FIGURES 26 and 27, to a downwardly extended position shown in FIGURE 27A, whereby the open end of the semi-finished cup 6 is formed with an annular rim, preferably having a generally circular cross-section. Bracket 1016 also telescopically slidably receives a guide rod 1021 secured at its upper end to rim-rolling die shaft housing 1017, rod 1021 thereby serving to guide the vertical displacement of housing 1017 and, consequently, the rim-rolling die and cup clamping unit 1020.

As here preferably embodied, the rim-rolling die and cup clamping unit 1020 located at each of the rim-rolling stations includes a shaft 1022 journalled for rotation at its upper end in suitable anti-friction bearings 1023 and 1024, carried by shaft bearing housing 1017. Shaft 1022 has an intermedaite portion 1025 of enlarged diameter, providing an annular retaining shoulder for bearing 1024, and terminates at its lower end in a rim-rolling die portion 1026.

The rim-rolling die 1026 is here embodied as a generally cylindrical member 1027, the undersurface of which is formed with a smaller diametered, depending frusto-conical boss 1028 adapted to fit snugly into the open end of the semi-finished cup 6. The undersurface of cylinder 1027 is recessed so as to provide an annular groove 1029 of generally semi-circular cross-section surrounding boss 1028. The upper surface of each die receptacle 9 is similarly recessed so as to provide an annular groove 1030 of equal diameter to groove 1029.

The enlarged diameter portion 1025 of shaft 1022 and die 1026 have a central bore extending axially therethrough which telescopically slidably receives a push rod 1031 carrying at its outer end a dish-shaped clamp 1032 the outer peripheral surface of which is formed in a frusto-conical shape so as to be parallel to the side wall of cup 6. The central bore of die 1026 has an enlarged diameter portion 1033 providing an annular bearing shoulder for a thrust bearing 1034. A compression spring 1035 is also received in the bore portion 1033 surrounding rod 1031 and spring-presses clamp 1032 in a normal position forwardly of rim-rolling die boss 1028.

As previously noted, the rim-rolling die shafts 1022 are mounted for rotation and, to this end, carry at their upper ends a pinion gear 1036 secured for rotation therewith. Pinion gears 1036 are each in meshed engagement with, and driven in equal rotational speeds by, a bull gear 1038. Bull gear 1038 is, in turn, driven by motor 1039 through a suitable gear reducer 1040, each of the latter being suitably mounted to a horizontal support plate 1041 extending between side frame members 1001, 1002. Advantageously, bull gear 1038 is of sufficient width such that pinion gears 1036 remain in meshed driven engagement therewith in both the extended and retracted positions of the die and clamp unit 1020.

From the foregoing, it will be apparent that the rim-rolling die 1026 and clamp 1032 move together as a unit, with clamp 1032 spring-pressed forwardly of the unit, into downwardly extended and retracted positions, driven by push rod 1015 which, in turn, is actuated by rotating cam plate 1013 as roller 1018 rides in cam track 1014. As the unit is driven downwardly, clamp 1032 first engages and tightly clamps cup 6 within die receptacle 9; the rotating die 1026 thereafter engages the cup and continues its downward movement against the pressure of spring 1035 until boss 1028 contacts the back surface of clamp 1032. It will be seen that as die 1026 slides downwardly in close-fitting engagement with the cup, the open end thereof is guided into annular groove 1029 which curls the end outwardly and downwardly into complementary groove 1030 in die receptacle 9. The latter groove curls the end inwardly and upwardly and thereby completes the formation of the open end of the cup into a rim having a substantially circular cross-section, as best seen in FIGURE 27A. The die and clamp units 1020 are thereafter returned to their retracted position and the rim-rolling cycle is repeated for the next set of cups.

As previously described, upon completion of the rim-rolling operation, the row of receptacles 9 is indexed to advance the finished cups to the stacking stations for discharge from the receptacles. To this end, turret 1003 is provided with a cylindrical opening beneath each die receptacle 9 and telescopically slidably receives therein a cup ejector stem 1042 carrying a cup ejector plate 1043 at its upper end, upon which the bottom end of the finished cup rests. A compression spring 1044 surrounding stem 1042 bears against the undersurface of turret 1003 and a cam follower nut 1045 secured to the lower end of stem 1042 and serves to spring-press ejector stem in a downwardly extended position. Each of stem 1042 and plate 1043 have an air passage 1046 for communicating a source (not shown) of compressed air to the bottom end of the finished cup. An ejector cam 1050 is mounted on indexing unit 1006 at each of the stacking stations and, advantageously, has a compressed air port (not shown) therein. Thus, as the receptacles 9 arrive at the stacking stations, cam followers 1045 ride up cam 1050 whereby ejector stem 1042 dislodges the finished cup from the receptacle wall. Thereafter, the compressed air blast, passing through conduit 1046, discharges the cups from the receptacles for stacking, as depicted in FIGURE 27B.

The invention in its broader aspects is not limited to the specific embodiments herein shown and described but departures may be made therefrom within the scope of the accompanying claims, without departing from the principles of the invention and without sacrificing its chief advantages.

What is claimed is:

1. A cup-making machine for producing a plurality of finished cups simultaneously comprising, in combination:
   primary rotatable turntable means;
   a plurality of cup-forming mandrels carried by said primary turntable means and arranged in a circular row at equal angular distances from each other;
   a plurality of identical sets of cup-making stations located about the periphery of said primary turntable means, the number of sets of said cup-making stations being equal to the number of finished cups desired to be produced simultaneously;
   drive means for effecting step-wise rotation of said primary turntable means, whereby each of said plurality of mandrels is indexed during one complete revolution of said turntable means successively into and through each of said cup-making stations in each of said plurality of sets of cup-making stations;
   each of said sets of cup-making stations including, in the following order:
      a bottom blank feed station, adapted to deposit a disc-shaped bottom blank into a bottom blank receiving recess located in the upper end of each of said mandrels and to die-form the bottom blank in said recess so as to have a circumferentially extending up-standing rim,
      a body blank feed and wrap station, adapted to apply a body blank in the form of a flat sheet of flexible material to the peripheral surface of each of said mandrels and to wrap the body blank closely about the mandrel surface, so as to shape the flat blank into a frusto-conical configuration having overlapping ends forming a side seam, the upper end of the formed body blank extending beyond the mandrel,
      a side seam seal and pre-heat station adapted to sealingly bond together the overlapping ends of the body blank wrapped about each of said mandrels and to pre-heat the bottom end of the cup,
      a bottom pre-form station, adapted to fold the pre-heated, extending upper end of the body blank radially inwardly and axially downwardly into facing engagement with the circumferentially extending upstanding rim of the die-formed bottom blank,
      a bottom roll-out station, adapted to sealingly bond the folded portion of the body blank to the upstanding rim of the bottom blank, to thereby produce a semi-finished cup, and
      a blow-off station, adapted to blow the semi-finished cup from each of said mandrels through conduit means to secondary turntable means;
   said secondary turntable means carrying a plurality of die receptacles arranged in a circular row at equal angular distances from each other, each of said die receptacles adapted to seat a semi-finished cup therein with its open end facing upwardly;
   a plurality of identical sets of cup-making stations located about the periphery of said secondary turntable means, the number of sets of said cup-making stations being equal to the number of finished cups desired to be produced simultaneously;
   drive means for effecting step-wise rotation of said secondary turntable means in timed relation to the step-wise revolution of said primary turntable means;
   said drive means indexing each of said plurality of die receptacles during one complete revolution of said secondary turntable means successively into and through each of said cup-making stations in each of said plurality of sets of cup-making stations;
   each of said sets of cup-making stations including, in the following order:
      a receiving station, where said semi-finished cup is deposited and seated in said receptacle,
      a rim-rolling station, adapted to complete the semi-finished cup by forming an annular rim about the open end thereof, and
      a finished cup stacking station, where said finished cup is discharged from said receptacle for stacking.

2. In a cup-making machine including at least one cup-forming mandrel having a cup bottom blank receiving die recess in the upper end thereof, apparatus for depositing a disc-shaped bottom blank onto said mandrel and die-forming said bottom blank in said die recess including:
   a pair of spaced bottom blank magazines each releasably carrying a supply of bottom blank discs;
   feeder shuttle means having a pair of spaced opening means each adapted to releasably receive a bottom blank disc therein,
   vacuum picker means adapted to sequentially pick the bottommost bottom blank disc from alternate magazines and deposit the picked disc into alternate shuttle opening means,
   means driving said shuttle means intermittently back-and-forth between said bottom blank magazines, whereby said shuttle means simultaneously receives a bottom blank disc in one of said opening means and transports a bottom blank disc carried in the other of said opening means to a position in co-axial alignment with said cup-forming mandrel resting at the bottom blank feed station,
   means co-axially aligned with said mandrel adapted to release the bottom blank disc from said shuttle opening means positioned in co-axial alignment with said mandrel and to deposit the released disc on the upper end of said mandrel, and
   die means for forcing said bottom blank disc into said mandrel die recess to thereby form said disc with a circumferentially extending upstanding rim.

3. In an apparatus for the manufacture of cups or the like, including a plurality of cup-forming mandrels carried by rotatable turntable means and having at least one set of a plurality of cup-making stations located about said turntable means including a bottom blank-feed station, a body blank feed and wrap station, a side seam seal station, a bottom pre-form station, and a bottom roll-out station, the improvements therein which comprise:
   a stationary circular cam track member;
   said plurality of mandrels being arranged in a circular row at equal angular distances from each other to ride on said cam track as said turntable means revolves;
   mounting said mandrels for independent rotation about a vertical axis of revolution parallel to the axis of rotation of said turntable means; and
   means for rotating said mandrels at least 360° about their axes of revolution at said body blank feed and wrap station,
   said means including a rotatable bridge segment in said circular cam track member at said body blank feed and wrap station.

References Cited

UNITED STATES PATENTS

| | | | |
|---|---|---|---|
| Re. 21,072 | 5/1939 | Wessman | 93—39 |
| 1,962,213 | 6/1934 | Reed | 93—36.5 X |

(Other references on following page)

UNITED STATES PATENTS

| | | | |
|---|---|---|---|
| 2,065,975 | 12/1936 | Meyer-Jagenberg | 93—39 |
| 2,216,331 | 10/1940 | Swallow | 93—39 |
| 2,818,788 | 1/1958 | Kirk | 93—36 |
| 2,834,260 | 5/1958 | De Wiess | 93—36.5 X |
| 3,028,798 | 4/1962 | Allen | 93—55 |
| 3,133,482 | 5/1964 | Armstrong | 93—55 |
| 3,248,841 | 5/1966 | Heffelfinger | 93—44.1 X |
| 3,289,552 | 12/1966 | Corazzo | 93—39 |
| 3,336,847 | 8/1967 | Durat | 93—39 |
| 3,343,465 | 9/1967 | Albert | 93—39 |
| 3,425,325 | 2/1969 | Lynch | 93—79 |

WAYNE A. MORSE, JR., Primary Examiner

U.S. Cl. X.R.

93—36.5, 59, 79, 93, 94